(12) United States Patent
Ran et al.

(10) Patent No.: US 12,333,935 B2
(45) Date of Patent: Jun. 17, 2025

(54) CONNECTED REFERENCE MARKER SYSTEM

(71) Applicant: CAVH LLC, Fitchburg, WI (US)

(72) Inventors: Bin Ran, Fitchburg, WI (US); Kunsong Shi, Madison, WI (US); Wenqi Lu, Madison, WI (US); Yang Cheng, Middleton, WI (US); Hongbin Zhang, Madison, WI (US); Haotian Shi, Madison, WI (US); Tianyi Chen, Madison, WI (US); Bingjie Liang, Madison, WI (US); Yifan Yao, Madison, WI (US); Keshu Wu, Madison, WI (US); Sicheng Fu, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 366 days.

(21) Appl. No.: 17/835,546

(22) Filed: Jun. 8, 2022

(65) Prior Publication Data

US 2022/0406178 A1  Dec. 22, 2022

Related U.S. Application Data

(60) Provisional application No. 63/210,845, filed on Jun. 15, 2021.

(51) Int. Cl.
*G08G 1/09* (2006.01)
*B60W 30/12* (2020.01)
*G08G 1/01* (2006.01)
*G08G 1/0967* (2006.01)

(52) U.S. Cl.
CPC ....... *G08G 1/096708* (2013.01); *B60W 30/12* (2013.01); *G08G 1/0116* (2013.01); *B60W 2552/53* (2020.02); *B60W 2555/20* (2020.02)

(58) Field of Classification Search
CPC .......... G08G 1/096708; G08G 1/0116; B60W 30/12; B60W 2552/53; B60W 2552/20
See application file for complete search history.

(56) References Cited

U.S. PATENT DOCUMENTS

| | | |
|---|---|---|
| 10,380,886 B2 | 8/2019 | Ran et al. |
| 10,692,365 B2 * | 6/2020 | Ran ................. G08G 1/096725 |
| 10,867,512 B2 | 12/2020 | Ran et al. |
| 11,741,834 B2 | 8/2023 | Ran et al. |

(Continued)

FOREIGN PATENT DOCUMENTS

| | | |
|---|---|---|
| GB | 2491302 A | 11/2012 |
| WO | WO 2021/041091 | 3/2021 |

OTHER PUBLICATIONS

International Search Report and Written Opinion for PCT/US22/32677. Mailed Dec. 8, 2022. 30 pages.

(Continued)

*Primary Examiner* — Adam D Tissot
(74) *Attorney, Agent, or Firm* — Casimir Jones, S.C.; Thomas A. Isenbarger

(57) ABSTRACT

Provided herein is technology relating to automated driving and particularly, but not exclusively, to a connected reference marker technology configured to serve automated driving systems by providing, supplementing, and/or enhancing autonomous driving functions for connected automated vehicles under normal and abnormal driving scenarios.

23 Claims, 48 Drawing Sheets

(56) References Cited

U.S. PATENT DOCUMENTS

| | | | |
|---|---|---|---|
| 2017/0372607 A1* | 12/2017 | Janovec | G08G 1/096725 |
| 2018/0165954 A1* | 6/2018 | Song | G08G 1/056 |
| 2018/0330174 A1 | 11/2018 | Pratt et al. | |
| 2019/0243372 A1 | 8/2019 | Huval et al. | |
| 2019/0340921 A1 | 11/2019 | Ran et al. | |
| 2019/0369626 A1 | 12/2019 | Lui et al. | |
| 2020/0005633 A1 | 1/2020 | Jin et al. | |
| 2020/0021961 A1 | 1/2020 | Li et al. | |
| 2020/0168081 A1 | 5/2020 | Ran et al. | |
| 2020/0175857 A1 | 6/2020 | Soltesz et al. | |
| 2020/0242930 A1 | 7/2020 | Ran et al. | |
| 2020/0334978 A1 | 10/2020 | Pittman et al. | |
| 2021/0173394 A1 | 6/2021 | Agarwal | |
| 2021/0311491 A1 | 10/2021 | Li et al. | |
| 2021/0314752 A1 | 10/2021 | Ran et al. | |
| 2021/0394797 A1 | 12/2021 | Ran et al. | |
| 2022/0270476 A1 | 8/2022 | Ran et al. | |
| 2022/0281484 A1 | 9/2022 | Ran et al. | |
| 2022/0332337 A1 | 10/2022 | Ran et al. | |

OTHER PUBLICATIONS

9150 C-V2X ASIC Qualcomm. Retrieved from the internet Oct. 10, 2023. 6 pages.

Aashto. "A Policy on Geometric Design of Highways and Streets" (www.bestmaterials.com/PDF_Files/geometric_design_highways_and_streets_aashto.pdf) 2001. 942 pages.

ESP8285 Datasheet. Espressif Systems. 2023. 31 pages.

EyeQ4 from Mobileye. Retrieved from the internet Oct. 10, 2023. 21 pages.

Gimbal Proximity Beacon Series 22. Gimbal, Inc. 2017. 18 pages.

HDL-64E of Velodyne Lidar. 2018. 2 pages.

Here HD Map. Retrieved from the internet Oct. 10, 2023. 5 pages.

I.MX 6UltraLite. NXP. 2023. 2 pages.

Intel i7-10700KF. Intel 2023. 4 pages.

Karpathy, Workshop on scalability in autonomous driving: Keynote talk, CVPR2020 <Video Link: https:??www.youtube.com/watch?v=g2R2T631x7k> <Date of poublicaiton: Jun. 18, 2020 (Jun. 18, 2020)> entire video. 2020. 1 page.

Lambert et al., Trust, but Verify: Cross-Modality Fusion for HD Map Change Detection, 35th Conference on Neural Information Processing Systems (NNeurIPS 2021) Track on Datasets and Benchmarks, Aug. 12, 2021. 14 pages.

MK5 V2X from Cohda Wireless. Retrieved from the internet Oct. 10, 2023. 2 pages.

Qorvo DWM1000. Decawave Ltd. 2016. 33 pages.

Qualcomm 4G SIM Card. Retrieved from the internet Oct. 10, 2023. 5 pages.

Qualcomm 9150. Retrieved from the internet Oct. 10, 2023. 12 pages.

Qualcomm Snapdragon 780G. Qualcomm Technologies Inc. 2021. 2 pages.

Qualcomm Snapdragon X16 LTE Modem. Retrieved from the internet Oct. 10, 2023. 5 pages.

SAE International Standard J3016, "Taxonomy and Definitions for Terms Related to Driving Automation Systems for On-Road Motor Vehicles" (published in 2014 (J3016_201401) 12 pages.

SAE International Standard J3016, "Taxonomy and Definitions for Terms Related to Driving Automation Systems for On-Road Motor Vehicles" 2018 (J3016_201806) 35 pages.

SAE International Standard J3016, "Taxonomy and Definitions for Terms Related to Driving Automation Systems for On-Road Motor Vehicles" revised in 2016 (J3016_201609). 30 pages.

ST25T NFC / RFID tags. Retrieved from the internet Oct. 10, 2023. 6 pages.

SYH24A1 24G Millimeter Wave Radar. Retrieved from the internet Oct. 10, 2023. 19 pages.

U.S. Appl. No. 62/894,703, filed Aug. 31, 2019, Ran et al.
U.S. Appl. No. 63/004,551, filed Apr. 3, 2020, Li et al.
U.S. Appl. No. 63/004,564, filed Apr. 3, 2020, Ran et al.
U.S. Appl. No. 63/042,620, filed Jun. 23, 2020, Ran et al.
U.S. Appl. No. 63/149,804, filed Feb. 16, 2021, Ran et al.
U.S. Appl. No. 63/155,545, filed Mar. 2, 2021, Ran et al.
U.S. Appl. No. 63/175,158, filed Apr. 15, 2021, Ran et al.

* cited by examiner

104 Advanced CRMS

105 COU

103 Communication

106 CRM

FIG. 1B

201 Connected Reference Marker (CRM)

- 203 Data Storage Module
- 204 Communication Module
- 202 Power Supply Unit

FIG. 2A

201 Connected Reference Marker (CRM)

- 203 Data Storage Module
- 205 Data Processing Module
- 204 Communication Module
- 202 Power Supply Unit

CONNECTED REFERENCE MARKER SYSTEM

STATEMENT OF RELATED APPLICATIONS

This application claims priority to U.S. Provisional Patent Application No. 63/210,845, filed Jun. 15, 2021, the entire contents of which are incorporated herein by reference for all purposes.

FIELD

Provided herein is technology relating to automated driving and particularly, but not exclusively, to a connected reference marker technology configured to serve automated driving systems by providing, supplementing, and/or enhancing autonomous driving functions for connected automated vehicles under normal and abnormal driving scenarios.

BACKGROUND

Information technologies such as the Internet of Things and artificial intelligence are providing opportunities for the development of new transportation systems. For example, a connected and automated vehicle highway (CAVH) system provides important technologies for alleviating traffic congestion, improving traffic safety, and reducing traffic pollution. See, e.g., U.S. Pat. No. 10,380,886 and U.S. Pat. App. Pub. No. 2019/0340921 (both entitled "CONNECTED AUTOMATED VEHICLE HIGHWAY SYSTEMS AND METHODS"), each of which is incorporated herein by reference.

An intelligent roadside system provides collaborative sensing, collaborative prediction, collaborative decision-making, and collaborative vehicle control for CAVH systems. Existing intelligent roadside systems typically comprise highly intelligent infrastructure components. See, e.g., U.S. Pat. No. 10,692,365; U.S. Pat. App. Pub. No. 2020/0168081 (both entitled "INTELLIGENT ROAD INFRASTRUCTURE SYSTEM (IRIS): SYSTEMS AND METHODS"); and U.S. Pat. App. No. 63/155,545 (entitled "MOBILE INTELLIGENT ROAD INFRASTRUCTURE SYSTEM"), each of which is incorporated herein by reference. These automated driving systems (e.g., CAVH systems) would benefit from cost efficient and easily deployed intelligent roadside infrastructure technologies that are applicable for normal and abnormal driving scenarios, a range of weather conditions, and that can serve all roadways.

SUMMARY

Accordingly, provided herein is a connected reference marker technology. In particular, the technology provides a Connected Reference Marker (CRM) System and related methods (e.g., management methods) that serve automated driving systems (ADS), such as a connected and automated vehicle highway (CAVH) system. The CRM System and related methods provide a technology for determining and/or identifying the locations of connected automated vehicles (CAV) at any vehicle intelligence level.

As described herein, embodiments of the CRM System provide an inexpensive and easily deployed technology to provide support for automated driving. In some embodiments, the CRM System provides lateral position and longitudinal position information for vehicles. In some embodiments, the CRM System provides lateral position and longitudinal position information for vehicles under normal conditions and, in some embodiments, under extreme weather conditions and for all types of roadways.

As described herein, the CRM System technology uses connected reference markers as reference points for identifying vehicle position in real-time. In some embodiments, the CRM System technology uses connected reference markers as reference points and a high-definition map for identifying vehicle position in real-time. In some embodiments, the CRM System technology uses connected reference markers as reference points without a high-definition map for identifying vehicle position in real-time. In some embodiments, the CRMs provide object detection and identification capability. In some embodiments, the CRM System uses triangular position identification methods to calculate and identify the position of a vehicle.

Further, as described herein, the CRM System comprises (1) Connected Reference Markers (CRM), (2) communication modules or components, (3) Virtual Roadway Configuration Module (VRCM), (4) Central Operations Unit (COU), (5) Onboard Module (OBM), (6) Distance Measurement Unit (DMU), and/or (7) Wireless Signal Unit (WSU). In some embodiments, the CRM System comprises one or more of a (1) Basic CRM System, (2) Advanced CRM System (A-CRM System), (3) Vehicle-centric CRM System (V-CRM System), (4) Communication-centric CRM System (C-CRM System), and/or (5) Road-centric CRM System (R-CRM System).

As described herein, embodiments of the basic CRM System comprise the following subcomponents: (1) a network of Connected Reference Markers (CRM) installed along a roadway; and (2) a roadside communication system. Further, in some embodiments, the CRM is configured to comprise: (1) a data storage component configured to store a CRM identifier and/or CRM location information; and (2) a communication module for transmitting the CRM identifier and/or CRM location information to vehicles. In some embodiments, the CRM is configured to comprise: (1) a data storage component configured to store a CRM identifier and CRM location information; (2) a data processing unit configured to process the CRM identifier and/or CRM location information; and (3) a communication module for transmitting the CRM identifier and/or CRM location information to vehicles.

As described herein, in some embodiments, the CRM System improves an ADS and/or provides support to an ADS, e.g., by providing vehicle location information, by improving the accuracy of vehicle location information, and/or by providing accurate vehicle location information. In some embodiments, the CRM System improves an ADS and/or provides support to an ADS, e.g., by providing vehicle location information, by improving the accuracy of vehicle location information, and/or by providing accurate vehicle location information when the vehicle is operating under extreme weather conditions. For example, during a snow or heavy rain scenario, an ADS (e.g., a CAVH system) that is improved and/or supported by the CRM System is configured to use the CRM System (e.g., CRM System components, modules, methods and/or equipment) flexibly and quickly to identify the driving lane covered by snow or heavy rain and to maintain automated driving functions of the ADS and/or vehicle. Embodiments of the CRM System technology provided herein enhance ADS (e.g., CAVH systems) and components of ADS systems (e.g., CAVH system components) by providing CRM System technologies, e.g., CRM System infrastructure that provide vehicle position information and CRM System methods to manage CRM System infrastructure that provides vehicle position information. The CRM System also improves an ADS by assisting the ADS in managing emergency scenarios and other long-tail scenarios of automated driving.

Accordingly, in some embodiments, the technology provides a connected reference marker system (CRM System) comprising a network of connected reference markers (CRM) and a roadside communication system. In some embodiments, the CRM comprises a data storage component storing a CRM identifier and CRM location information; and a communication module for transmitting the CRM identifier and CRM location information to vehicles. In some embodiments, the CRM comprises a data storage component storing the CRM identifier and CRM location information; a data processing unit to process the CRM location information; and a communication module for transmitting the CRM identifier and CRM location information to vehicles. In some embodiments, the network of CRMs comprises a plurality of CRMs installed along a roadway at intervals of from 1 meter to 50 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters).

In some embodiments, the technology provides a CRM System comprising CRMs installed at an intersection or a roundabout, wherein the CRMs are installed at each corner of a roadway approaching the intersection or roundabout. In some embodiments, the technology provides a CRM System comprising CRMs installed at a merging roadway segment, a diverging roadway segment, and/or a weaving roadway segment, wherein the CRMs are installed at a starting point, at an ending point, and at a mid-point of the merging roadway segment, the diverging roadway segment, and/or the weaving roadway segment. In some embodiments, the technology provides a CRM System comprising CRMs installed at an on-ramp segment, an off-ramp segment, and/or an interchange roadway segment, wherein the CRMs are installed at a starting point, at an ending point, and at a mid-point of the on-ramp segment, the off-ramp segment, and/or the interchange roadway segment. In some embodiments, the technology provides a CRM System comprising CRM installed on roadway or roadside facilities, roadway overhead facilities, roadway surface or pavement, or aerial facilities. In some embodiments, roadside facilities comprise a pole, a traffic sign, an intersection traffic controller, a roundabout island, a reflection device, a barricade, a median divider, a power supply, and/or a wireless tower; wherein the roadway overhead facilities comprises a gantry; and/or wherein the aerial facilities comprise a drone or a balloon. In some embodiments, CRM are configured to be installed on an inter-city freeway, an urban expressway, a major arterial, a minor arterial, a connector, a street, and/or a rural road. In some embodiments, a CRM of the network of CRM provides a local location reference and/or an object reference to support identifying the locations and positions of objects on a roadway and in the driving environment for a vehicle; and detecting and identifying objects on the roadway and in the driving environment for a vehicle. In some embodiments, objects on the roadway and in the driving environment for a vehicle comprise a vehicle, bicycle, pedestrian, animal, obstacle, construction, incident, signage, marking, and/or traffic control device. In some embodiments, the CRM is configured to support a roadside intelligent unit (RIU) system, an intelligent roadside toolbox (IRT) system, and/or an intelligent roadside infrastructure system (IRIS).

In some embodiments, the technology provides a virtual roadway configuration module (VRCM) comprising a virtual driving cell identification module, a virtual driving lane identification module, a virtual driving lane group identification module, and a virtual driving grid identification module. In some embodiments, the virtual driving cell identification module is configured to perform a method for defining a virtual driving cell. In some embodiments, the virtual driving cell has a width of a driving lane (e.g., approximately 12 feet (e.g., 9-15 feet (e.g., 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, or 15.0 feet))) and a length ranging from a vehicle length to 50 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters) for a straight roadway segment and a length ranging from a vehicle length to 20 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters) for a curved roadway segment.

In some embodiments, the virtual driving cell identification module is configured to perform a method comprising selecting a first CRM and a second CRM; identifying a roadway driving lane; identifying a first roadway division line and a second roadway division line separated by a lane width of the roadway driving lane; providing a first reference line originating from the first CRM, wherein the first reference line is perpendicular and/or substantially or essentially perpendicular to the first roadway division line; providing a second reference line originating from the second CRM, wherein the second reference line is perpendicular and/or substantially or essentially perpendicular to the first roadway division line; identifying a first reference point where the first reference line intersects the first roadway division line; identifying a second reference point where the second reference line intersects the first roadway division line; connecting the first reference point and the second reference point to provide a first virtual division line; providing a second virtual division line based on the lane width; and providing a virtual driving cell that is a rectangular and/or substantially or essentially rectangular shape comprising sides that are the first virtual division line; the second virtual division line, the first reference line, and the second reference line. In some embodiments, the lane width is approximately 12 feet (e.g., 9-15 feet (e.g., 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, or 15.0 feet)). In some embodiments, the first CRM and the second CRM are adjacent CRM. In some embodiments, the first CRM and the second CRM are the two CRM of the network of CRM that are closest to a vehicle driving on the roadway driving lane. In some embodiments, methods further comprise providing a second virtual driving cell for a second driving lane using a first virtual driving cell provided for a first driving lane, wherein the second virtual driving cell is parallel to the first virtual driving cell and comprises the same and/or substantially same dimensions as the first virtual driving cell. In some embodiments, the first virtual driving cell is provided by the method for defining a virtual driving cell. In some embodiments, methods comprise repeating the method to provide a plurality of parallel virtual driving cells for multiple driving lanes.

In some embodiments, the virtual driving cell identification module is configured to perform a method comprising selecting a first CRM and a second CRM; identifying a roadway driving lane; identifying a first roadway division line and a second roadway division line separated by a lane width of the roadway driving lane; providing a first reference line originating from the first CRM, wherein the first reference line is perpendicular and/or substantially or essentially perpendicular to the first roadway division line and/or the second roadway division line; providing a second reference line originating from the second CRM, wherein the second reference line is perpendicular and/or substantially or essentially perpendicular to the first roadway division line and/or the second roadway division line; identifying a first reference point where the first reference line intersects the first roadway division line; identifying a second reference point where the second reference line intersects the first roadway division line; identifying a third reference point where the first reference line intersects the second roadway division line; identifying a fourth reference point where the second reference line intersects the second roadway division line; connecting the first reference point and the second reference point to provide a first virtual division line; connecting the third reference point and the fourth reference point to provide a second virtual division line; and providing a virtual driving cell that is a rectangular and/or substantially or essentially rectangular shape comprising sides that are the first virtual division line; the second virtual division line, the first reference line, and the second reference line. In some embodiments, the lane width is approximately 12 feet (e.g., 9-15 feet (e.g., 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, or 15.0 feet)). In some embodiments, the first CRM and the second CRM are adjacent CRM. In some embodiments, the first CRM and the second CRM are the two CRM of the network of CRM that are closest to a vehicle driving on the roadway driving lane. In some embodiments, methods further comprise providing a second virtual driving cell for a second driving lane using a first virtual driving cell provided for a first driving lane, wherein the second virtual driving cell is parallel to the first virtual driving cell and comprises the same and/or substantially same dimensions as the first virtual driving cell. In some embodiments, the first virtual driving cell is provided by the method for defining a virtual driving cell. In some embodiments, methods comprise repeating the method to provide a plurality of parallel virtual driving cells for multiple driving lanes.

In some embodiments, the VRCM defines a virtual driving cell for turning movements at an intersection and the virtual driving cell is configured as the area of the driving lane from the turn-starting point to the turn-ending point. In some embodiments, the VRCM defines a virtual driving cell for turning movements at a roundabout and the virtual driving cell is configured as the area of the driving lane from the turn-starting point to the turn-ending point. In some embodiments, the VRCM defines a virtual driving cell for an on-ramp segment, off-ramp segment, and/or interchange roadway segment and the virtual driving cell is configured as the area of the driving lane from the starting point to the ending point of the on-ramp segment, off-ramp segment, and/or interchange roadway segment. In some embodiments, the VRCM defines a virtual driving cell for a merging segment, diverging segment, and/or weaving segment and the virtual driving cell is configured as the area of the driving lane from the starting point to the ending point of the merging segment, diverging segment, and/or weaving segment. In some embodiments, the virtual driving lane identification module connects a network of virtual driving cells along the driving direction to form a virtual driving lane. In some embodiments, the virtual driving lane group identification module combines a plurality of parallel virtual driving lanes to form a virtual driving lane group. In some embodiments, the virtual driving grid identification module connects a plurality of virtual driving cells longitudinally and laterally to form a virtual driving grid and wherein a vehicle performs longitudinal and lateral movements over the virtual driving grid. In some embodiments, the VRCM is configured to provide virtual driving lanes that virtually mark actual driving lanes when the actual (e.g., physical) driving lanes are obscured. In some embodiments, the VRCM is configured to provide virtual driving lanes that virtually mark actual (e.g., physical) driving lanes when roads and/or road markings are obscured. For example, in some embodiments, the VRCM is configured to provide virtual driving lanes that virtually mark actual (e.g., physical) driving lanes during a weather event (e.g., snow, rain, hail, dust storm, sand storm, etc.) In some embodiments, the VRCM is configured to provide virtual driving lanes that virtually mark actual (e.g., physical) driving lanes during nighttime driving, heavy traffic, road damage, road construction, and/or a spill on the road. In some embodiments, the VRCM is configured to provide virtual driving lanes that virtually mark actual (e.g., physical) driving lanes when the roads and/or road markings are not optically detectable by either CAVH sensors or CAV sensors.

In some embodiments, the technology provides a central operations unit (COU) configured to manage and operate local location relationship tables for a CRM network and a virtual roadway configuration information for a roadway; and transmit the local location relationship tables and the virtual roadway configuration information to CRMs and/or vehicles. In some embodiments, the COU is an HD map-free COU and comprises a location relationship identification module to develop a set of local location relationship tables for CRM; a VRCM to provide virtual roadway configuration information comprising virtual driving cells, virtual driving lanes, virtual driving lane groups, and a virtual driving grid; and a communication module for transmitting the local location relationship tables and the virtual roadway configuration information to CRMs and vehicles. In some embodiments, the COU comprises a location relationship identification module to develop a set of local location relationship tables for CRM and key points of a central line of a driving lane; a VRCM to provide virtual roadway configuration information comprising virtual driving cells, virtual driving lanes, virtual driving lane groups, and a virtual driving grid;

a high-definition map including roadway lane configuration and CRM location information; and a communication module for transmitting the local location relationship tables, the virtual roadway configuration information, and the HD map to CRMs and vehicles. In some embodiments, the location relationship identification module identifies two CRMs and a key point of the central line of a driving lane and develops a local location relationship table to store local location reference information comprising identifiers of at least two CRM, the distance from the key point to each of the CRMs, and the angle between lines linking the key point with the two CRMs. In some embodiments, the central line of a driving lane comprises a plurality of line segments linking pairs of adjacent key points, wherein each line segment has a length ranging from a centimeter to 50 meters (e.g., 0.01, 0.10, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters).

In some embodiments, the COU is configured to provide local location relationship tables and virtual roadway configuration information for key points of a central line of a turning movement lane at an intersection, wherein the location relationship identification module identifies two CRMs installed at the corners of the intersection and a key point of the central line of a turning movement at the intersection; and develops a local location relationship table to store local location reference information comprising identifiers of the two CRM, the distance from the key point to each of the two CRMs, and the angle between lines linking the key point with the two CRMs. In some embodiments, the COU is configured to provide local location relationship tables and virtual roadway configuration information for key points of a central line of a movement lane at a roundabout, wherein the location relationship identification module identifies two CRMs installed at the corners and/or middle island of the roundabout; and develops a local location relationship table to store local location reference information comprising identifiers of the two CRM, the distance from the key point to each of the two CRMs, and the angle between lines linking the key point with the two CRMs. In some embodiments, a CRM stores the local location relationship tables and the virtual roadway configuration information transmits the local location relationship tables and the virtual roadway configuration information to vehicles driving by the CRM. In some embodiments, the CRM stores the local location relationship tables and the virtual roadway configuration information for a roadway segment having a length of 1 meter to 1 kilometer (e.g., 1 to 1000 meters (e.g., 1, 2, 5, 10, 20, 50, 100, 200, 500, or 1000 meters)) and comprising the CRM. In some embodiments, the COU transmits the local location relationship tables and the virtual roadway configuration information to CRM. In some embodiments, the COU transmits updated local location relationship tables and the virtual roadway configuration information to CRM. In some embodiments, the COU comprises a location relationship identification module that provides updates of the local location relationship tables for each CRM of the CRM network and for each key point of a central line of a driving lane; and the COU comprises a VRCM that provides updates of the virtual roadway configuration information when there is a change in CRM installation or at periodic time intervals.

In some embodiments, the COU is configured to support a traffic control unit (TCU)/traffic control center (TCC) (TCU/TCC). In some embodiments, the COU is configured to support a traffic operations center (TOC). In some embodiments, the COU is configured to support a cooperative management (CM) subsystem of an automated driving system (ADS).

In some embodiments, the technology provides an advanced connected reference marker system (A-CRM System) comprising a network of connected reference markers (CRM) installed along a roadway; a central operations unit (COU); and a roadside communication system. In some embodiments, the COU comprises a high-definition map. In some embodiments, the COU is HD map-free.

In some embodiments, the technology provides an onboard module (OBM) configured to be installed on a vehicle and to identify or receive the vehicle real-time position information. In some embodiments, the OBM is an OBM type 1 (OBM1) configured to receive CRM location information from a CRM and COU; and to identify the vehicle real-time position. In some embodiments, the OBM is an OBM type 2 (OBM2) configured to receive the vehicle real-time position from a roadside distance measurement unit (DMU).

In some embodiments, the OBM is an HD map-free OBM1 installed in a vehicle and comprises a communication module to receive location information for the network of CRMs and virtual roadway configuration information from the COU; a real-time position identification module for identifying the vehicle relative position with respect to CRMs and the virtual roadway configuration; and a computing module to match the vehicle real-time position with the location of the network of CRMs and the virtual roadway configuration. In some embodiments, the real-time position identification module comprises an onboard Distance Measurement Unit (DMU) to measure the distances from the vehicle to at least two CRMs. In some embodiments, the onboard DMU comprises a data storage module; a communication module; and a Distance Measurement Device (DMD) comprising a radar, lidar, camera, BLUETOOTH component, and/or cellular transceiver. In some embodiments, the radar is a millimeter radar, a microwave radar, an infrared radar, or an ultrasonic radar. In some embodiments, the real-time position identification module uses a network of wireless signal units (WSU) to measure distances from the vehicle to at least two WSU. In some embodiments, the WSU is co-located with a CRM and the WSU and CRM have the same location information.

In some embodiments, the real-time position identification module is configured to perform a method for measuring distances from the vehicle to at least two WSUs and associated CRMs, the method comprising transmitting, by a WSU, a ranging signal; receiving, by an OBM of the vehicle, the ranging signal and WSU location information; computing, by the real-time position identification module, the distances between the vehicle and the WSUs and associated CRMs using the ranging signal and the WSU location information. In some embodiments, the real-time position identification module uses a triangular position identification method to calculate the vehicle relative position with respect to two CRMs. In some embodiments, the triangular position identification method is a two-dimensional method for a level grade road. In some embodiments, the triangular position identification method is a three-dimensional method for a road comprising an upgrade or a downgrade.

In some embodiments, the computing module matches the vehicle real-time position with the location of the network of CRMs and the virtual roadway configuration. In some embodiments, the vehicle uses the vehicle real-time position information and the virtual roadway configuration information to maintain lane keeping. In some embodiments, the vehicle uses the vehicle real-time position information and the virtual roadway configuration information to perform longitudinal and lateral movement within a virtual driving cell of a virtual driving grid.

In some embodiments, the OBM is an OBM1 installed in a vehicle and comprises a communication module to receive location information for a network of CRMs, a local location relationship table of key points of a central line of a driving lane, and a virtual roadway configuration information from a COU; a high-definition map including lane configuration and CRM location information; a real-time position identification module for identifying the vehicle relative position with respect to CRMs, key points of the central line of a driving lane, and a virtual roadway configuration; and a computing module to match the vehicle real-time position with the location of the CRM of the network of CRMs, the key points of the central line of a driving lane, and the virtual roadway configuration. In some embodiments, the real-time position identification module comprises an onboard DMU to measure distances from the vehicle to at least two CRMs. In some embodiments, the onboard DMU is comprises a radar, lidar, camera, BLUETOOTH component, and/or cellular transceiver. In some embodiments, the radar is a millimeter radar, a microwave radar, an infrared radar, or an ultrasonic radar. In some embodiments, the real-time position identification module uses a network of WSU to measure distances from the vehicle to at least two WSUs. In some embodiments, the WSU is co-located with a CRM and the WSU and CRM have the same location information. In some embodiments, the real-time position identification module is configured to perform a method for measuring distances from the vehicle to at least two WSUs and associated CRMs, the method comprising transmitting, by a WSU, a ranging signal; receiving, by an OBM of the vehicle, the ranging signal and WSU location information; computing, by the real-time position identification module, the distances between the vehicle and the WSUs and associated CRMs using the ranging signal and the WSU location information. In some embodiments, the real-time position identification module uses a triangular position identification method to calculate the vehicle relative position with respect to CRMs. In some embodiments, the triangular position identification method is a two-dimensional method for a level grade road. In some embodiments, the triangular position identification method is a three-dimensional method for a road comprising an upgrade or a downgrade. In some embodiments, the WSU is configured to support a roadside intelligent unit (RIU) system or an intelligent roadside toolbox (IRT) system. In some embodiments, the WSU is configured to support an IRIS.

In some embodiments, the OBM is an HD map-free OBM2 installed in a vehicle and comprises a communication module to receive location information for the network of CRMs and virtual roadway configuration information from the COU and to receive information of the vehicle relative position with respect to CRMs from a Distance Measurement Unit (DMU) on the roadside; and a computing module to match the vehicle real-time position with the location of the network of CRMs and virtual roadway configuration. In some embodiments, the DMU is configured to be installed along the roadway and comprises a Distance Measurement Device (DMD) configured to measure the distance from a vehicle to the DMD; a storage device storing lane configuration information, CRM location information, and DMU location information; a computing module to match the vehicle real-time position with the location of DMUs and the network of CRMs; and a communication module to transmit the vehicle real-time location information to the vehicle, to the network of DMUs, and to the network of CRMs. In some embodiments, the DMD comprises a radar, lidar, camera, BLUETOOTH component, and/or cellular transceiver. In some embodiments, the radar is a millimeter radar, microwave radar, infrared radar, or ultrasonic radar. In some embodiments, the DMU is co-located with a CRM and the DMU and the CRM have the same location information.

In some embodiments, the OBM is an OBM2 installed in a vehicle and comprises a communication module to receive location information for a network of CRMs, a local location relationship table of key points of a central line of a driving lane, and a virtual roadway configuration information from the COU, and to receive information of vehicle relative position with respect to CRMs from a DMU on the roadside; a high-definition map including lane configuration and CRM location information; and a computing module to match the vehicle real-time position with the location of CRM of the network of CRMs, the key points of the central line of a driving lane, and the virtual roadway configuration. In some embodiments, the DMU is configured to be installed along the roadway and comprises a Distance Measurement Device (DMD) to measure the distance from the vehicle to the DMD; a storage device storing lane configuration information, CRM location information, and DMU location information; a computing module to match the vehicle real-time position with the location of DMUs and the network of CRMs; and a communication module to transmit the vehicle real-time location information to the vehicle, to the network of DMUs, and to the network of CRMs. In some embodiments, the Distance Measurement Device (DMD) comprises a radar, lidar, camera, BLUETOOTH component, and/or cellular transceiver. In some embodiments, the radar is a millimeter radar, microwave radar, infrared radar, or ultrasonic radar. In some embodiments, the DMU is co-located with a CRM and the DMU and the CRM have the same location information. In some embodiments, the vehicle uses the vehicle real-time position information, virtual roadway configuration information, or a local location relationship table of key points of a central line of a driving lane to maintain lane keeping. In some embodiments, the vehicle uses the vehicle real-time position information, virtual roadway configuration information, or a local location relationship table of key points of a central line of a driving lane to perform longitudinal and lateral movement within a virtual driving cell of a virtual driving grid. In some embodiments, the OBM is configured to support a vehicle intelligent unit (VIU).

In some embodiments, the technology provides a vehicle-centric connected reference marker system (V-CRM System) comprising a network of CRM installed along a roadway, a COU, a roadside communication system, an OBM1 installed on a vehicle, and a DMU installed on a vehicle. In some embodiments, a CRM of the network of CRM provides a local location reference and/or an object reference to support identifying the locations and positions of objects on a roadway and in the driving environment for a vehicle; and detecting and identifying objects on the roadway and in the driving environment for a vehicle. In some embodiments, the COU is configured to manage and operate local location relationship tables for the network of CRM, virtual roadway configuration information for a roadway, or local location relationship tables for key points of a central line of a driving lane; and transmit the local location relationship tables, the virtual roadway configuration information, or the local location relationship tables for key points of a central line of a driving lane to CRMs and vehicles. In some embodiments, the roadside communication system is configured to provide the means for communication and information sharing among CRMs, COU, and vehicles. In some embodiments, the DMU is configured to measure the distances from the vehicle to at least two CRMs. In some embodiments, the OBM1 is configured to identify and match the vehicle relative position with respect to CRMs, a virtual roadway configuration, or key points of a central line of a driving lane. In some embodiments, the vehicle uses the vehicle real-time position information, virtual roadway configuration information, or key points of the central line of a driving lane to maintain lane keeping. In some embodiments, the vehicle uses the vehicle real-time position information, virtual roadway configuration information, or key points of the central line of a driving lane to perform longitudinal and lateral movement within a virtual driving cell of a virtual driving grid. In some embodiments, the V-CRM System comprises one or more of the subcomponents that is a physical subsystem. In some embodiments, the V-CRM System is configured to support an automated driving system (ADS). In some embodiments, the V-CRM System is configured to support a connected and automated vehicle highway (CAVH) system. In some embodiments, the V-CRM System is configured to support an ADS by providing one or more CRM and an OBM1 to the ADS. In some embodiments, the V-CRM System is configured to support an ADS for all weather conditions by providing a number of CRM and an OBM1 to the ADS. In some embodiments, the V-CRM System is configured to support an ADS when the roads and road markings are not optically detectable by either CAVH sensors or CAV sensors by providing a number of CRMs and an OBM1 to the ADS.

In some embodiments, the technology provides a communication-based connected reference marker system (C-CRM System) comprising a network of Connected Reference Markers (CRM) installed along a roadway, a Central Operations Unit (COU), a roadside communication system, an Onboard Module 1 (OBM1) installed on a vehicle, and a network of Wireless Signal Unit (WSU) installed along a roadway. In some embodiments, a CRM of the network of CRM provides a local location reference and/or an object reference to support identifying the locations and positions of objects on a roadway and in the driving environment for a vehicle; and detecting and identifying objects on the roadway and in the driving environment for a vehicle. In some embodiments, the COU is configured to manage and operate local location relationship tables for the network of CRM, virtual roadway configuration information for a roadway, or local location relationship tables for key points of a central line of a driving lane; and transmit the local location relationship tables, the virtual roadway configuration information, or the local location relationship tables for key points of a central line of a driving lane to CRMs and vehicles. In some embodiments, the roadside communication system is configured to provide the means for communication and information sharing among CRMs, COU, and vehicles. In some embodiments, the WSU is configured to comprise a wireless signal transmitting device installed along the roadway to transmit a ranging signal. In some embodiments, the WSU further comprises a power supply. In some embodiments, the ranging signal is transmitted to vehicles. In some embodiments, the OBM1 is configured to receive real-time ranging signals from an WSU of the network of WSU; calculate distances from the vehicle to at least two WSUs and associated CRMs; and identify and match the vehicle relative position with respect to CRMs, a virtual roadway configuration, or key points of a central line of a driving lane. In some embodiments, the vehicle uses the vehicle real-time position information, virtual roadway configuration information, or a local location relationship table of key points of a central line of a driving lane to maintain lane keeping. In some embodiments, the vehicle uses the vehicle real-time position information, virtual roadway configuration information, or a local location relationship table of key points of a central line of a driving lane perform longitudinal and lateral movement within a virtual driving cell of a virtual driving grid. In some embodiments, the C-CRM System comprises one or more of the subcomponents that is a physical subsystem. In some embodiments, the C-CRM System is configured to support an automated driving system (ADS). In some embodiments, the C-CRM System is configured to support a connected and automated vehicle highway (CAVH) system. In some embodiments, the C-CRM System is configured to support an ADS by providing one or more Connected Reference Markers (CRM) and an OBM1 to the ADS. In some embodiments, the C-CRM System is configured to support an ADS for all weather conditions by providing one or more Connected Reference Markers (CRM) and an OBM1 to the ADS. In some embodiments, the C-CRM System is configured to support an ADS when the roads and road markings are not optically detectable by either CAVH sensors or CAV sensors by providing one or more CRMs and an OBM1 to the ADS.

In some embodiments, the technology provides a road-centric connected reference marker system (R-CRM System) comprising a network of Connected Reference Markers (CRM) installed along a roadway, a Central Operations Unit (COU), a roadside communication system, an Onboard Module 2 (OBM2) installed on a vehicle, and a network of Distance Measurement Units (DMU) installed along a roadway. In some embodiments, a CRM of the network of CRM provides a local location reference and/or an object reference to support identifying the locations and positions of objects on a roadway and in the driving environment for a vehicle; and detecting and identifying objects on the roadway and in the driving environment for a vehicle. In some embodiments, the COU is configured to manage and operate local location relationship tables for the network of CRM, virtual roadway configuration information for a roadway, or local location relationship tables for key points of a central line of a driving lane; and transmit the local location relationship tables, the virtual roadway configuration information, or the local location relationship tables for key points of a central line of a driving lane to CRMs and vehicles. In some embodiments, the roadside communication system is configured to provide the means for communication and information sharing among CRMs, COU, and vehicles. In some embodiments, a roadside DMU of the network of DMU comprises a Distance Measurement Device (DMD) installed along the roadway to measure a distance from the vehicle to the DMD; a storage device storing lane configuration information, CRM location information, and DMU location information; a computing module to match the vehicle real-time position with the location of DMUs and the network of CRMs; and a communication module to transmit the vehicle real-time location information to the vehicle, to the network of DMUs, and to the network of CRMs. In some embodiments, the DMD comprises a radar, lidar, camera, BLUETOOTH component, and/or cellular transceiver. In some embodiments, the radar is a millimeter radar, microwave radar, infrared radar, or ultrasonic radar. In some embodiments, the DMU computing module uses a triangular position identification method to identify the vehicle relative position with respect to DMUs and a virtual roadway configuration. In some embodiments, the triangular position identification method comprises a two-dimensional method for a level grade road. In some embodiments, the triangular position identification method comprises a three-dimensional method for a road with an upgrade or a downgrade. In some embodiments, a roadside DMU of the network of DMU is configured to identify the locations and positions of objects on a roadway and in the driving environment for a vehicle; and detect and identify objects on the roadway and in the driving environment for a vehicle. In some embodiments, objects on the roadway and driving environment comprise a vehicle, bicycle, pedestrian, animal, obstacle, construction, incident, signage, marking, or traffic control device. In some embodiments, the OBM2 is configured to receive real-time location information of the vehicle from a roadside DMU of the network of DMU; and match the vehicle relative position with respect to CRMs, a virtual roadway configuration, or key points of a central line of a driving lane. In some embodiments, the OBM2 is configured to receive real-time location information and identification information of objects on the roadway and in the driving environment for a vehicle from the roadside DMU; and match the objects' relative positions with respect to CRMs, a virtual roadway configuration, or key points of a central line of a driving lane.

In some embodiments, the vehicle uses the vehicle real-time position information, virtual roadway configuration information, or the local location relationship table of key points of a central line of a driving lane to maintain lane keeping. In some embodiments, the vehicle uses the vehicle real-time position information, virtual roadway configuration information, or the local location relationship table of key points of a central line of a driving lane to perform longitudinal and lateral movement within a virtual driving cell of a virtual driving grid. In some embodiments, the vehicle uses the vehicle real-time position information, real-time location and identification information of objects affecting the vehicle driving on the roadway and driving environment, virtual roadway configuration information, or a local location relationship table of key points of a central line of a driving lane to perform longitudinal and lateral movement within a virtual driving cell of a virtual driving grid. In some embodiments, the R-CRM System comprises one or more subcomponents that is a physical subsystem. In some embodiments, the R-CRM System is configured to support an automated driving system (ADS). In some embodiments, the R-CRM System is configured to support a connected and automated vehicle highway (CAVH) system. In some embodiments, the R-CRM System is configured to support an ADS by providing one or more Connected Reference Markers (CRM) and an OBM2 to the ADS. In some embodiments, the R-CRM System is configured to support an ADS for all weather conditions by providing one or more Connected Reference Markers (CRM) and an OBM2 to the ADS. In some embodiments, the R-CRM System is configured to support an ADS when the roads and road markings are not optically detectable by either CAVH sensors or CAV sensors by providing one or more CRMs and an OBM2 to the ADS. In some embodiments, the roadside DMU is configured to support an RIU system or an IRT system. In some embodiments, the roadside DMU is configured to support an IRIS system.

Also provided herein are methods employing any of the systems described herein for the management of one or more aspects of automated driving and/or for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other. For example, in some embodiments, the technology provides a method of controlling vehicles and/or managing traffic by providing a connected reference marker system, a virtual roadway configuration module, a central operations unit, an onboard unit, a wireless signal unit, and/or a distance measuring unit. In some embodiments, the CRM System is an advanced connected reference marker system, a vehicle-centric connected reference marker system, a communication-based connected reference marker system, or a road-centric connected reference marker system. In some embodiments, methods further comprise providing a CAVH System, an IRIS, or an IRT.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all steps, operations, or processes described.

In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet; CAVH, IRIS, and/or a cellular network). See, e.g., U.S. Pat. App. Pub. No. 20200005633, incorporated herein by reference.

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

FIG. 1B is a schematic drawing showing the components and architecture of the Advanced CRM System (A-CRM System). 104: Advanced CRM System; 105: COU; 106: CRM; 103: Roadside Communication.

FIG. 2A is a schematic drawing showing the design and configuration of a CRM. 201: CRM; 202: Power Supply Unit; 203: Data Storage Module; 204: Communication Module.

FIG. 2B is a schematic drawing showing the design and configuration of a CRM. 201: CRM; 202: Power Supply Unit; 203: Data Storage Module; 204: Communication Module; 205: Data Processing Module.

Figure 1A:
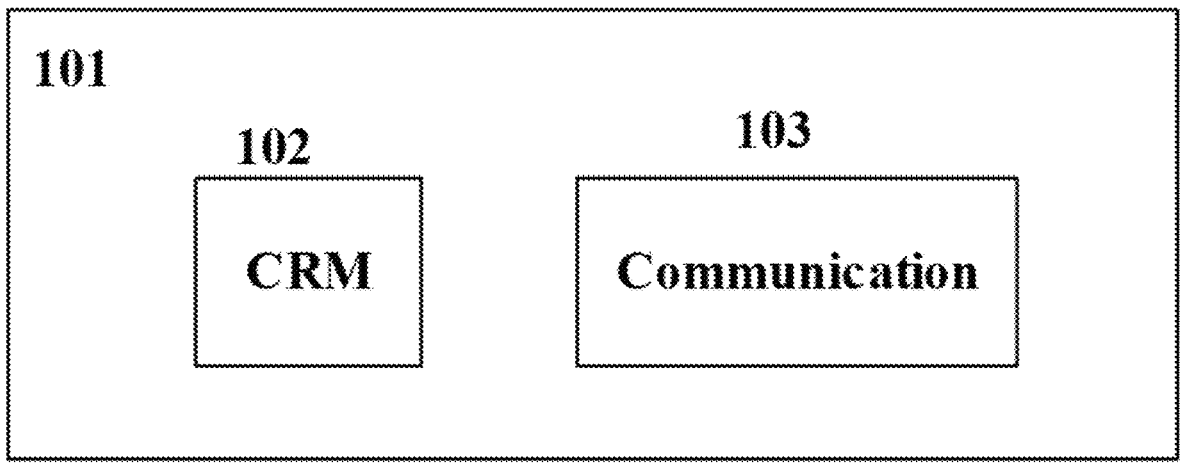
FIG. 1A is a schematic drawing showing the components and architecture of the basic CRM System. 101: Basic CRM System; 102: CRM; 103: Roadside Communication.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to automated driving and particularly, but not exclusively, to a connected reference marker technology configured to serve automated driving systems by providing, supplementing, and/or enhancing autonomous driving functions for connected automated vehicles under normal and abnormal driving scenarios.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present" or "absent") is used in a relative sense to describe the amount or level of a particular entity (e.g., component, action, element). For example, when an entity is said to be "present", it means the level or amount of this entity is above a pre-determined threshold; conversely, when an entity is said to be "absent", it means the level or amount of this entity is below a pre-determined threshold. The pre-determined threshold may be the threshold for detectability associated with the particular test used to detect the entity or any other threshold. When an entity is "detected" it is "present"; when an entity is "not detected" it is "absent".

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, the term "number" shall mean one or an integer greater than one (e.g., a plurality).

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods. For example, a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform a function of the system or subsystem. Thus, the methods and apparatus of the embodiments, or certain aspects or portions thereof, may take the form of program code (e.g., instructions) embodied in tangible media, such as floppy diskettes, CD-ROMs, hard drives, flash memory, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (e.g., volatile and non-volatile memory and/or storage elements), at least one input device, and at least one output device. One or more programs may implement or utilize the processes described in connection with the embodiments, e.g., through the use of an application programming interface (API), reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and combined with hardware implementations.

As used herein, the term "long-tail" scenario, event, environment, etc. refers to a scenario, event, environment, etc. that occurs at a low frequency and/or a scenario, event, environment, etc. that is predicted to occur with a low probability. Exemplary long-tail scenarios, events, and/or environments include, but are not limited to, vehicle accidents; special events (e.g., sports events, hazard evacuation, etc.); construction and/or work zones; extreme and/or adverse weather (e.g., snowstorm, icy road, heavy rain, etc.); hazardous roads (e.g. animals on roads, rough roads, gravel, bumpy edges, uneven expansion joints, slick surfaces, standing water, debris, uphill grade, downhill grade, sharp turns, no guardrails, narrow road, narrow bridge, etc.); unclear road markings, unclear signing, and/or unclear geometric designs; high density of pedestrians and/or bicycles.

As used herein, the term "automated driving system" (abbreviated "ADS") refers to a system that performs driving tasks (e.g. lateral and longitudinal control of the vehicle) for a vehicle and thus allows a vehicle to drive with reduced human control of driving tasks and/or without human control of driving tasks. As used herein, the term a "Collaborative Automated Driving System" ("CADS") refers to a system (e.g., an ADS) configured to manage and/or control connected and automated vehicles (CAV) by sending individual vehicles with detailed and time-sensitive control instructions for lateral and longitudinal movement of vehicles. In some embodiments, the CADS comprises a cooperative management (CM) subsystem; a road subsystem; a vehicle subsystem; a user subsystem; a communications subsystem; and/or a supporting subsystem. In some embodiments, the CM subsystem is configured to process information, coordinate and allocate resources, and/or send traffic operations instructions to the road subsystem; the vehicle subsystem; the user subsystem; the communications subsystem; and/or a supporting subsystem. See U.S. Pat. App. Ser. No. 63/149,804, which is incorporated herein by reference.

As used herein, the term "Connected Automated Vehicle Highway System" ("CAVH System") refers to a comprehensive system (e.g., an ADS) providing full vehicle operations and control for connected and automated vehicles (CAV), and, more particularly, to a system controlling CAVs by sending individual vehicles with detailed and time-sensitive control instructions for vehicle following, lane changing, route guidance, and related information. A CAVH system comprises sensing, communication, and control components connected through segments and nodes that manage an entire transportation system. CAVH systems comprise four control levels: vehicle; roadside unit (RSU), which, in some embodiments, is similar to or the same as a roadside intelligent unit (RIU); traffic control unit (TCU) or traffic control center (TCC); and traffic operations center (TOC). See U.S. Pat. Nos. 10,380,886; 10,867,512; and/or 10,692,365, each of which is incorporated herein by reference.

As used herein, the term "Intelligent Road Infrastructure System" ("IRIS") or "Mobile Intelligent Road Infrastructure System" ("MIRIS") refer to a system that facilitates vehicle operations and control for CAVH systems. See U.S. Pat. Nos. 10,867,512; 10,692,365; and U.S. Pat. App. Ser. No. 63/155,545, each of which is incorporated herein by reference. In some embodiments, an IRIS provides transportation management and operations and individual vehicle control for connected and automated vehicles (CAV). For example, in some embodiments, an IRIS provides a system for controlling CAVs by sending individual vehicles with customized, detailed, and time-sensitive control instructions and traffic information for automated vehicle driving, such as vehicle following, lane changing, route guidance, and other related information.

As used herein, the term "Vehicle Intelligent Unit" ("VIU") refers to a system that is configured to provide vehicle operations and control for Connected Automated Vehicles (CAV) and, more particularly, to a VIU configured to connect with a Collaborative Automated Driving System (CADS) and manage and/or control information exchange between CAV and CADS and manage and/or control CAV lateral and longitudinal movements, including vehicle following, lane changing, and route guidance. See U.S. Pat. App. Ser. No. 63/175,158, which is incorporated herein by reference.

As used herein, the term "GPS" refers to a global navigation satellite system (GNSS) that provides geolocation and time information to a receiver. Examples of a GNSS include, but are not limited to, the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "automated vehicle" (abbreviated as "AV") refers to an automated vehicle in an automated mode, e.g., at any level of automation (e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference)).

As used herein, the term "scene" refers to an environment in which a vehicle operates or in which an object sensed by the ADS (e.g., CAVH system) operates and/or is present. In some embodiments, a "scene" is a view of an object or of a volume of space from a particular point and looking in a particular direction in three-dimensional space. In some embodiments, a "scene" comprises static and/or dynamic objects sensed by the ADS, MIRIS, IRIS, and/or CAVH system. In some embodiments, static and/or dynamic objects in a scene are identified by coordinates within the scene. In some embodiments, the technology provides (e.g., constructs) a scene that is a virtual model or reproduction of the scene sensed by the ADS, MIRIS, IRIS, and/or CAVH system. Accordingly, in some embodiments, a "scene" (e.g., the environment sensed by a vehicle and/or the composite of information sensed by an ADS, MIRIS, IRIS, or CAVH system describing the environment of the vehicle) changes as a function of time (e.g., as a function of the movement of vehicles and/or objects in the scene). In some embodiments, a "scene" for a particular vehicle changes as a function of the motion of the vehicle through a three-dimensional space (e.g., change in location of a vehicle in three-dimensional space).

As used herein, the term "allocate", "allocating", and similar terms referring to resource distribution also include distributing, arranging, providing, managing, assigning, controlling, and/or coordinating resources.

As used herein, the term "resource" refers to computational capacity (e.g., computational power, computational cycles, etc.); memory and/or data storage capacity; sensing capacity; communications capacity (e.g., bandwidth, signal strength, signal fidelity, etc.); and/or electrical power.

As used herein, the term "service" refers to a process, a function that performs a process, and/or to a component or module that is configured to provide a function that performs a process.

As used herein, the term "connected vehicle" or "CV" refers to a connected vehicle, e.g., configured for any level of communication (e.g., V2V, V2I, and/or I2V).

As used herein, the term "connected and autonomous vehicle" or "CAV" refers to an autonomous vehicle that is able to communicate with other vehicles (e.g., by V2V communication), with roadside intelligent units (RIU), traffic control signals, and/or other infrastructure (e.g., an ADS or component thereof) or devices. That is, the term "connected autonomous vehicle" or "CAV" refers to a connected autonomous vehicle having any level of automation (e.g., as defined by SAE International Standard J3016 (2014)) and communication (e.g., V2V, V2I, and/or I2V).

As used herein, the term "data fusion" refers to integrating a plurality of data sources to provide information (e.g., fused data) that is more consistent, accurate, and useful than any individual data source of the plurality of data sources.

As used herein, the term "configured" refers to a component, module, system, subsystem, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "reliability" refers to a measure (e.g., a statistical measure) of the performance of a system without failure and/or error. In some embodiments, reliability is a measure of the length of time and/or number of functional cycles a system performs without a failure and/or error.

As used herein, the term "support" when used in reference to one or more components of an ADS, CAVH, CAV, and/or a vehicle providing support to and/or supporting one or more other components of the ADS, CAVH, CAV, and/or a vehicle refers to, e.g., exchange of information and/or data between components and/or levels of the ADS, CAVH, CAV, and/or a vehicles; sending and/or receiving instructions between components and/or levels of the ADS, CAVH, CAV, and/or a vehicles; and/or other interaction between components and/or levels of the ADS, CAVH, CAV, and/or a vehicles that provide functions such as information exchange, data transfer, messaging, and/or alerting.

As used herein, the term "ADS component" or "component of an ADS" refers individually and/or collectively to one or more of components of an ADS and/or a CAVH system, e.g., a VIU, RIU, IRT, TCC, TCU, TCC/TCU, TOC, CAV, a supporting subsystem, and/or a cloud component.

As used herein, the term "roadside intelligent unit" (abbreviated "RSU or "RIU") may refer to one RIU, a plurality of RIU, and/or a network of RIU.

As used herein, the term "mobile roadside intelligent unit" (abbreviated "MRIU") refers to a mobile RIU. In some embodiments, the MRIU is provided on a mobile component and/or platform comprising wheels (e.g., for deployment on land). In some embodiments, the MRIU is provide on a platform for deployment in the air (e.g., comprising wings, a propeller, a balloon, etc.) or in the water (e.g., comprising a buoyant component, a propeller, etc.)

As used herein, the term "intelligent roadside toolbox" (abbreviated "IRT") refers to a system configured to provide a virtual automated driving service to vehicles. In some embodiments, the IRT system is configured to share information and/or driving instructions between vehicles and other automated driving information entities. See U.S. Pat. App. Ser. No. 63/004,551, which is incorporated herein by reference.

As used herein, the term "key point" refers to a portion or region of a road that is identified as appropriate to be provided embodiments of the CRM System technology provided herein. In some embodiments, a "key point" is a point (e.g., region or location) of a road that is used by a vehicle to make a movement decision in autonomous driving. In some embodiments, a road segment linking two adjacent key points has a length ranging from 1 centimeter to 50 meters (e.g., 0.01, 0.10, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters).

As used herein, the term "critical point" refers to a portion or region of a road that is identified as appropriate to be provided embodiments of the CRM System technology provided herein. In some embodiments, a critical point is categorized as a "static critical point" and in some embodiments, a critical point is categorized as a "dynamic critical point". As used herein, a "static critical point" is a point (e.g., region or location) of a road that is a critical point based on identification of road and/or traffic conditions that are generally constant or that change very slowly (e.g., on a time scale longer than a day, a week, or a month) or only by planned reconstruction of infrastructure. As used herein, a "dynamic critical point" is a point (e.g., region or location) of a road that is a critical point based on identification of road conditions that change (e.g., predictably or not predictably) with time (e.g., on a time scale of an hour, a day, a week, or a month). Critical points based on historical crash data, traffic signs, traffic signals, traffic capacity, and road geometry are exemplary static critical points. Critical points based on traffic oscillations, real-time traffic management, or real-time traffic incidents are exemplary dynamic critical points.

In some embodiments, critical points are identified using, e.g., historical crash data (e.g., the top 20% (e.g., top 15-25% (e.g., top 15, 16, 17, 18, 19, 20, 21, 22, 23, 24, or 25%)) most frequent crash points in a road system are identified as critical points); traffic signs (e.g., where certain traffic signs (e.g., accident-prone areas) are detected are identified as critical points); traffic capacity (e.g., the top 20% (e.g., top 15-25% (e.g., top 15, 16, 17, 18, 19, 20, 21, 22, 23, 24, or 25%)) highest traffic capacity areas are identified as critical points); road geometry (e.g., roads with critical road geometry (e.g., curves, blind spots, hills, intersections (e.g., signalized intersections, stop sign intersections, yield sign intersections), roundabouts) are identified as critical points); traffic oscillation (e.g., points with significant traffic oscillations are identified as critical points); real-time traffic management (e.g., points with potential traffic management are identified as critical points); and/or real-time traffic incident (e.g., points with traffic incidents (e.g., accident, crash, congestion, construction or maintenance, weather-related event, etc.) or vehicle malfunction are identified as critical points).

As used herein, the automation and/or intelligence levels of vehicles (V), infrastructure (I), and system (S) are described with respect to an "intelligence level" and/or an "automation level". In some embodiments, the vehicle intelligence and/or automation level is one of the following: V0: No automation functions; V1: Basic functions to assist a human driver to control a vehicle; V2: Functions to assist a human driver to control a vehicle for simple tasks and to provide basic sensing functions; V3: Functions to sense the environment in detail and in real-time and to complete relatively complicated driving tasks; V4: Functions to allow vehicles to drive independently under limited conditions and sometimes with human driver backup; and V5: Functions to allow vehicles to drive independently without human driver backup under all conditions. As used herein, a vehicle having an intelligence level of 1.5 (V1.5) refers to a vehicle having capabilities between vehicle intelligence 1 and vehicle intelligence level 2, e.g., a vehicle at V1.5 has minimal or no automated driving capability but comprises capabilities and/or functions (e.g., hardware and/or software) that provide control of the V1.5 vehicle by a CAVH system (e.g., the vehicle has "enhanced driver assistance" or "driver assistance plus" capability).

In some embodiments, the infrastructure intelligence and/or automation level is one of the following: I0: No functions; I1: Information collection and traffic management wherein the infrastructure provides primitive sensing functions in terms of aggregated traffic data collection and basic planning and decision making to support simple traffic management at low spatial and temporal resolution; I2: I2X and vehicle guidance for driving assistance, wherein, in addition to functions provided in I1, the infrastructure realizes limited sensing functions for pavement condition detection and vehicle kinematics detection, such as lateral and/or longitudinal position, speed, and/or acceleration, for a portion of traffic, in seconds or minutes; the infrastructure also provides traffic information and vehicle control suggestions and instructions for the vehicle through I2X communication; I3: Dedicated lane automation, wherein the infrastructure provides individual vehicles with information describing the dynamics of surrounding vehicles and other objects on a millisecond time scale and supports full automated driving on CAVH-compatible vehicle dedicated lanes; the infrastructure has limited transportation behavior prediction capability; I4: Scenario-specific automaton wherein the infrastructure provides detailed driving instructions for vehicles to realize full automated driving in certain scenarios and/or areas, such as locations comprising predefined geofenced areas, where the traffic is mixed (e.g., comprises automated and non-automated vehicles); essential vehicle-based automation capability, such as emergency braking, is provided as a backup system in case the infrastructure fails; and I5: Full infrastructure automation wherein the infrastructure provides full control and management of individual vehicles under all scenarios and optimizes a whole road network where the infrastructure is deployed; vehicle automation functionality is not necessary provided as a backup; full active safety functions are available.

In some embodiments, the system intelligence and/or automation level is one of the following: S0: no function; S1: the system provides simple functions for individual vehicles such as cruise control and passive safety function; the system detects the vehicle speed, location, and distance; S2: the system comprises individual intelligence and detects vehicle functioning status, vehicle acceleration, and/or traffic signs and signals; individual vehicles make decisions based on their own information and have partially automated driving to provide complicated functions such as assisting vehicle adaptive cruise control, lane keeping, lane changing, and automatic parking; S3: the system integrates information from a group of vehicles and behaves with ad-hoc intelligence and prediction capability, the system has intelligence for decision making for the group of vehicles and can complete complicated conditional automated driving tasks such as cooperative cruise control, vehicle platooning, vehicle navigation through intersections, merging, and diverging; S4: the system integrates driving behavior optimally within a partial network; the system detects and communicates detailed information within the partial network and makes decisions based on both vehicle and transportation information within the network and handles complicated, high level automated driving tasks, such as navigating traffic signal corridors, and provides optimal trajectories for vehicles within a small transportation network; S5: vehicle automation and system traffic automation, wherein the system optimally manages an entire transportation network; the system detects and communicates detailed information within the transportation network and makes decisions based on all available information within the network; the system handles full automated driving tasks, including individual vehicle tasks and transportation tasks, and coordinates all vehicles to manage traffic.

In some embodiments, the system dimension is dependent on the vehicle and infrastructure dimensions, e.g., as represented by the following equation (S=system automation; V=vehicle intelligence; and I=infrastructure intelligence):

$$S=f(V,I)$$

One of ordinary skill in the art may refer to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), which provides additional understanding of terms used in the art and herein.

As used herein, the term "longitudinal" when used to refer to the position and/or direction of vehicle movement and/or vehicle control refers to a direction that is generally in the direction of vehicle travel.

As used herein, the term "lateral" when used to refer to the position and/or direction of vehicle movement and/or vehicle control refers to a direction that is generally perpendicular to the direction of vehicle travel.

As used herein, the term "virtually mark" (e.g., "virtually mark a lane" or "virtually mark lanes") refers to a method comprising digitally coding and/or referencing a number of driving lane(s) to provide a number of "virtually marked" lane(s) that are detectable, identifiable, and/or otherwise understandable by a vehicle computer system when the vehicle sensing system for optically detecting, identifying, and/or otherwise understanding driving lanes using physical and/or visual lane markings is impaired, e.g., by extreme weather conditions.

As used herein, the term "weather event" refers to a weather-related event that impairs, hinders, and/or otherwise decreases the effectiveness, efficiency, and/or safety of driving or automated driving. In some embodiments, a "weather event" obscures the physical driving lanes and/or the markings and/or identifiers of physical driving lanes such that optical detection of physical driving lanes and/or the markings and/or identifiers of physical driving lanes is impaired, hindered, and/or otherwise decreased. A "weather event" may include, but is not limited to, hail, rain, snow, sandstorm, duststorm, etc.

As used herein, the term "identifier" is a unique digital identifying signal for a device (e.g., a CRM, an OBM, a WSU, a DMU) that is used to identify the device. The unique identifying signal may be stored in an electronic subcomponent of the device, e.g., a subscriber identity module (SIM) card, a radio frequency identification (RFID) tag, or other chip that is configured to store the unique digital identifying signal and transmit the unique digital identifying signal (optionally, in reply to a request from another device, system, system component (e.g., a vehicle), etc. to provide the unique digital identifying signal). Examples of unique digital identifying signals include, e.g., a digital certificate, an international mobile equipment identity (IMEI) number, a media access control (MAC) address, an internet of things device identifier, and equivalents or versions thereof.

As used herein, the term "location reference" refers to a physical component having a known location (e.g., provided in geographical coordinates (e.g., longitude, latitude, and/or altitude)) and that may therefore provide (e.g., communicate) a location for itself or for an object (e.g., component, device, vehicle) to which the component is attached.

As used herein, the term "location reference information" refers to data describing the location (e.g., provided in geographical coordinates (e.g., longitude, latitude, and/or altitude)) of a location reference.

As used herein, the term "location information" refers to data describing the location (e.g., provided in geographical coordinates (e.g., longitude, latitude, and/or altitude)) of an object (e.g., component, device, vehicle). Accordingly, "CRM location information" refers to data describing the location (e.g., provided in geographical coordinates (e.g., longitude, latitude, and/or altitude)) of a CRM, "WSU location information" refers to data describing the location (e.g., provided in geographical coordinates (e.g., longitude, latitude, and/or altitude)) of a WSU, etc.

As used herein, the term "object reference" refers to a physical component associated (e.g., attached to, installed on) with an object (e.g., component, device, vehicle) and that may be used to detect and/or identify the object by identifying the object associated with the object reference (e.g., by providing (e.g., transmitting) data describing the object) and/or by providing a detectable signal for detecting the object reference associated with the object and thus detecting the object. The "object reference" may provide (e.g., communicate) "object reference information" comprising data describing an identity, a class, or a type of the object with which the object reference is associated.

As used herein, the term "central line of a driving lane" refers to a line (e.g., a virtual and/or imaginary line) defining the center (e.g., the substantial and/or effective center) of a driving lane and thus defines the average driving path of the lateral center of a vehicle driving normally on the driving lane.

As used herein, the term "lane configuration" refers to the lane type, lane size (e.g., width), lane markings, driving path, and/or lane surface of actual, physical driving lanes on a road. The "lane configuration" may also include the number of lanes in a group of parallel lanes and/or the configuration (e.g., design, map, geometry, size, etc.) of lanes at intersections, roundabouts, merging lanes, diverging lanes, passing lanes, on ramps, off ramps, etc.

As used herein, the term "local area" refers to an area comprising a segment of a roadway, e.g., comprising a segment of roadway having a length of 1 meter to 1 kilometer (e.g., 1 to 1000 meters (e.g., 1, 2, 5, 10, 20, 50, 100, 200, 500, or 1000 meters)).

As used herein, the term "large area" refers to an area comprising a network of roadways, e.g., comprising a network of roads having a total length of at least 500 meters (e.g., 500; 1000; 2000; 5000; 10,000; or more meters).

DESCRIPTION

The present technology provides a Connected Reference Marker (CRM) System and related methods (e.g., management methods) configured to serve automated driving systems (ADS) (e.g., connected and automated vehicle highway (CAVH) system). Although the disclosure herein refers to certain illustrated embodiments, it is to be understood that these embodiments are presented by way of example and not by way of limitation.

The following tables describe embodiments of CRM Systems and CRM System components described herein. Table 1 provides a summary of CRM Systems and their components. As shown in Table 1, the CRM System components or subsystems include: (1) Connected Reference Markers (CRM); (2) communication module and/or infrastructure; (3) Virtual Roadway Configuration Module (VRCM); (4) Central Operations Unit (COU); (5) Onboard Module (OBM); (6) Distance Measurement Unit (DMU); and/or a (7) Wireless Signal Unit (WSU). Further, the technology described herein provides embodiments of various types of CRM Systems including, e.g., (1) Basic CRM System; (2) Advanced CRM System (A-CRM System); (3) Vehicle-centric CRM System (V-CRM System); (4) Communication-centric CRM System (C-CRM System); and/or (5) Road-centric CRM System (R-CRM System).

TABLE 1

Summary of CRM Systems and Components

| System type | CRM | Communication | VRCM | COU | OBM1 | OBM2 | DMU on Vehicle | WSU | DMU on Roadside |
|---|---|---|---|---|---|---|---|---|---|
| Basic CRM System | ✓ | ✓ | | | | | | | |
| Advanced CRM System | ✓ | ✓ | ✓ | ✓ | | | | | |
| V-CRM System | ✓ | ✓ | ✓ | ✓ | ✓ | | ✓ | | |
| C-CRM System | ✓ | ✓ | ✓ | ✓ | ✓ | | | ✓ | |
| R-CRM System | ✓ | ✓ | ✓ | ✓ | | ✓ | | | ✓ |

In some embodiments, the technology uses a high-definition map (HD Map), e.g., a HD Map used in present AV or CAV technologies. In some embodiments of the CRM Systems described herein, the roadway driving central line of the HD Map is used and other layers, e.g., the dynamic and real-time layers, are not used.

Table 2 provides a summary of the relationship between various types of CRM System components (or subsystems) and a high-definition map (HD Map). Specifically, embodiments of the technology provide a COU comprising an HD Map and embodiments of the technology provide a COU that does not comprise an HD Map (e.g., an HD-free COU); embodiments of the technology provide an OBM comprising an HD Map and embodiments of the technology provide an OBM that does not comprise an HD Map (e.g., an HD-free OBM). All other subsystems can be developed and implemented without a HD Map. Therefore, one classification of the CRM Systems described herein describes them as comprising or not comprising an HD Map. In some embodiments, a roadside DMU and/or a vehicle DMU comprise an HD Map. However, an HD Map is not necessary for the roadside or vehicle DMU to function as described herein.

A HD Map is used in many AV or CAV applications. In the CRMS systems, only a simple layer of the HD Map, the roadway driving central line, is used. Other layers of HD Map, such as the dynamic and real-time layers, are not used in the CRMS systems.

TABLE 2

High-Definition Map Scenarios and Subsystems

| Scenario | CRM | Communication | VRCM | COU | OBM1 | OBM2 | DMU on Vehicle | WSU | DMU on Roadside |
|---|---|---|---|---|---|---|---|---|---|
| Without HD Map | ✓ | ✓ | ✓ | ✓ | ✓ | ✓ | ✓ | ✓ | ✓ |
| With HD Map | | | | ✓ | ✓ | ✓ | | | |

Table 3 provides a summary of the relationship between various types of CRM Systems and a high-definition map (HD Map).

TABLE 3

CRM Systems and High-Definition Map Scenarios

| System type | Scenario Without HD Map | With HD Map |
|---|---|---|
| Basic CRM System | ✓ | |
| Advanced CRM System | ✓ | ✓ |
| V-CRM System | ✓ | ✓ |
| R-CRM System | ✓ | ✓ |
| C-CRM System | ✓ | ✓ |

CRM System

In some embodiments, the technology provides a Connected Reference Marker System (CRM System). For example, in some embodiments of the CRM System, the CRM System comprises the following physical subcomponents: a network of Connected Reference Markers (CRM) installed along a roadway and a roadside communication system. Further, in some embodiments, the CRM comprises: (1) a data storage component configured to store a CRM identifier (e.g., identifying the CRM) and CRM location information (e.g., providing data describing the location of the CRM); and (2) a communication module configured to transmit the CRM identifier and the CRM location information to vehicles. In some embodiments, the CRM comprises: (1) a data storage component configured to store the CRM identifier and CRM location information; (2) a data processing unit configured to process the CRM location information; and (3) a communication module for transmitting the CRM location information to vehicles.

In some embodiments, the network of CRMs is installed along a roadway. In some embodiments, the network of CRMs comprises a plurality of CRMs spaced at intervals of approximately 1 meter to 50 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters). In some embodiments, the network of CRM comprises a plurality of CRM that are installed along a roadway more densely (e.g., from approximately 1 to 20 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters) along curved roadway and less densely (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters) along a straight roadway.

In some embodiments, for an intersection or a roundabout, the network of CRMs comprises CRMs that are installed at corners of the roadway approaching the intersection or roundabout.

In some embodiments, for an on-ramp, off-ramp, and interchange roadway segments, the network of CRMs comprises CRMs installed at starting, ending, and mid-points of each of the on-ramp, off-ramp, and interchange roadway segments, respectively.

In some embodiments, for a merging, diverging, and weaving roadway segments, the network of CRMs comprises CRMs installed at starting, ending, and mid-points of each of the merging, diverging, and weaving roadway segments, respectively.

In some embodiments, for other types of roadway segments (e.g., as summarized in the Highway Capacity Manual), the network of CRMs comprises CRMs installed at starting, ending, and mid-points of these roadway segments.

In some embodiments, a CRM is installed on various types of roadways and facilities (e.g., infrastructure), e.g., (1) roadside facilities (e.g., pole, traffic signage, intersection traffic controller, roundabout island, reflection device, barricade, median divider, power supply, and/or wireless tower) (2) roadway overhead facilities (e.g., a gantry); (3) roadway surface or pavement; and (4) aerial facilities (e.g., drone, balloon).

In some embodiments, the CRM is installed on a structured or unstructured roadway (e.g., inter-city freeways, urban expressway, major arterials, minor arterials, connectors, streets, and rural roads). One of ordinary skill in the art understands classification of roadways. See, e.g., "A Policy on Geometric Design of Highways and Streets", published by AASHTO (www.bestmaterials.com/PDF_Files/geometric_design_highways_and_streets_aashto.pdf), incorporated herein by reference.

In some embodiments, the network of CRM (e.g., a CRM of said network) is configured as a local location reference and object references to provide and/or to support detecting and identifying the positions of objects on the roadway and in the driving environment for a vehicle. In some embodiments, the network of CRM is configured as a local location reference and object reference to support detecting and identifying objects on the roadway and in the driving environment for a vehicle. Exemplary objects on the roadway and in the driving environment for a vehicle are various objects affecting vehicle driving (e.g., other vehicles, bicycles, pedestrians, animals, obstacles, construction, incidents, signage, markings, and/or traffic control devices).

In some embodiments, an CRM is configured to support a system of roadside units (RSU, also known as RIU) (see, e.g., U.S. Pat. No. 10,380,886 and U.S. Pat. App. Pub. No. 20200168081, each of which is incorporated herein by reference) or an intelligent roadside toolbox (IRT) system (see, e.g., U.S. patent application Ser. No. 17/192,529, incorporated herein by reference). In some embodiments, the CRM is configured to support an intelligent roadside infrastructure system (IRIS) (see, e.g., U.S. Pat. No. 10,380,886 and U.S. Pat. App. Pub. No. 20200168081, each of which is incorporated herein by reference). In some embodiments, the IRIS comprises a number of CRM.

Under extreme weather conditions, such as snow and heavy rain, the sensing devices of a vehicle (e.g., radar, camera, and/or Global Positioning System (GPS)) may not function adequately. Specifically, the sensing devices may not be able to detect a driving lane or lanes when the roadway surface is covered with snow or rain. Therefore, embodiments provide a cost-effective solution to provide autonomous driving to a vehicle under all weather conditions. As described herein, the CRM System provides a cost-effective solution to support automated driving services (e.g., by providing vehicle location information) on all roadways quickly and effectively.

In general, the technology provides support to automated driving services when roads and/or road markings are obscured and automated driving sensing devices may not be able to detect a driving lane or lanes. For example, automated driving sensing devices may not be able to detect a driving lane or lanes during nighttime driving, heavy traffic, road damage, road construction, a spill on the road, weather event, etc. In general, when the roads and road markings are not optically detectable by either CAVH sensors or CAV sensors, the CRM System provides a cost-effective solution to support automated driving services (e.g., by providing vehicle location information) on all roadways quickly and effectively.

This CRM System technology is also easily installed and deployed on a roadway and/or on a vehicle. As such, the CRM System technology is a smart system that supports automated driving services (e.g., by providing vehicle location information) for simple roads and/or for simple vehicles. In some embodiments, a network of CRM deployed along a roadway comprises a plurality of CRM that provide reference points for vehicles to identify and/or locate their driving lanes, e.g., when covered by snow or rain. Accordingly, the CRM System supports the operations of Connected Automated Vehicles (CAV) having automation level 1, 2, 3, 4, and/or 5 (e.g., as defined by SAE) on all types of roadways and in all types of weather conditions.

Specifically, the network of CRM installed along a roadway provides a technology for identifying and developing a Virtual Roadway Configuration comprising virtual driving cells, virtual driving lanes, virtual driving lane groups, and/or virtual driving grids for vehicles to drive on roadways covered by snow or rain. In some embodiments, a network of CRM installed along a roadway is configured to virtually mark driving lanes when the physical lanes are not visible or are covered by snow or rain. These virtually marked lanes are configured to be visible (e.g., detectable) by vehicles to allow the vehicles to drive during snow or heavy rain.

In some embodiments, the CRM System is configured to convert a roadway into a virtual driving grid system. In some embodiments, the virtual grid system comprises a lateral position identification function similar to a railroad track system or a tram system. Accordingly, all vehicles can drive along the pre-determined virtual cell, virtual driving lane, and virtual driving grid similar to a train driving on a railroad track.

In some embodiments, the CRM System is configured to provide a virtual driving cell, a virtual driving lane, a virtual driving lane group, and/or a virtual driving grid when a high-definition map is not available for use by a vehicle to navigate and drive on roads.

In some embodiments, the CRM System is configured to provide a virtual driving cell, a virtual driving lane, a virtual driving lane group, and/or a virtual driving grid when a high-definition map is available for use by a vehicle to navigate and drive on roads.

Virtual Roadway Configuration Module

In some embodiments, the technology provides a virtual roadway configuration module (VRCM). In some embodiments, the CRM System comprises and/or provides a VRCM. In some embodiments, the VRCM comprises the following subcomponents: a virtual driving cell module, a virtual driving lane module, a virtual driving lane group module, and/or a virtual driving grid module. In some embodiments, the VRCM is configured to develop the virtual roadway configuration by using the CRM System.

In some embodiments, for a straight or curved roadway segment, a virtual driving cell module performs an algorithm to configure the virtual driving cell, which has a width of a standard lane (e.g., approximately 12 feet (e.g., 9-15 feet (e.g., 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, or 15.0 feet))), and a length ranging from a vehicle length to 50 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters) for a straight roadway segment and a length ranging from a vehicle length to 20 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters) for a curved roadway segment. The minimum length of the virtual driving cell is a length that is appropriate to accommodate one vehicle.

In some embodiments, the VRCM comprises a virtual driving cell identification module (VDCIM). In some embodiments, the VDCIM is configured to perform a method for defining a virtual driving cell. In some embodiments, the method for defining a virtual driving cell comprises selecting, by the VDCIM, two CRMs (e.g., two adjacent CRMs) to provide a first CRM and a second CRM; identifying a first roadway driving lane; and identifying a first roadway division line and a second roadway division line, e.g., using the lane width and/or as defined by the lane width. In some embodiments, the method comprises drawing, by the VDCIM, a first reference line from the first CRM that is perpendicular to a first pre-measured actual roadway division line and drawing, by the VDCIM, a second reference line from the second CRM that is perpendicular to a second pre-measured actual roadway division line. In some embodiments, the method comprises identifying, by the VDCIM, the positions of two reference points where the two reference lines intersect the pre-measured actual roadway division lines. Accordingly, in some embodiments, the method comprises identifying, by the VDCIM, the position of a first reference point where the first reference line intersects the first pre-measured actual roadway division line; and identifying, by the VDCIM, the position of a second reference point where the second reference line intersects the second pre-measured actual roadway division line. In some embodiments, the method comprises connecting, by the VDCIM, the first reference point and the second reference point to provide (e.g., draw) a first virtual division line. In some embodiments, the method comprises providing (e.g., drawing) a second virtual division line using the lane width and/or as defined by the lane width. Further, in some embodiments, the method comprises defining and/or providing a virtual driving cell formed by a rectangular shape defined by the first reference line, the second reference line, the first virtual division line, and the second virtual division line.

In some embodiments, the method for defining a virtual driving cell is performed for a number of additional roadway driving lanes (e.g., a second, third, fourth, fifth, sixth, seventh, eighth, ninth, tenth, eleventh, twelfth, thirteenth, fourteenth, fifteenth, sixteenth, or nth additional roadway driving lanes). In particular, in some embodiments, the method comprises using, by the VDCIM, the virtual driving cell provided for the first driving lane as a basis for drawing the second virtual driving cell for the second roadway driving lane, e.g., by providing a second virtual driving cell formed by a rectangular shape parallel to the first virtual driving cell and using the lane width and/or as defined by the lane width (e.g., a lane width of the second roadway driving lane). In some embodiments, the method is repeated for all driving lanes (e.g., a second, third, fourth, fifth, sixth, seventh, eighth, ninth, tenth, eleventh, twelfth, thirteenth, fourteenth, fifteenth, sixteenth, or nth additional roadway driving lane) to provide (e.g., draw) virtual driving cells for all driving lanes using the CRMs.

In some embodiments, for turning movements at an intersection, including left turn, right turn, and U-turn movements, the virtual driving cell is configured as the area of the driving lane from the turn-starting point to the turn-ending point.

In some embodiments, for turning movements at a roundabout, including left turn, right turn, and U-turn movements, the virtual driving cell is configured as the area of the driving lane from the turn-starting point to the turn-ending point.

In some embodiments, for an on-ramp, off-ramp, and interchange roadway segment, the virtual driving cell is configured as the area of the driving lane from the starting point to the ending point of the on-ramp, off-ramp, and interchange roadway segments, respectively.

In some embodiments, for merging, diverging, and weaving roadway segments, the virtual driving cell is configured as the area of the driving lane from the starting point to the ending point of the merging, diverging, and weaving movements, respectively.

In some embodiments, for any of the other types of roadway segments defined in "A Policy on Geometric Design of Highways and Streets" by AASHTO, the virtual driving cell is configured as the area of the driving lane from the starting point to the ending point of the other type of roadway segment as defined in the AASHTO reference.

In some embodiments, for a single driving lane, a virtual driving lane module connects virtual driving cells along the driving direction and forms a virtual driving lane. In some embodiments, for multiple driving lanes, a virtual driving lane group module combines the parallel virtual driving lanes and form (e.g., to provide) a virtual driving lane group.

In some embodiments, for a roadway with single and/or multiple driving lanes, a virtual driving grid module connects the network of virtual driving cells along the driving direction ("longitudinally") and laterally to form (e.g., provide) a virtual driving grid, wherein a vehicle performs its longitudinal and lateral movements over the virtual driving grid.

In some embodiments, the virtual driving lanes virtually mark the actual driving lanes, e.g., during extreme weather scenarios or when the actual driving lanes are otherwise obscured.

Central Operations Unit

In some embodiments, the technology provides a central operations unit (COU). In some embodiments, the CRM System comprises the COU. In some embodiments, the COU is configured to provide, manage, transmit, and/or operate a set of local location relationship tables for the CRM network; and virtual roadway configuration information for a roadway. In some embodiments, the COU transmits the set of local location relationship tables for the CRM network; and the virtual roadway configuration information for a roadway to CRMs and/or to vehicles.

In some embodiments, when there is no high-definition map (e.g., the technology is HD map-free), the COU is configured to comprise: (1) a location relationship identification module to develop a set of local location relationship tables for each CRM; (2) a Virtual Roadway Configuration Module (VRCM) to perform a set of algorithms to identify and/or locate the virtual roadway configuration information for a roadway, including virtual driving cell, virtual driving lane, virtual driving lane group, and virtual driving grid; and (3) a communication module for transmitting the information (e.g., local location relationship tables and/or virtual roadway configuration information) to CRM and/or to vehicles.

In some embodiments, when there is a high-definition map, the COU is configured to comprise: (1) a location relationship identification module to develop a set of local location relationship tables for each CRM and each key point of the central line of a driving lane; (2) a Virtual Roadway Configuration Module (VRCM) to perform a set of algorithms to identify and/or locate the virtual roadway configuration information for a roadway, including virtual driving cell, virtual driving lane, virtual driving lane group, and virtual driving grid; (3) a high-definition map including roadway lane configuration and CRM location information; and (4) a communication module for transmitting the information (e.g., local location relationship tables, key point information, virtual roadway configuration information, and/or high-definition map) to CRM and/or with vehicles.

Accordingly, in some embodiments, for each key point of the central line of a driving lane, the location relationship identification module identifies at least two driving lane key point CRMs (e.g., at least two adjacent CRM, at least two CRM that are closest to the driving lane key point, and/or at least two adjacent CRM that are closest to the driving lane key point) and develops a local location relationship table that stores the local location reference information of the driving lane key point CRMs, including identifiers of the driving lane key point CRMs, the distance from the key point to each of the driving lane key point CRMs, and the angle between the two lines linking the key point with the driving lane key point CRMs. Furthermore, a segment linking every two adjacent key points is the basic central line of a driving lane and each segment has a length ranging from a centimeter to 50 meters (e.g., 0.01, 0.10, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters).

Moreover, in some embodiments, for each key point of the central line of a turning lane at an intersection, including left turn, right turn, and U-turn movements, the location relationship identification module identifies at least two intersection key point CRMs installed at the corners of the intersection (e.g., at least two adjacent CRM, at least two CRM that are closest to the intersection key point, and/or two at least adjacent CRM that are closest to the intersection key point) and develops a local location relationship table that stores the local location reference information of the intersection key point CRMs, including identifiers of the intersection key point CRMs, the distance from the intersection key point to each of the intersection key point CRMs, and the angle between the two lines linking the intersection key point with the intersection key point CRMs.

In some embodiments, for each key point of the central line of a lane at a roundabout, including left turn, right turn, and U-turn movements, the location relationship identification module identifies at least two roundabout key point CRMs installed at the corners and/or middle island of the roundabout (e.g., at least two adjacent CRM, at least two CRM that are closest to the roundabout key point, and/or at least two adjacent CRM that are closest to the roundabout key point) and develops a local location relationship table that stores the local location reference information of the roundabout key point CRMs, including identifiers of the roundabout key point CRMs, the distance from the key point to each of the roundabout key point CRMs, and the angle between the two lines linking the key point with the roundabout key point CRMs.

In some embodiments, the local location relationship tables and the virtual roadway configuration information are configured to be stored in each CRM. In some embodiments, the local location relationship tables and the virtual roadway configuration information are transmitted to vehicles driving near a CRM (e.g., to a vehicle within 1 to 1000 meters (e.g., 1, 2, 5, 10, 20, 50, 100, 200, 500, or 1000 meters) of the CRM). In some embodiments, the CRM stores the local location relationship tables and the virtual roadway configuration information for a roadway segment in which the CRM provides the center of the segment and the segment has a radius from 1 meter to 1 kilometer (e.g., 1 to 1000 meters (e.g., 1, 2, 5, 10, 20, 50, 100, 200, 500, or 1000 meters)).

In some embodiments, information, e.g., the local location relationship tables and virtual roadway configuration, is transmitted from the COU to each CRM. In some embodiments, information, e.g., the local location relationship tables and virtual roadway configuration, that is stored in a CRM is updated regularly by the COU. That is, in some embodiments, the COU sends updated information, e.g., the local location relationship tables and virtual roadway configuration, to a CRM to provide updated information, e.g., the local location relationship tables and virtual roadway configuration that is stored by the CRM. In some embodiments, the frequency of updating the local location relationship tables and/or virtual roadway configuration stored in a CRM depends on the frequency with which the CRM System provides updates and/or the frequency with which the CRM System is changed by installment, maintenance, replacement, and/or improvement of CRMs.

In some embodiments, the location relationship identification module updates the set of local location relationship tables for each CRM and each key point of the central line of a driving lane. In some embodiments, the VRCM computes and updates the virtual roadway configuration information when there is a change in the CRM installation (e.g., the location, number, arrangement, etc. of one or more CRM when it is changed). In some embodiments, the VRCM computes and updates the virtual roadway configuration information to provide up-to-date virtual roadway configuration information.

In some embodiments, the COU is configured to support a traffic control unit/traffic control center (TCU/TCC). In some embodiments, the COU is configured to support a traffic operations center (TOC). In some embodiments, a TCU/TCC and/or TOC comprises a COU. In some embodiments, the COU is configured to support a cooperative management (CM) subsystem of an ADS. See, e.g., U.S. Pat. Nos. 10,380,886 and 10,692,365; and U.S. Pat. App. Pub. Nos. 2019/0340921 and 2020/0168081, each of which is incorporated herein by reference, for descriptions of the TCU/TCC and TOC. See, e.g., U.S. Pat. App. Ser. No. 63/149,804, incorporated herein by reference, for a description of the cooperative management (CM) subsystem of an ADS. In short, the CM subsystem is configured to provide the brain (e.g., central core functionality and/or intelligence) of an ADS. In some embodiments, the CM subsystem comprises a hierarchy of traffic control centers (TCC) and/or traffic control units (TCU). In some embodiments, the CM subsystem is configured to provide driving intelligence allocation, function allocation, resource allocation, device allocation, and/or system integration for automated driving provided by an ADS.

Advanced Connected Reference Marker System

In some embodiments, the technology provides an Advanced Connected Reference Marker System (A-CRM System). In some embodiments, the A-CRM System comprises: (1) a network of Connected Reference Markers (CRM) installed along a roadway; (2) a Central Operations Unit (COU); and (3) a roadside communication system. In some embodiments, an A-CRM System is configured to use a high-definition map. In some embodiments, an A-CRM System is configured not to use a high-definition map (e.g., to provide an HD map-free A-CRM System). Specifically, embodiments provide that a COU is configured to use a high-definition map and embodiments provide that a COU is configured not to use a high-definition map (e.g., to provide an HD map-free COU). Thus, in some embodiments, the A-CRM System comprises a COU that uses a high-definition map. In some embodiments, the A-CRM System comprises a COU that does not use a high-definition map (e.g., in some embodiments, the A-CRM System comprises an HD map-free COU).

Further, in some embodiments, the A-CRM System comprises an onboard module (OBM) (e.g., installed in a vehicle to provide a vehicle comprising an OBM) and distance measurement units (DMU) provided as a component of the OBM and/or installed along the roadside. These components are discussed below. Specifically, embodiments of the technology provide two types of OBM: OBM1 and OBM2. For OBM1, distance measurement and distance calculations are performed by onboard units (e.g., the OBM1 comprises a distance measurement unit (DMU)). For OBM2, distance measurement and distance calculations are performed by DMU installed along the roadside. In some embodiments, the OBM1 DMU uses a number of wireless signal units (WSU) installed at the roadside (e.g., with a CRM) to measure distances. Table 4 summarizes the types of Onboard Module (OBM) and their corresponding supporting subsystems and distance measurement subsystems.

TABLE 4

Types of OBM and Distance Measurement Subsystems

| OBM Type | OBM1 | | OBM2 | |
|---|---|---|---|---|
| HD Map | Without HD Map | With HD Map | Without HD Map | With HD Map |
| Supporting Subsystem | DMU on Vehicle | WSU on Vehicle | DMU on Roadside | DMU on Roadside |
| Distance Measurement Subsystems | DMU on Vehicle; WSU & OBM1 | DMU on Vehicle; WSU & OBM1 | DMU on Roadside | DMU on Roadside |

In some embodiments, the technology provides an Onboard Module (OBM). In some embodiments, the OBM is configured to be installed on a vehicle and to identify or receive the vehicle real-time position information. In some embodiments, the technology provides the OBM in two variations. In some embodiments, the technology provides an Onboard Module 1 (OBM1), which is configured to receive CRM location information from the CRMs and the COU and to identify and/or determine the vehicle real-time position (e.g., using a DMU of the OBM1). In some embodiments, the technology provides an Onboard Module 2 (OBM2), which is configured to receive the vehicle real-time position from a distance measurement unit (DMU) provided (e.g., installed) at the roadside.

In some embodiments, when there is no high-definition map (e.g., embodiments providing an HD map-free A-CRM System and/or A-CRM System comprising an HD map-free COU), the OBM1 installed in a vehicle is configured to comprise: (1) a communication module to receive information describing the location of CRMs of the network of CRMs and to receive virtual roadway configuration information from the COU; (2) a real-time position identification module for identifying the vehicle relative position with respect to CRMs and virtual roadway configuration; and (3) a computing module to match the vehicle real-time position with the location of one or more CRM (e.g., at least two CRM) of the network of CRMs and virtual roadway configuration.

Accordingly, in some embodiments, the real-time position identification module in OBM1 comprises and uses an onboard Distance Measurement Unit (DMU) to measure the distances from the vehicle to at least two CRMs (e.g., at least two adjacent CRM, at least two CRM that are closest to the vehicle, and/or at least two adjacent CRM that are closest to the vehicle). In some embodiments, the onboard Distance Measurement Unit (DMU) comprises one or a plurality of the following devices: radar (e.g., millimeter radar, microwave radar, infrared radar, ultrasonic radar), lidar, camera, BLUETOOTH component, and/or a cellular transceiver.

In some embodiments, the technology uses a wireless signal unit (WSU) to provide real-time position information. In some embodiments, a WSU is co-located with a CRM and thus the WSU and the CRM have the same location information. In some embodiments, the real-time position identification module in OBM1 uses a WSU to measure the distances from the vehicle to at least two WSUs (e.g., at least two adjacent WSU, at least two WSU that are closest to the vehicle, and/or at least two adjacent WSU that are closest to the vehicle). In some embodiments, the real-time position identification module in OBM1 uses a method to measure the distances from the vehicle to at least two WSUs (e.g., at least two adjacent WSU, at least two WSU that are closest to the vehicle, and/or at least two adjacent WSU that are closest to the vehicle) and CRMs associated with the WSUs.

In some embodiments, the OBM1 real-time position identification module is configured to perform a method to measure the distances from the vehicle to at least two WSUs (e.g., at least two adjacent WSU, at least two WSU that are closest to the vehicle, and/or at least two adjacent WSU that are closest to the vehicle) and CRMs associated with the WSUs. For example, in some embodiments, the technology provides a method comprising transmitting, by the WSU, a ranging signal. In some embodiments, the method comprises continuously transmitting, by the WSU, the ranging signal and, in some embodiments, the method comprises transmitting, by the WSU, the ranging signal periodically or transmitting, by the WSU, the ranging signal upon request for a ranging signal by another component (e.g., a vehicle and/or OBM1). In some embodiments, methods comprise transmitting, by the WSU, a ranging signal to a vehicle (e.g., to an OBM1 installed on a vehicle). In some embodiments, methods comprise identifying, by an OBM1, at least two WSUs (e.g., at least two adjacent WSU, at least two WSU that are closest to the vehicle, and/or at least two adjacent WSU that are closest to the vehicle) and CRMs associated with the WSUs. In some embodiments, methods comprise receiving, by a vehicle and/or by an OBM1 installed on a vehicle, the ranging signals from the at least two WSUs. In some embodiments, after the vehicle and/or an OBM1 installed on a vehicle receives the ranging signal(s), the method comprises determining and/or receiving, by the OBM1 (e.g., by the OBM1 real-time position identification module), information describing the location of the at least two WSUs and, optionally, receiving a WSU identifier from each WSU. Next, in some embodiments, methods comprise analyzing, by the OBM1 (e.g., by the OBM1 real-time position identification module), the ranging signals and calculating the distances between the vehicle and the at least two WSUs and/or calculating the distances between the vehicle and the CRMs associated with the at least two WSUs.

Figure 20:
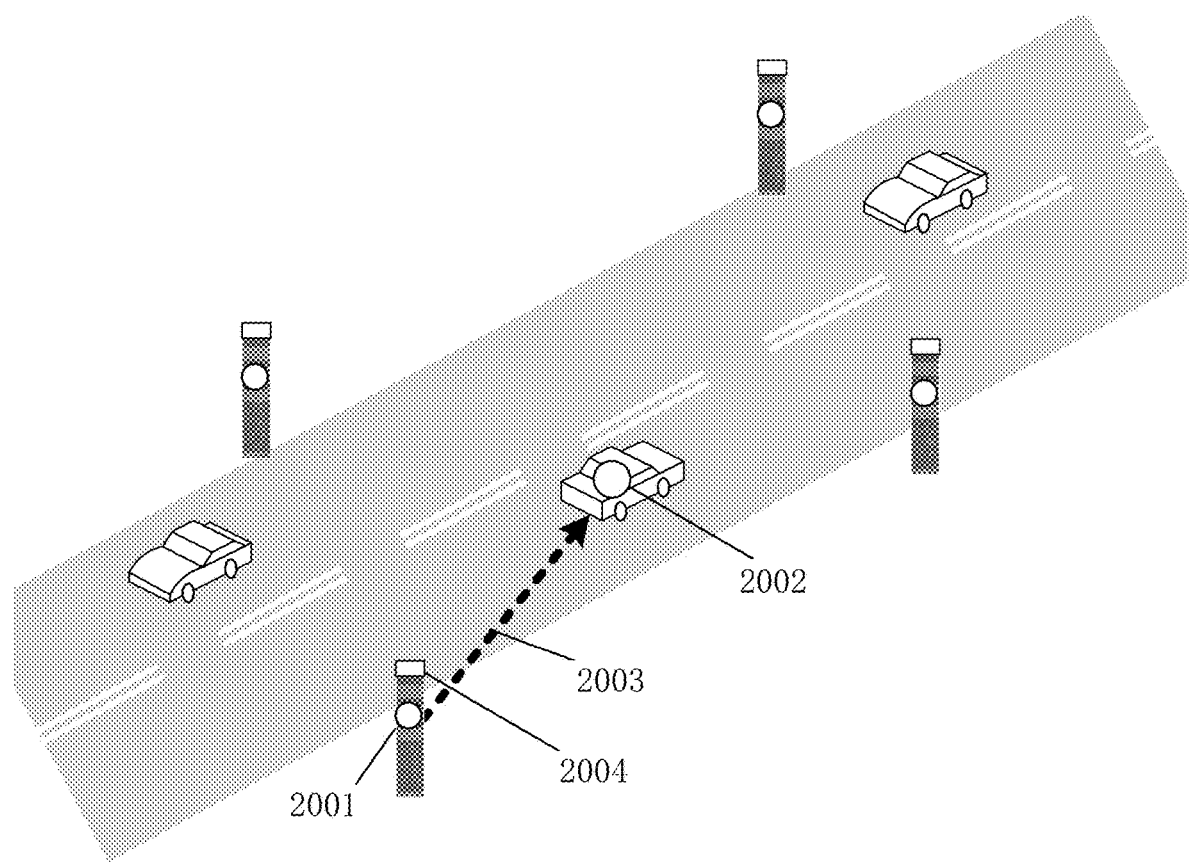
FIG. 20 shows an example of a ranging system using OBM1 and WSU. 2001: WSU; 2002: OBM1; 2003: Ranging signal; 2004: CRM.
Figure 21:
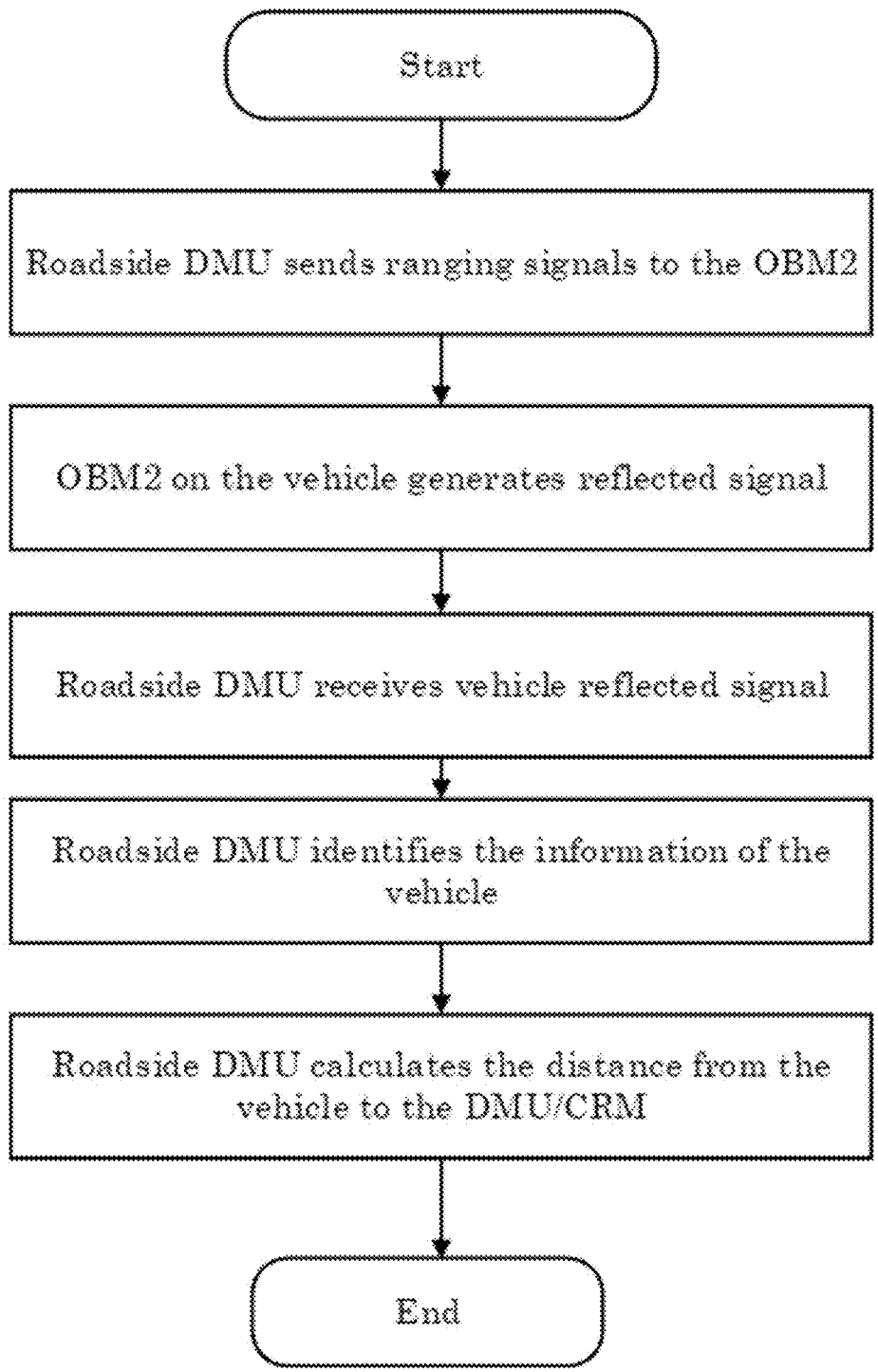
FIG. 21 shows an exemplary flow chart of the ranging method using OBM2 and roadside DMU.
Figure 22:
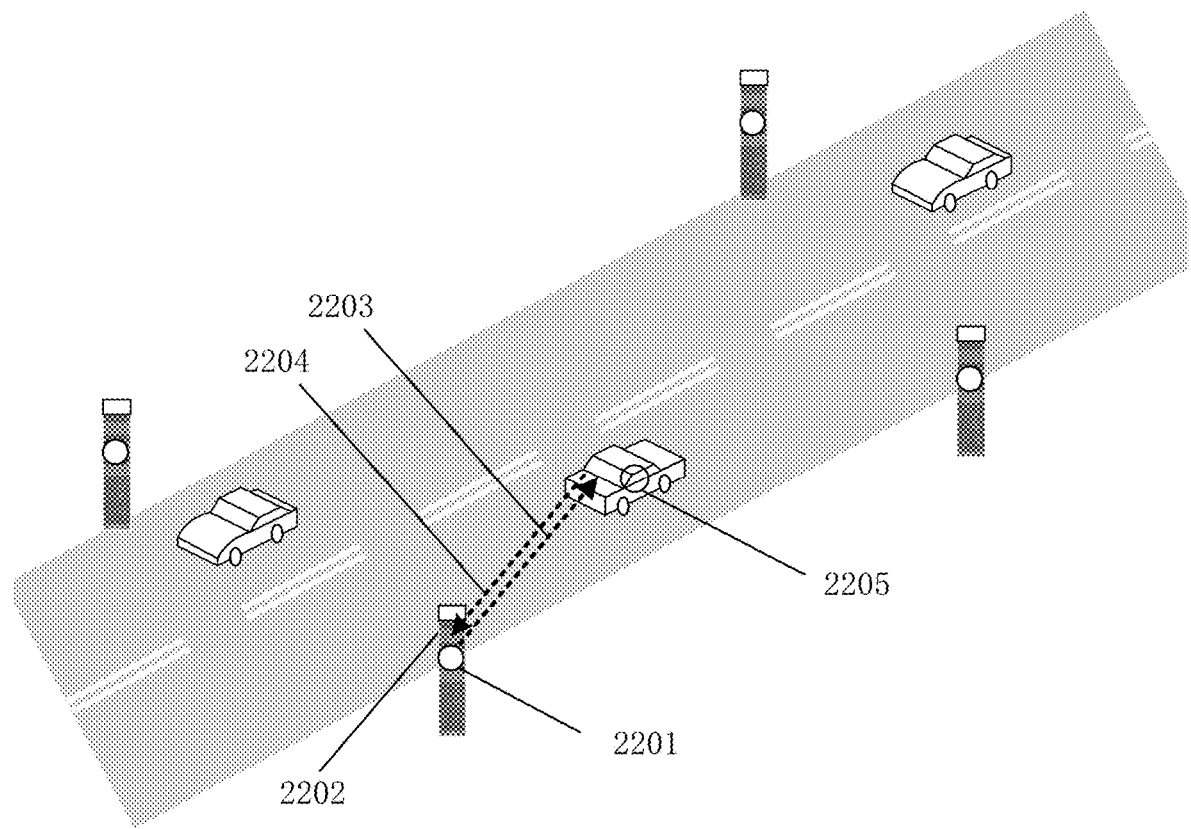
FIG. 22 shows an example of a ranging system using OBM2 and roadside DMU. 2201: Roadside DMU; 2202: CRM; 2203: Ranging signal; 2204: Reflected ranging signal; 2205: OBM2.
Figure 23:
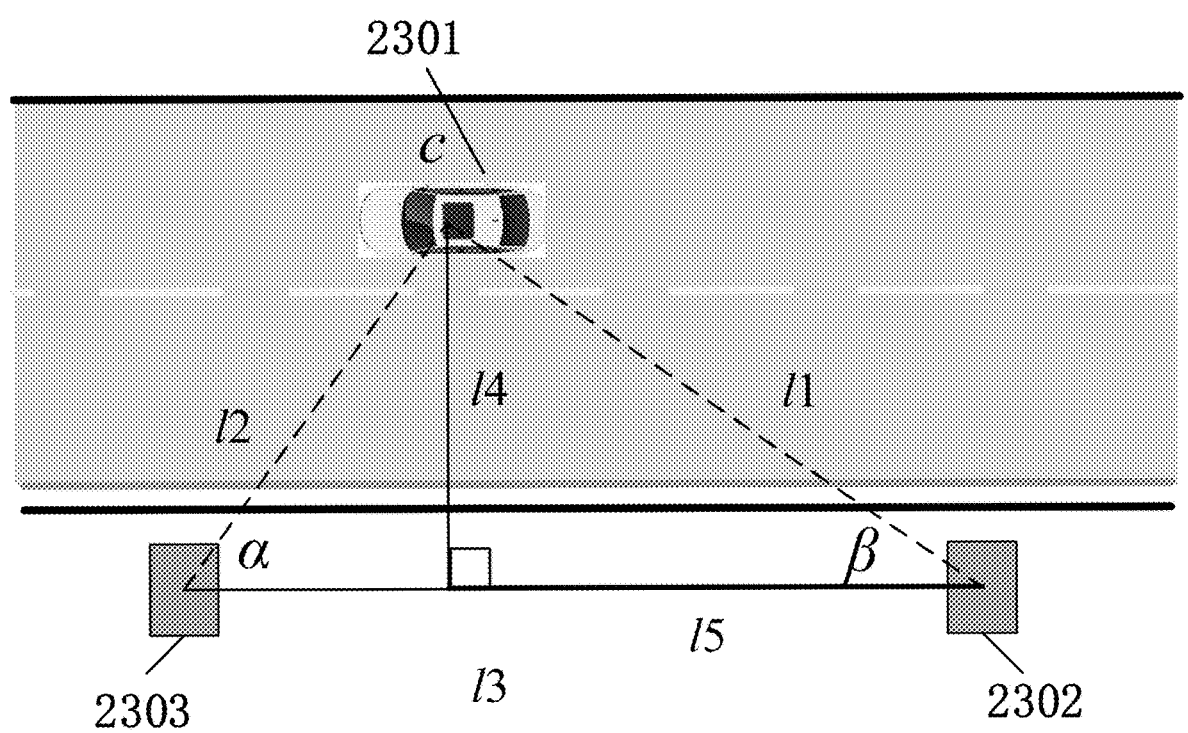
FIG. 23 shows an example of the two-dimensional triangular position identification method for level grade road. 2301: Vehicle; 2302: CRM1; 2303: CRM2.

In some embodiments, the real-time position identification module in OBM1 uses a triangular position identification method to calculate the vehicle relative position with respect to CRMs (e.g., at least two CRM, at least two adjacent CRM, at least two CRM that are closest to the vehicle, and/or at least two adjacent CRM that are closest to the vehicle), wherein the triangular position identification method comprises a two-dimensional position identification method for a level grade road and a three-dimensional position identification method for a road with upgrade or downgrade. The two-dimensional triangular position identification method is illustrated in FIGS. 20-21. The three-dimensional triangular position identification method is illustrated in FIGS. 22-23.

In some embodiments, the computing module in OBM1 matches the vehicle real-time position with the location of one or more CRMs (e.g., at least two CRM) of the network of CRMs and with the virtual roadway configuration. Moreover, the vehicle uses the vehicle real-time position information and the virtual roadway configuration information to maintain lane keeping for the vehicle. Further, in some embodiments, the vehicle uses the vehicle real-time position information and the virtual roadway configuration information to perform longitudinal and lateral vehicle control and movement within each virtual driving cell and within the virtual driving grid.

In some embodiments, when there is a high-definition map (e.g., embodiments providing a A-CRM System and/or providing an A-CRM System comprising a COU comprising an HD map), the OBM1 installed in a vehicle is configured to comprise: (1) a communication module to receive the information describing the location of one or more CRM of the network of CRMs, the local location relationship table of key points of the central line of a driving lane, and the virtual roadway configuration information from the COU; (2) a high-definition map including lane configuration and CRM location information; (3) a real-time position identification module for identifying the vehicle relative position with respect to CRMs, key points of the central line of a driving lane, and virtual roadway configuration; and (4) a computing module to match the vehicle real-time position with the location of one or more CRM (e.g., at least two CRM) of the network of CRMs, the key points of the central line of a driving lane, and the virtual roadway configuration.

In some embodiments, the real-time position identification module in OBM1 uses an onboard Distance Measure Unit (DMU) to measure the distances from the vehicle to at least two CRMs (e.g., at least two adjacent CRM, at least two CRM that are closest to the vehicle, and/or at least two adjacent CRM that are closest to the vehicle). In some embodiments, the onboard Distance Measurement Unit (DMU) comprises one or a plurality of the following devices: radar (e.g., millimeter radar, microwave radar, infrared radar, ultrasonic radar), lidar, camera, BLUETOOTH component, and/or a cellular transceiver.

In some embodiments, the real-time position identification module in OBM1 uses a WSU to measure the distances from the vehicle to at least two WSUs (e.g., at least two adjacent WSU, at least two WSU that are closest to the vehicle, and/or at least two adjacent WSU that are closest to the vehicle). In some embodiments, the real-time position identification module in OBM1 uses a method to measure the distances from the vehicle to at least two WSUs (e.g., at least two adjacent WSU, at least two WSU that are closest to the vehicle, and/or at least two adjacent WSU that are closest to the vehicle) and CRMs associated with the WSUs. In some embodiments, the WSU is co-located with a CRM so that the WSU and the CRM have the same location information.

In some embodiments, the OBM1 real-time position identification module is configured to perform a method to measure the distances from the vehicle to at least two WSUs (e.g., at least two adjacent WSU, at least two WSU that are closest to the vehicle, and/or at least two adjacent WSU that are closest to the vehicle) and CRMs associated with the WSUs. For example, in some embodiments, the technology provides a method comprising transmitting, by the WSU, a ranging signal. In some embodiments, the method comprises continuously transmitting, by the WSU, the ranging signal and, in some embodiments, the method comprises transmitting, by the WSU, the ranging signal periodically or transmitting, by the WSU, the ranging signal upon request for a ranging signal by another component (e.g., a vehicle and/or OBM1). In some embodiments, methods comprise transmitting, by the WSU, a ranging signal to a vehicle (e.g., to an OBM1 installed on a vehicle). In some embodiments, methods comprise identifying, by an OBM1, at least two WSUs (e.g., at least two adjacent WSU, at least two WSU that are closest to the vehicle, and/or at least two adjacent WSU that are closest to the vehicle) and CRMs associated with the WSUs. In some embodiments, methods comprise receiving, by a vehicle and/or by an OBM1 installed on a vehicle, the ranging signals from the at least two WSUs. In some embodiments, after the vehicle and/or an OBM1 installed on a vehicle receives the ranging signal(s), the method comprises determining and/or receiving, by the OBM1 (e.g., by the OBM1 real-time position identification module), information describing the location of the at least two WSUs and, optionally, receiving a WSU identifier from each WSU. Next, in some embodiments, methods comprise analyzing, by the OBM1 (e.g., by the OBM1 real-time position identification module), the ranging signals and calculating the distances between the vehicle and the at least two WSUs and/or calculating the distances between the vehicle and the CRMs associated with the at least two WSUs.

In some embodiments, the real-time position identification module in OBM1 uses a triangular position identification method to calculate the vehicle relative position with respect to CRMs (e.g., at least two CRM, at least two adjacent CRM, at least two CRM that are closest to the vehicle, and/or at least two adjacent CRM that are closest to the vehicle), virtual roadway configuration, and/or the local location relationship table of key points of the central line of a driving lane, wherein the triangular position identification method comprises a two-dimensional position identification method for a level grade road and a three-dimensional position identification method for a road with upgrade or downgrade.

In some embodiments, an WSU is configured to support a system of roadside units (RSU, also known as RIU) (see, e.g., U.S. Pat. No. 10,380,886 and U.S. Pat. App. Pub. No. 20200168081, each of which is incorporated herein by reference) or an intelligent roadside toolbox (IRT) system (see, e.g., U.S. patent application Ser. No. 17/192,529, incorporated herein by reference). In some embodiments, the WSU is configured to support an intelligent roadside infrastructure system (IRIS) (see, e.g., U.S. Pat. No. 10,380,886 and U.S. Pat. App. Pub. No. 20200168081, each of which is incorporated herein by reference). In some embodiments, the IRIS comprises a number of WSU.

In some embodiments, when there is no high-definition map (e.g., in embodiments providing an HD map-free A-CRM System and/or an A-CRM System comprising an HD map-free COU), the OBM2 installed in a vehicle is configured to comprise: (1) a communication module to receive information describing the location of CRMs of the network of CRMs, to receive virtual roadway configuration information from the COU, and to receive information describing a vehicle relative position with respect to CRMs from a Distance Measurement Unit (DMU) on the roadside; and (2) a computing module to match the vehicle real-time position with the location of one or more CRM (e.g., at least two CRM) of the network of CRMs and virtual roadway configuration.

In some embodiments, the DMU is configured to be installed along the roadway and comprises: (1) a Distance Measurement Device (DMD) to measure the distance from a vehicle to the DMD; (2) a storage device that stores the lane configuration and CRM location information; (3) a computing module to match the vehicle real-time position with the location of one or more DMU (e.g., at least two DMU) and the network of CRMs; and (4) a communication module to transmit the vehicle real-time location information to the vehicle, the network of DMUs, and the network of CRMs.

In some embodiments, the Distance Measurement Device (DMD) comprises one or a plurality of the following devices: radar (e.g., millimeter radar, microwave radar, infrared radar, ultrasonic radar), lidar, camera, BLUETOOTH component, and/or a cellular transceiver. In some embodiments, a DMU is co-located with a CRM so that they have the same location information.

In some embodiments, when there is a high-definition map (e.g., in embodiments providing a A-CRM System and/or an A-CRM System comprising a COU comprising an HD map), the OBM2 installed in a vehicle is configured to comprise: (1) a communication module to receive information describing the location of one or more CRM of the network of CRMs, the local location relationship table of key points of the central line of a driving lane, the virtual roadway configuration information from the COU, and information describing a vehicle relative position with respect to CRMs from the Distance Measurement Unit (DMU) on the roadside; (2) a high-definition map including lane configuration and CRM location information; (3) a computing module to match the vehicle real-time position with the location of one or more CRM (e.g., at least two CRM) of the network of CRMs, the key points of the central line of a driving lane, and the virtual roadway configuration.

In some embodiments, the DMU is configured to be installed along the roadway and comprises: (1) a Distance Measurement Device (DMD) to measure the distance from the vehicle to the DMD; (2) a storage device that stores the lane configuration and CRM location information; (3) a computing module to match the vehicle real-time position with the location of one or more DMUs (e.g., at least two DMU) and the network of CRMs; and (4) a communication module to transmit the vehicle real-time location information to the vehicle, the network of DMUs, and the network of CRMs.

In some embodiments, the Distance Measurement Device (DMD) comprises one or a plurality of the following devices: radar (e.g., millimeter radar, microwave radar, infrared radar, ultrasonic radar), lidar, camera, BLUETOOTH component, and/or a cellular transceiver. In some embodiments, the DMU is co-located with a CRM so that they have the same location information.

In some embodiments, the vehicle uses information provided by the OBM (e.g., the vehicle real-time position information, the virtual roadway configuration information, and/or the local location relationship table of key points of the central line of a driving lane) to maintain lane keeping. In some embodiments, the vehicle uses information provided by the OBM (e.g., the vehicle real-time position information, the virtual roadway configuration information, and/or the local location relationship table of key points of the central line of a driving lane) to perform longitudinal and lateral movement and/or control within each virtual driving cell and the virtual driving grid. In some embodiments, the OBM is configured to support a vehicle intelligent unit (VIU) (see, e.g., U.S. Pat. App. Ser. No. 63/175,158, incorporated herein by reference). In some embodiments, the OBM is and/or comprises a VIU, e.g., as described in U.S. Pat. App. Ser. No. 63/175,158, which is incorporated herein by reference.

In some embodiments, the technology provides expanded CRM Systems comprising OBM and distance measurement subsystems. For example, embodiments provide expanded CRM Systems including a Vehicle-centric CRM System (V-CRM System), a Communication-centric CRM System (C-CRM System), and a Road-centric CRM System (R-CRM System). As described herein, the V-CRM System and C-CRM System uses and/or comprises OBM1 and the R-CRM System uses and/or comprises OBM2. Further, the V-CRM System uses and/or comprises DMU installed on a vehicle to provide the distance measurement subsystem; the C-CRM System uses WSU and OBM1 to provide the distance measurement subsystem; and the R-CRM System uses DMU on the roadside to provide the distance measurement subsystem. The expanded CRM Systems are summarized in Table 5.

TABLE 5

OBM Type and Distance Measurement Subsystems for expanded CRM Systems

| | Component | | | | |
|---|---|---|---|---|---|
| | OBM | | Distance Measurement Subsystems | | |
| System | OBM1 | OBM2 | DMU on Vehicle | WSU & OBM1 | DMU on Roadside |
| V-CRM System | ✓ | | ✓ | | |
| C-CRM System | ✓ | | | ✓ | |
| R-CRM System | | ✓ | | | ✓ |

Vehicle-Centric Connected Reference Marker System

In some embodiments, the technology provides a Vehicle-centric Connected Reference Marker System (V-CRM System). In some embodiments, the V-CRM System comprises the following subcomponents: a network of Connected Reference Markers (CRM) installed along a roadway; a Central Operations Unit (COU); a roadside communication system, an Onboard Module 1 (OBM1) installed on a vehicle; and a Distance Measure Unit (DMU) installed on a vehicle.

In some embodiments, a V-CRM System is configured to use a high-definition map. In some embodiments, a V-CRM System is configured not to use a high-definition map (e.g., to provide an HD map-free V-CRM System). Specifically, embodiments provide that a COU is configured to use a high-definition map and embodiments provide that a COU is configured not to use a high-definition map (e.g., to provide an HD map-free COU). Thus, in some embodiments, the V-CRM System comprises a COU that uses a high-definition map. In some embodiments, the V-CRM System comprises a COU that does not use a high-definition map (e.g., in some embodiments, the V-CRM System comprises an HD map-free COU).

In some embodiments, the V-CRM System is configured to use a CRM identifier and/or an OBM1 identifier to identify objects on the road comprising an OBM1 (e.g., vehicles comprising an OBM1, bicycles or other objects comprising an OBM1) In some embodiments, the V-CRM System is configured to use the CRM location information, OBM1 relative position information, and a triangular position identification method to identify the position of each vehicle (especially lateral position) and/or to maintain lane keeping for vehicles. Therefore, in some embodiments, the V-CRM System provides object (e.g., vehicle) identification and vehicle location information (e.g., the V-CRM System identifies vehicles (e.g., using OBM1 identifiers) and locates vehicles). Accordingly, in some embodiments, the V-CRM System addresses two of the most challenging and fundamental problems in automated driving: (1) object identification; and (2) identifying vehicle position and location.

In some embodiments, when there is no high-definition map (e.g., in embodiments providing an HD map-free V-CRM System and/or a V-CRM System comprising an HD map-free COU), the V-CRM System is configured to connect the virtual driving lane configuration with the CRMs, which provide a similar function for the V-CRM System as location reference points used by GPS. In some embodiments, the V-CRM System is configured to use the OBM1 to connect the vehicle to a virtual driving lane configuration.

In some embodiments, the V-CRM System is configured to connect CRM with OBM1 to virtually mark the driving lanes.

In some embodiments, when there is a high-definition map (e.g., in embodiments providing a V-CRM System and/or a V-CRM System comprising a COU comprising an HD map), the V-CRM System is configured to connect key points of the central line of a driving lane with the CRMs, which provide a similar function for the V-CRM System as location reference points used by GPS. In some embodiments, the V-CRM System is configured to use the OBM1 to connect the vehicle to key points of the central line of a driving lane. In some embodiments, the V-CRM System is configured to connect CRM with OBM1 to virtually mark the driving lanes.

In some embodiments, the CRM in the V-CRM System is configured as a local location reference and object reference to provide and/or to support detecting and identifying the positions of objects on the roadway and in the driving environment for a vehicle. In some embodiments, the CRM in the V-CRM System is configured as a local location reference and object reference to support detecting and identifying objects on the roadway and in the driving environment for a vehicle. Exemplary objects on the roadway and in the driving environment for a vehicle are various objects affecting vehicle driving (e.g., other vehicles, bicycles, pedestrians, animals, obstacles, construction, incidents, signage, markings, and/or traffic control devices).

In some embodiments, the COU in the V-CRM System is configured to manage and operate a set of local location relationship tables for the network of CRM, the virtual roadway configuration information for a roadway, and/or a set of local location relationship tables for each key point of the central line of a driving lane. In some embodiments, the COU in the V-CRM System is configured to transmit the set of local location relationship tables for the network of CRM, the virtual roadway configuration information for a roadway, and/or the set of local location relationship tables for each key point of the central line of a driving lane to CRMs and vehicles.

In some embodiments, the roadside communication system in the V-CRM System is configured to provide the means for communication and information sharing among CRMs, COU, and/or vehicles. In some embodiments, the roadside communication system comprises wired (ethernet, fiber optic) and/or wireless communications technologies (e.g., 802.11, cellular, dedicated short-range communications (DSRC)).

In some embodiments, the DMU installed on a vehicle is configured to measure the distances from the vehicle to CRMs (e.g., at least two CRM, at least two adjacent CRM, at least two CRM that are closest to the vehicle, and/or at least two adjacent CRM that are closest to the vehicle) in the V-CRM System. In some embodiments, the OBM1 in the V-CRM System is configured to identify and match the vehicle relative position with respect to one or more CRMs (e.g., at least two CRM), virtual roadway configuration, and/or key points of the central line of a driving lane.

In some embodiments, the vehicle uses information provided by OBM1 (e.g., the vehicle real-time position information and virtual roadway configuration information) to maintain lane keeping. In some embodiments, the vehicle uses information provided by OBM1 (e.g., the vehicle real-time position information and virtual roadway configuration information) to perform longitudinal and lateral movement and/or control within each virtual driving cell and the virtual driving grid.

In some embodiments, one or more of the subcomponents of the V-CRM System is a physical subsystem. In some embodiments, the V-CRM System is configured to support an automated driving system (ADS), specifically, a connected and automated vehicle highway (CAVH) system. See, e.g., U.S. Pat. No. 10,380,886 and U.S. Pat. App. Pub. No. 2019/0340921, each of which is incorporated herein by reference. In some embodiments, the V-CRM System is configured to support an ADS by providing one or more CRMs and OBM1 to the ADS. In some embodiments, the V-CRM System is configured to support an ADS for all weather conditions by providing one or more CRMs and OBM1 to the ADS. In some embodiments, the V-CRM System is configured to support an ADS when the roads and road markings are not optically detectable by either CAVH sensors or CAV sensors by providing one or more CRMs and an OBM1 to the ADS.

Communication-Based Connected Reference Marker System

In some embodiments, the technology provides a Communication-based Connected Reference Marker System (C-CRM System). In some embodiments, the C-CRM System comprises the following subcomponents: a network of Connected Reference Markers (CRM) installed along a roadway, a Central Operations Unit (COU), a roadside communication system, an Onboard Module 1 (OBM1) installed on a vehicle, and a network of Wireless Signal Units (WSU) installed along a roadway.

In some embodiments, the CRM in the C-CRM System is configured as a local location reference and object reference to provide and/or to support detecting and identifying the positions of objects on the roadway and in the driving environment for a vehicle. In some embodiments, the CRM in the C-CRM System is configured as a local location reference and object reference to support detecting and identifying objects on the roadway and in the driving environment for a vehicle. Exemplary objects on the roadway and in the driving environment for a vehicle are various objects affecting vehicle driving (e.g., other vehicles, bicycles, pedestrians, animals, obstacles, construction, incidents, signage, markings, and/or traffic control devices).

In some embodiments, the COU in the C-CRM System is configured to manage and operate a set of local location relationship tables for the network of CRM, the virtual roadway configuration information for a roadway, and/or a set of local location relationship tables for each key point of the central line of a driving lane. In some embodiments, the COU in the C-CRM System is configured to transmit the set of local location relationship tables for the network of CRM, the virtual roadway configuration information for a roadway, and/or the set of local location relationship tables for each key point of the central line of a driving lane to CRMs and vehicles.

In some embodiments, the roadside communication system in the C-CRM System is configured to provide the means for communication and information sharing among CRMs, WSUs, COU, and vehicles. In some embodiments, the roadside communication system comprises wired (ethernet, fiber optic) and/or wireless communications technologies (e.g., 802.11, cellular, DSRC).

In some embodiments, the WSU in the C-CRM System is configured to comprise a wireless signal transmitting device to send ranging signals to vehicles. In some embodiments, the WSU further comprises a power supply. In some embodiments, the WSU is installed along a roadway.

In some embodiments, the OBM1 in the C-CRM System is configured to receive real-time ranging signals from the WSU, calculate the distances from the vehicle to at least two closest WSUs (e.g., at least two adjacent WSU, at least two WSU that are closest to the vehicle, and/or at least two adjacent WSU that are closest to the vehicle) and associated CRMs. In some embodiments, the OBM1 is configured to identify and match the vehicle relative position with respect to one or more CRMs (e.g., at least two CRM), virtual roadway configurations, and/or key points of the central line of a driving lane.

In some embodiments, the vehicle uses information provided by OBM1 (e.g., the vehicle real-time position information, the virtual roadway configuration information, and/or the local location relationship table of key points of the central line of a driving lane) to maintain lane keeping.

In some embodiments, the vehicle uses information provided by OBM1 (e.g., the vehicle real-time position information, the virtual roadway configuration information, and/or the local location relationship table of key points of the central line of a driving lane) to perform longitudinal and lateral movement and/or control within each virtual driving cell and the virtual driving grid.

In some embodiments, one or more of the subcomponents of the C-CRM System is a physical subsystem. In some embodiments, the C-CRM System is configured to support an automated driving system (ADS). More specifically, in some embodiments, the C-CRM System is configured to support a connected and automated vehicle highway (CAVH) system. See, e.g., U.S. Pat. No. 10,380,886 and U.S. Pat. App. Pub. No. 2019/0340921, each of which is incorporated herein by reference.

In some embodiments, the C-CRM System is configured to support an ADS by providing one or more Connected Reference Markers (CRM) and an OBM1 to the ADS. In some embodiments, the C-CRM System is configured to support an ADS for all weather conditions by providing one or more Connected Reference Markers (CRM) and an OBM1 to the ADS. In some embodiments, the C-CRM System is configured to support an ADS when the roads and road markings are not optically detectable by either CAVH sensors or CAV sensors by providing one or more CRMs and an OBM1 to the ADS.

Road-Centric Connected Reference Marker System

In some embodiments, the technology provides a Road-centric Connected Reference Marker System (R-CRM System). In some embodiments, the R-CRM System comprises the following subcomponents: a network of Connected Reference Markers (CRM) installed along a roadway, a Central Operations Unit (COU), a roadside communication system, an Onboard Module 2 (OBM2) installed on a vehicle, and a network of Distance Measurement Units (DMU) installed along a roadway.

In some embodiments, the CRM in the R-CRM System is configured as a local location reference and object reference to provide and/or to support detecting and identifying the positions of objects on the roadway and in the driving environment for a vehicle. In some embodiments, the CRM in the R-CRM System is configured as a local location reference and object reference to support detecting and identifying objects on the roadway and in the driving environment for a vehicle. Exemplary objects on the roadway and in the driving environment for a vehicle are various objects affecting vehicle driving (e.g., other vehicles, bicycles, pedestrians, animals, obstacles, construction, incidents, signage, markings, and/or traffic control devices).

In some embodiments, the COU in the R-CRM System is configured to manage and operate a set of local location relationship tables for the network of CRM, the virtual roadway configuration information for a roadway, and/or a set of local location relationship tables for each key point of the central line of a driving lane. In some embodiments, the COU in the R-CRM System is configured to transmit the set of local location relationship tables for the network of CRM, the virtual roadway configuration information for a roadway, and/or the set of local location relationship tables for each key point of the central line of a driving lane to CRMs and vehicles.

In some embodiments, the roadside communication system in the R-CRM System is configured to provide the means for communication and information sharing among CRMs, DMUs, COU, and vehicles. In some embodiments, the roadside communication system comprises wired (ethernet, fiber optic) and/or wireless communications technologies (e.g., 802.11, cellular, DSRC).

In some embodiments, the DMU in the R-CRM System is configured to comprise: (1) a Distance Measurement Device (DMD) installed along the roadway to measure the distance from a vehicle to the DMD; (2) a storage device that stores a lane configuration, CRM location information, and DMU location information; (3) a computing module to match the vehicle real-time position with the location of one or more DMUs (e.g., at least two DMU) and the network of CRMs; and (4) a communication module to transmit the vehicle real-time location information to the vehicle, the network of DMUs, and the network of CRMs.

In some embodiments, the Distance Measurement Device (DMD) comprises one or a plurality of the following devices: radar (e.g., millimeter radar, microwave radar, infrared radar, ultrasonic radar), lidar, camera, BLUETOOTH component, and/or a cellular transceiver.

In some embodiments, the computing module in the DMU uses a triangular position identification method to calculate the vehicle relative position with respect to DMUs (e.g., at least two DMU, at least two adjacent DMU, at least two DMU that are closest to the vehicle, and/or at least two adjacent DMU that are closest to the vehicle) and virtual roadway configuration, wherein the triangular position identification method comprises a two-dimensional position identification method for a level grade road and a three-dimensional position identification method for a road with upgrade or downgrade.

In some embodiments, the technology provides a roadside DMU configured to identify the locations and positions of objects on the roadway and in the driving environment for a vehicle. In some embodiments, the technology provides a roadside DMU configured to detect and identify objects on the roadway and in the driving environment for a vehicle. Exemplary objects on the roadway and in the driving environment for a vehicle are various objects affecting vehicle driving (e.g., other vehicles, bicycles, pedestrians, animals, obstacles, construction, incidents, signage, markings, and/or traffic control devices).

In some embodiments, the OBM2 in the R-CRM System is configured to receive real-time location information of the vehicle from the roadside DMU and match the vehicle relative position with respect to one or more CRMs (e.g., at least two CRM), virtual roadway configuration, and/or key points of the central line of a driving lane.

In some embodiments, one or more of the subcomponents of the R-CRM System is a physical subsystem. In some embodiments, the R-CRM System is configured to support an automated driving system (ADS). Specifically, in some embodiments, the R-CRM System is configured to support a connected and automated vehicle highway (CAVH) system. See, e.g., U.S. Pat. No. 10,380,886 and U.S. Pat. App. Pub. No. 2019/0340921, each of which is incorporated herein by reference.

In some embodiments, the R-CRM System is configured to support an ADS by providing one or more Connected Reference Markers (CRM) and an OBM2 to the ADS. In some embodiments, the R-CRM System is configured to support an ADS for all weather conditions by providing one or more Connected Reference Markers (CRM) and an OBM2 to the ADS. In some embodiments, the R-CRM System is configured to support an ADS when the roads and road markings are not optically detectable by either CAVH sensors or CAV sensors by providing one or more CRMs and an OBM2 to the ADS.

In some embodiments, the DMU of the R-CRM System is configured to support an RSU (also known as an RIU) system and/or network (see, e.g., U.S. Pat. No. 10,380,886 and U.S. Pat. App. Pub. No. 20200168081, each of which is incorporated herein by reference) or an IRT system (see, e.g., U.S. patent application Ser. No. 17/192,529, incorporated herein by reference). In some embodiments, the DMU is configured to support an IRIS (see, e.g., U.S. Pat. No. 10,380,886 and U.S. Pat. App. Pub. No. 20200168081, each of which is incorporated herein by reference). In some embodiments, an IRIS comprises a number of DMU.

For example, in some embodiments, e.g., as shown in FIG. 1A, the technology provides a CRM System. The CRM System 101 comprises structural components: CRM 102 and Roadside communication system 103. Further, in some embodiments, e.g., as shown in FIG. 1B, the technology provides an Advanced CRM System (A-CRM System). The A-CRM System 104 comprises structural components: COU 105, CRM 106, and Roadside communication system 103.

In some embodiments, e.g., as shown in FIG. 2A and FIG. 2B, the technology provides a CRM having a design and configuration. As shown in FIG. 2A, the basic configuration of CRM 201 comprises three modules: Power Supply Unit 202, Data Storage Module 203, and Communication Module 204. The Power Supply Unit converts and regulates power for the internal components of a CRM. The Data Storage Module 203 stores basic information of the CRM (e.g., CRM identifier; position and/or location information including, e.g., the latitude, longitude, and/or altitude of the CRM). The Communication Module 204 exchanges (e.g., sends and receives) information between CRM 201 and vehicles. As shown in FIG. 2B, another configuration of CRM adds a Data Processing Module 205 to improve and enhance the CRM functions. The Data Processing Module 205 can provide the CRM with the ability to process data from the Data Storage Module 203.

Figure 3:
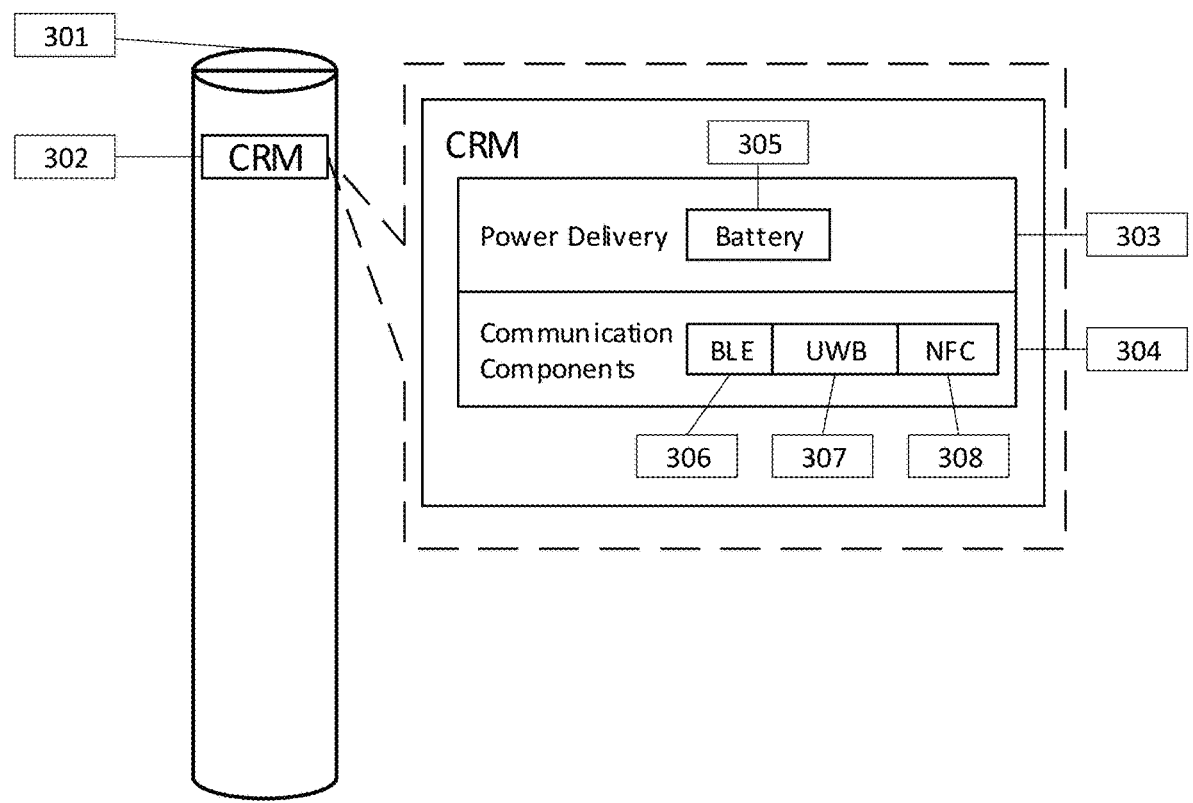
FIG. 3 is a schematic drawing showing various elements of a CRM. 301: Roadside pole; 302: Connected reference marker; 303: Power delivery unit; 304: Communication components; 305: Battery; 306: BLUETOOTH (e.g., BLUETOOTH low energy) component; 307: Ultra-wideband transceiver; 308: Near-field communication.

In some embodiments, e.g., as shown in FIG. 3, the technology provides a Connected Reference Marker (CRM) 302. In some embodiments, the CRM is installed on a roadside pole 301. In some embodiments, the CRM comprises two components: power delivery unit 303 and one or more communication components 304. The power delivery unit contains a battery 305. As an example, the communication components 304 comprise a BLUETOOTH (e.g., BLUETOOTH low energy) component transceiver 306, an ultra-wideband transceiver 307, and/or a near-field communication chip 308.

Figure 4A:
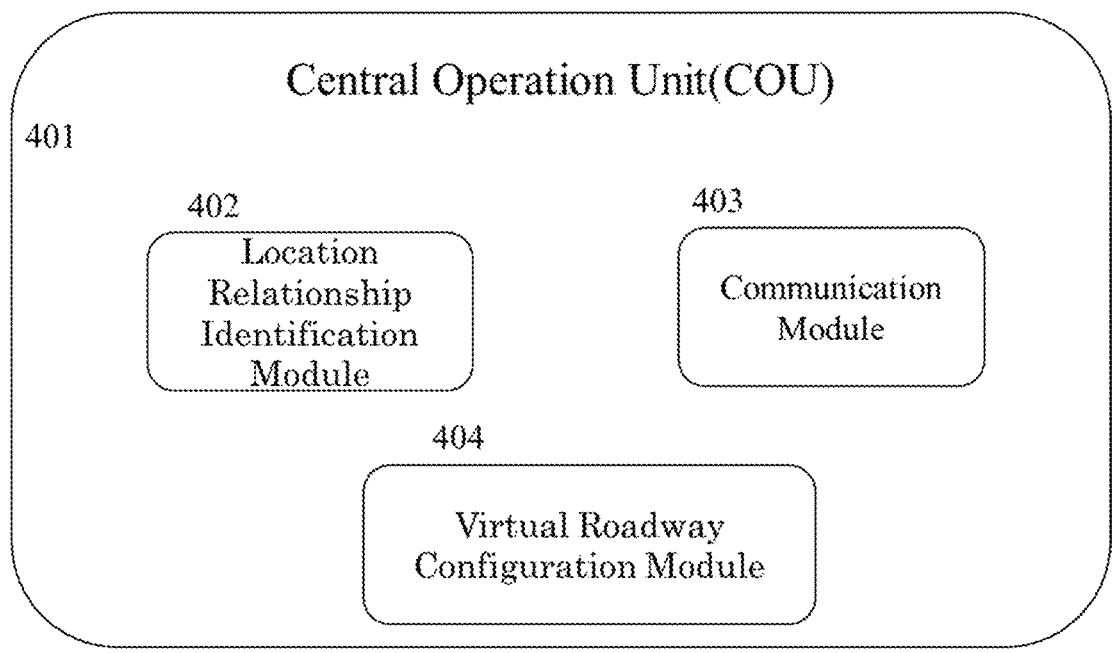
FIG. 4A is a drawing showing the design and elements of a first embodiment of a COU (panel i) and a second embodiment of a COU (panel ii). 401: COU; 402: Location Relationship Identification Module; 403: Communication Module; 404: Virtual Roadway Configuration Module; 405: HD Map Module
Figure 4A:
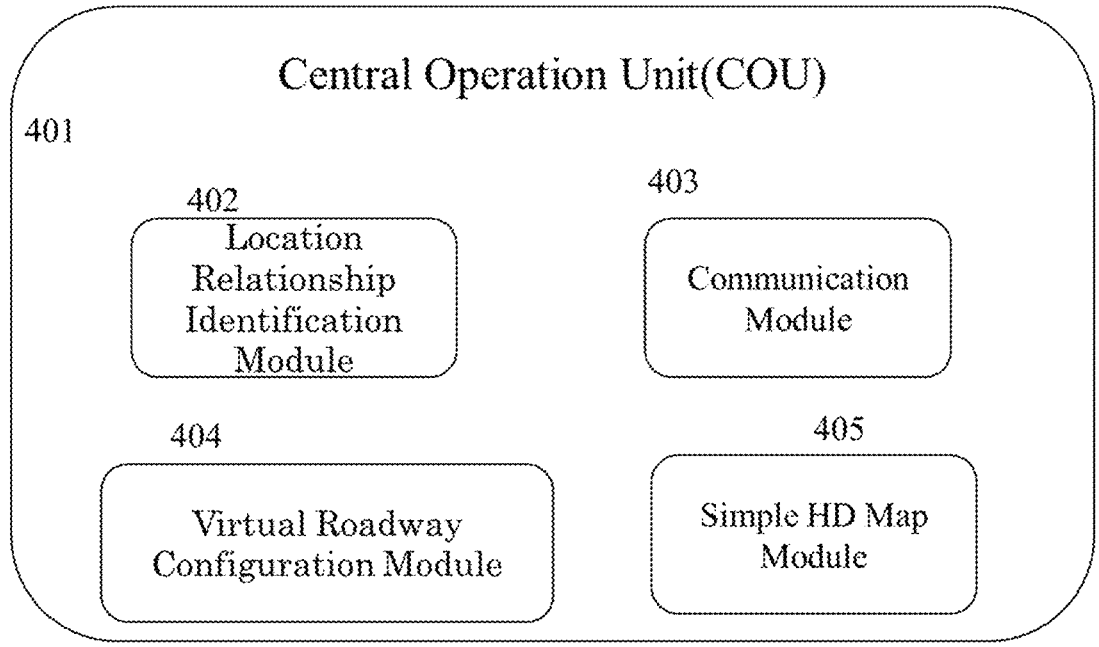

In some embodiments, e.g., as shown in FIG. 4A, the technology provides a Central Operations Unit (COU). In some embodiments, e.g., as shown in FIG. 4A, panel (i), the COU 401 comprises a Location Relationship Identification Module 402, a Communication Module 403, and a Virtual Roadway Configuration Module 404. In some embodiments, another configuration of the COU 401 provides a COU 401 that is enhanced with an additional HD Map Module 405 as shown in FIG. 4A, panel (ii). The HD Map Module 405 improves the accuracy of the location relationship identification for the Virtual Roadway Configuration Module 404.

Figure 4B:
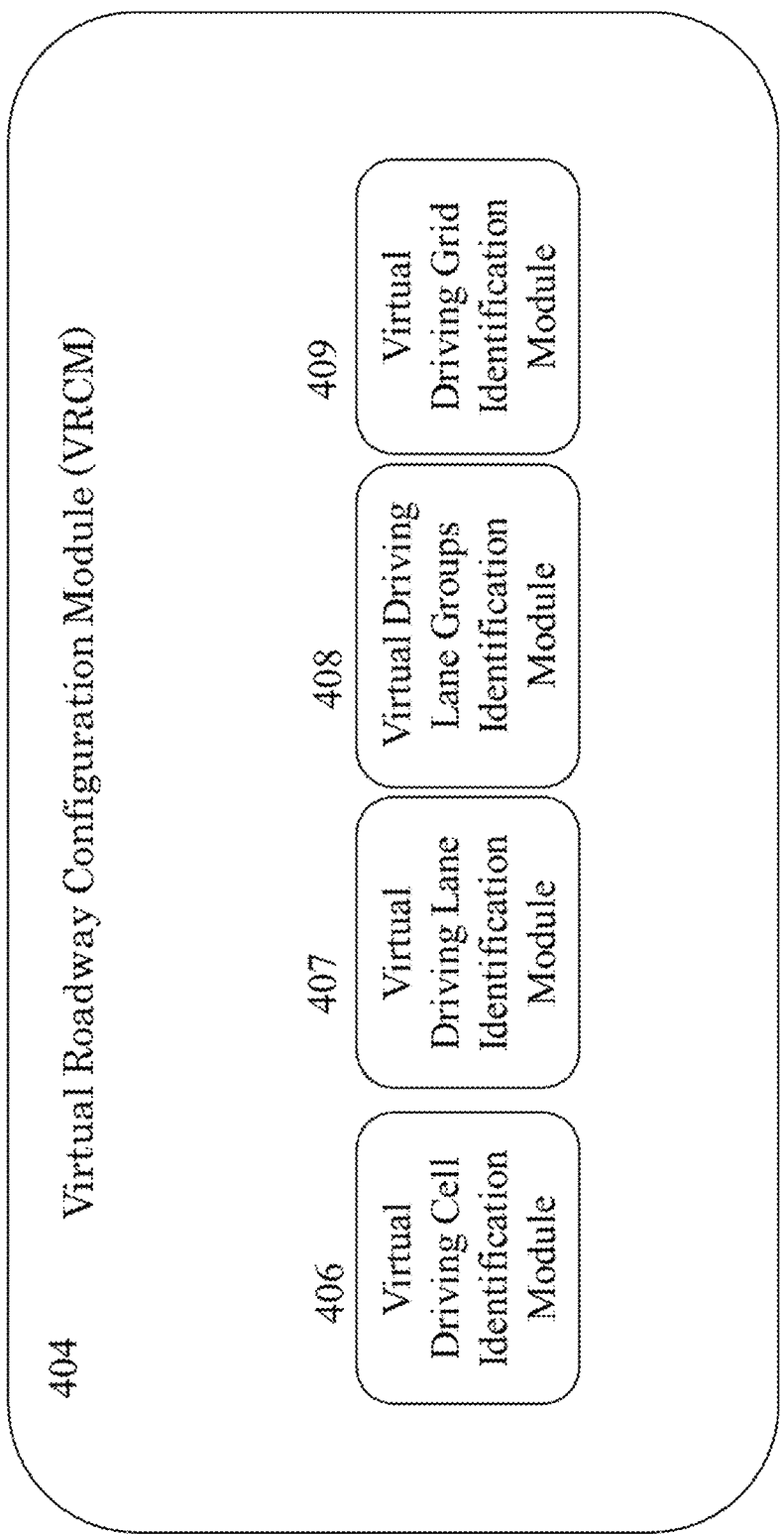
FIG. 4B is a drawing showing the design and various elements of a VRCM. 404: Virtual Roadway Configuration Module; 406: Virtual Driving Cell Identification Module; 407: Virtual Driving Lane Identification Module; 408: Virtual Driving Lane Group Identification Module; 409: Virtual Driving Grid Identification Module.

FIG. 4B shows an embodiment of the Virtual Roadway Configuration Module (VRCM) 404. In some embodiments, the VRCM is included in the COU (e.g., the COU comprises the VRCM). In some embodiments, the VRCM is operated independently. As shown in FIG. 4B, in some embodiments, the Virtual Roadway Configuration Module 404 comprises a Virtual Driving Cell Identification Module (VDCIM) 406, a Virtual Driving Lane Identification Module 407, a Virtual Driving Lane Group Identification Module 408, and a Virtual Driving Grid Identification Module 409.

In some embodiments, the technology provides methods for providing (e.g., constructing) a Virtual Roadway Configuration, e.g., as illustrated in FIG. 5, FIG. 6, FIG. 7, FIG. 8A, FIG. 8B, FIG. 8C and FIG. 8D. In some embodiments, an HD map is not needed to develop the Virtual Roadway Configuration (e.g., in HD map-free embodiments of a CRM System).

Figure 5:
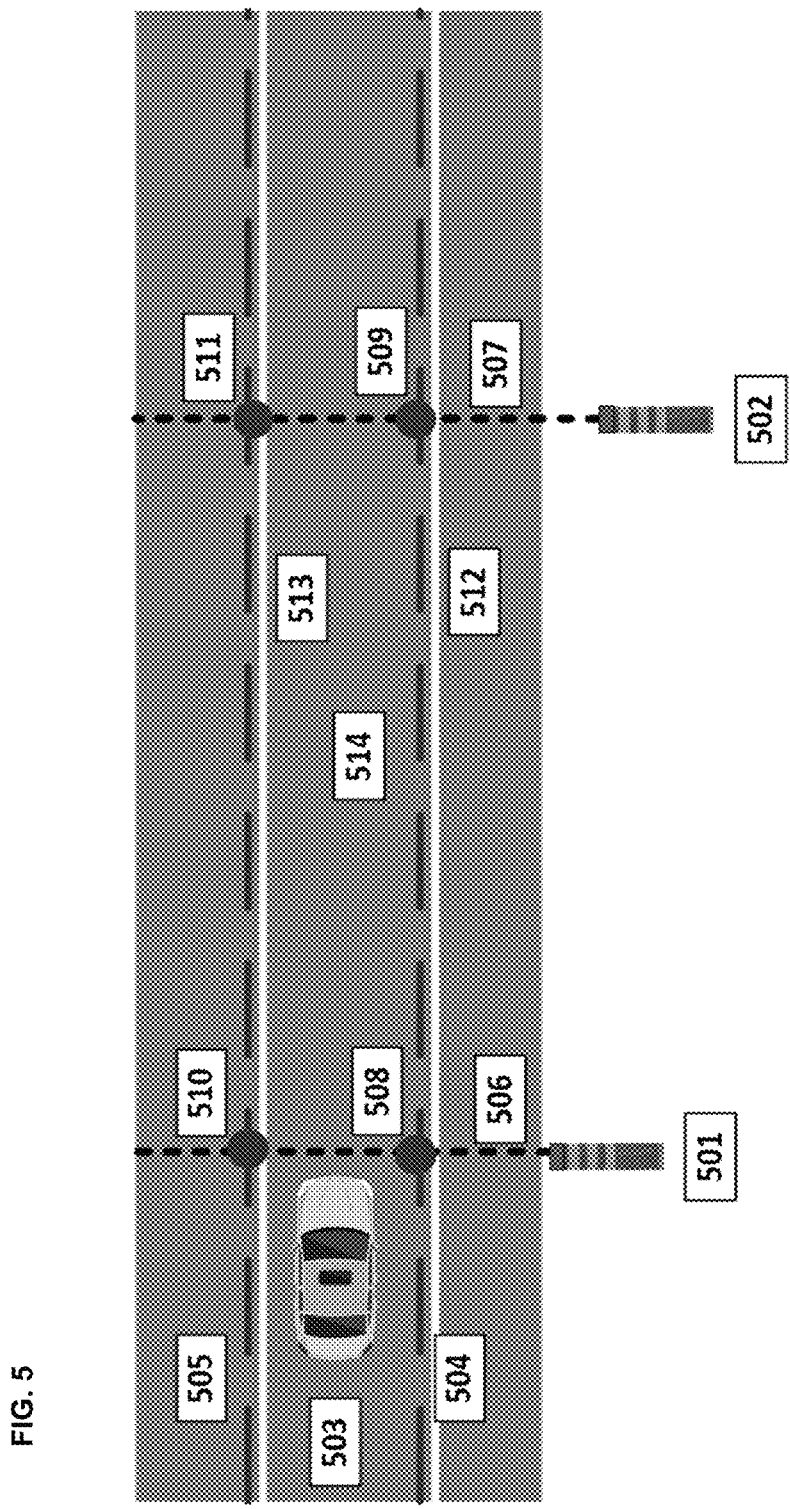
FIG. 5. is a drawing illustrating the method for identification of virtual driving cell for a single lane. 501: CRM 1; 502: CRM 2; 503: Roadway Driving Lane 1; 504: Roadway Division Line 1; 505: Roadway Division Line 2; 506: Reference Line 1; 507: Reference Line 2; 508: Reference Point 1; 509: Reference Point 2; 510: Reference Point 3; 511: Reference Point 4; 512: Virtual Division Line 1; 513: Virtual Division Line 2; 514: Virtual Driving Cell 1.

In some embodiments, e.g., as shown in FIG. 5, the technology provides systems and methods for providing (e.g., constructing) and/or identifying a virtual driving cell for a single lane. The VDCIM selects two CRMs, CRM1 501 and CRM2 502. Then, the VDCIM identifies roadway driving lane 1 503; and the VDCIM identifies roadway division line 1 504 and roadway division line 2 505, e.g., based on the standard lane width (e.g., approximately 12 feet). From CRM1 501 and CRM2 502, the VDCIM draws corresponding reference line 1 506 and reference line 2 507, which are perpendicular to the pre-measured actual roadway division lines 504 and 505. Subsequently, the VDCIM identifies the positions of reference point 1 508 and reference point 2 509, where the reference lines 506 and 507 intersect with the pre-measured actual roadway division line 504 (and, optionally, identifies the reference points where the reference lines 506 and 507 intersect with the pre-measured actual roadway division line 505). Furthermore, the VDCIM connects reference point 1 508 and reference point 2 509 to generate the virtual division line 1 (dotted line) 512, and the VDCIM draws the virtual division line 2 (dotted line) 513 based on the standard lane width. Therefore, the two reference lines 506 and 507 and the two virtual division lines 512 and 513 form a rectangle to provide the virtual driving cell 1 514.

Figure 6:
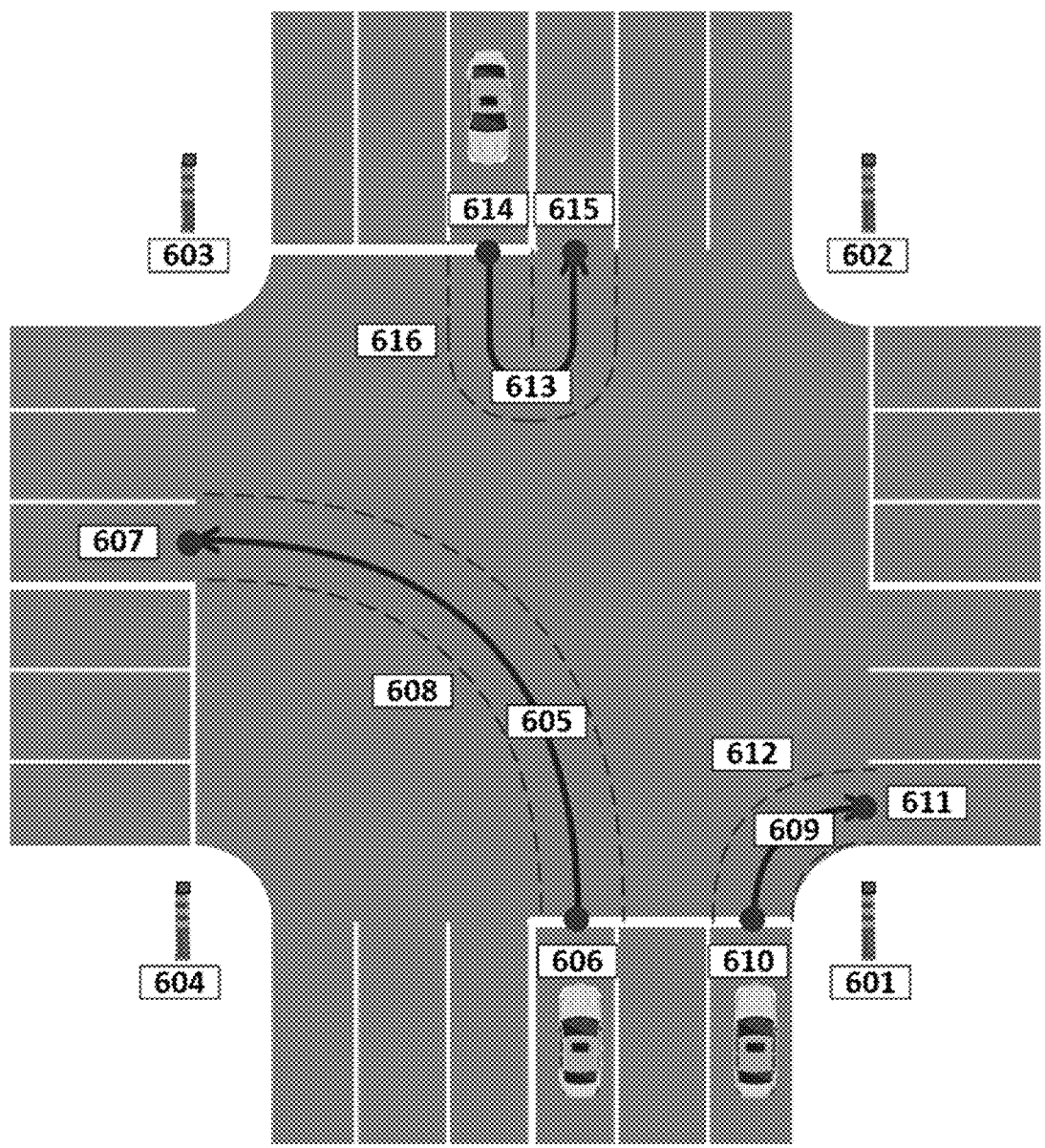
FIG. 6 is a drawing illustrating the method for identification of virtual driving cell for an intersection. 601: CRM 1; 602: CRM 2; 603: CRM 3; 604: CRM 4; 605: Central line of left-turn movement; 606: Start point of the central line of left-turn movement; 607: End point of the central line of left-turn movement; 608: Left-turn virtual cell (dotted lines); 609: Central line of right-turn movement; 610: Start point of the central line of right-turn movement; 611: End point of the central line of right-turn movement; 612: Right-turn virtual cell (dotted lines); 613: Central line of U-turn movement; 614: Start point of central line of U-turn movement; 615: End point of central line of U-turn movement; 616: U-turn virtual cell (dotted lines).

In some embodiments, e.g., as shown in FIG. 6, the technology provides systems and methods for providing (e.g., constructing) and/or identifying a virtual driving cell for an intersection, including a left-turn, right-turn, and U-turn virtual cell configuration. In some embodiments, at least four CRMs are installed at the intersection, e.g., CRM1 601, CRM2 602, CRM3 603, and CRM4 604 at the four corners of the intersection, respectively. The VDCIM draws two virtual division lines each at a distance of half the standard road width (e.g., approximately 6 feet) from a central line indicating the path of vehicle travel. The area between the two virtual division lines forms the virtual cell. Specifically, for left-turn movement, the VDCIM draws the virtual division lines on each side of the central line of left-turn movement 605 at a distance of half standard road width (e.g., approximately 6 feet). The area between the two virtual division lines forms the left-turn virtual cell 608, which has a start point of left-turn central line 606 to the end point of left-turn central line 607. Similarly, for right-turn movement, the VDCIM draws the virtual division lines on each side of the central line of right-turn movement 609 at a distance of half standard road width (e.g., approximately 6 feet). The area between the two virtual division lines forms the right-turn virtual cell 612, which has a start point of left-turn central line 610 to the end point of left-turn central line 611. Also, for U-turn, the VDCIM draws the virtual division lines on each side of the central line of U-turn movement 613 at a distance of half standard road width (e.g., approximately 6 feet). The area between the two virtual division lines forms the U-turn virtual cell 616, which has a start point of left-turn central line 614 to the end point of left-turn central line 615. The key points of the central line for a turning movement and their relationship with CRMs are further illustrated in FIG. 11.

Figure 7:
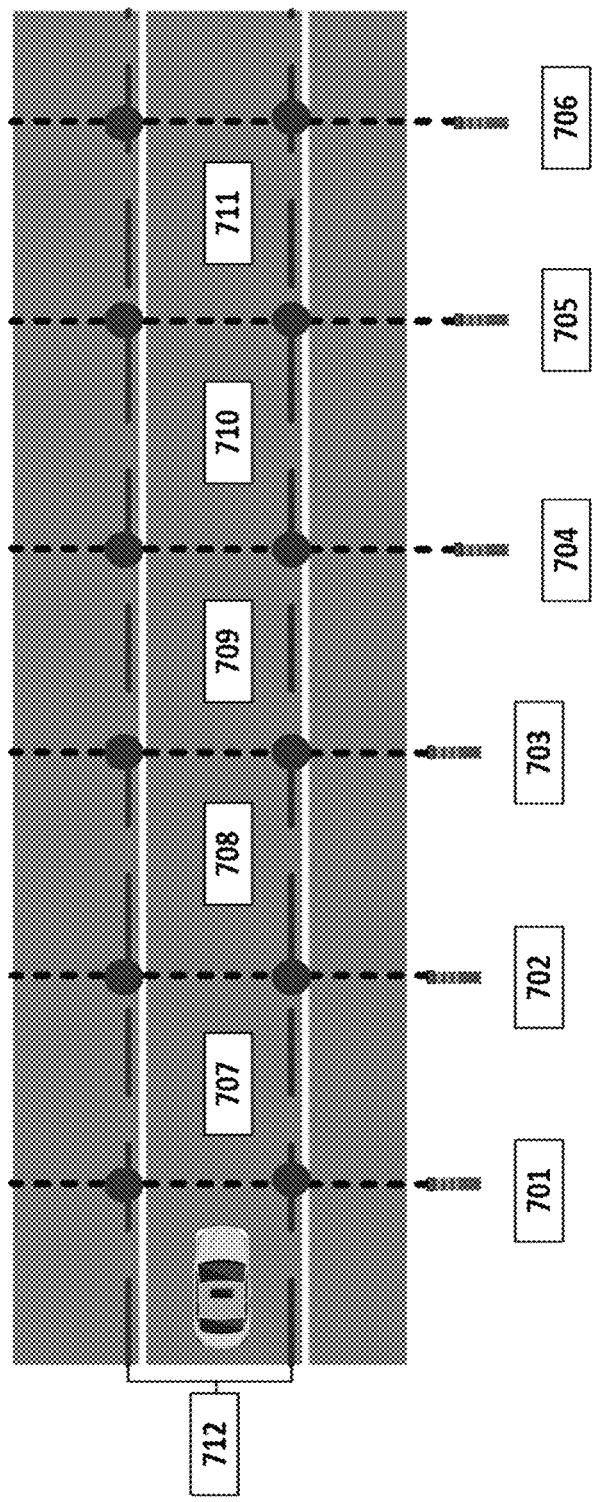
FIG. 7 is a drawing illustrating the method for identification of virtual driving lane for a single lane. 701: CRM 1; 702: CRM 2; 703: CRM 3; 704: CRM 4; 705: CRM 5; 706: CRM 6; 707: Virtual cell 1; 708: Virtual cell 2; 709: Virtual cell 3; 710: Virtual cell 4; 711: Virtual cell 5; 712: Virtual driving lane.

In some embodiments, e.g., as shown in FIG. 7, the technology provides systems and methods for providing (e.g., constructing) and/or identifying a virtual driving lane for a single lane. The virtual driving lane 712 is formed by connecting continuous (e.g., adjacent) virtual driving cells 707, 708, 709, 710, and 711 along the longitudinal direction in a single lane. The virtual driving cells 707, 708, 709, 710, and 711 are determined using CRMs 701, 702, 703, 704, 705, and 706, respectively, on the roadside.

Figure 8A:
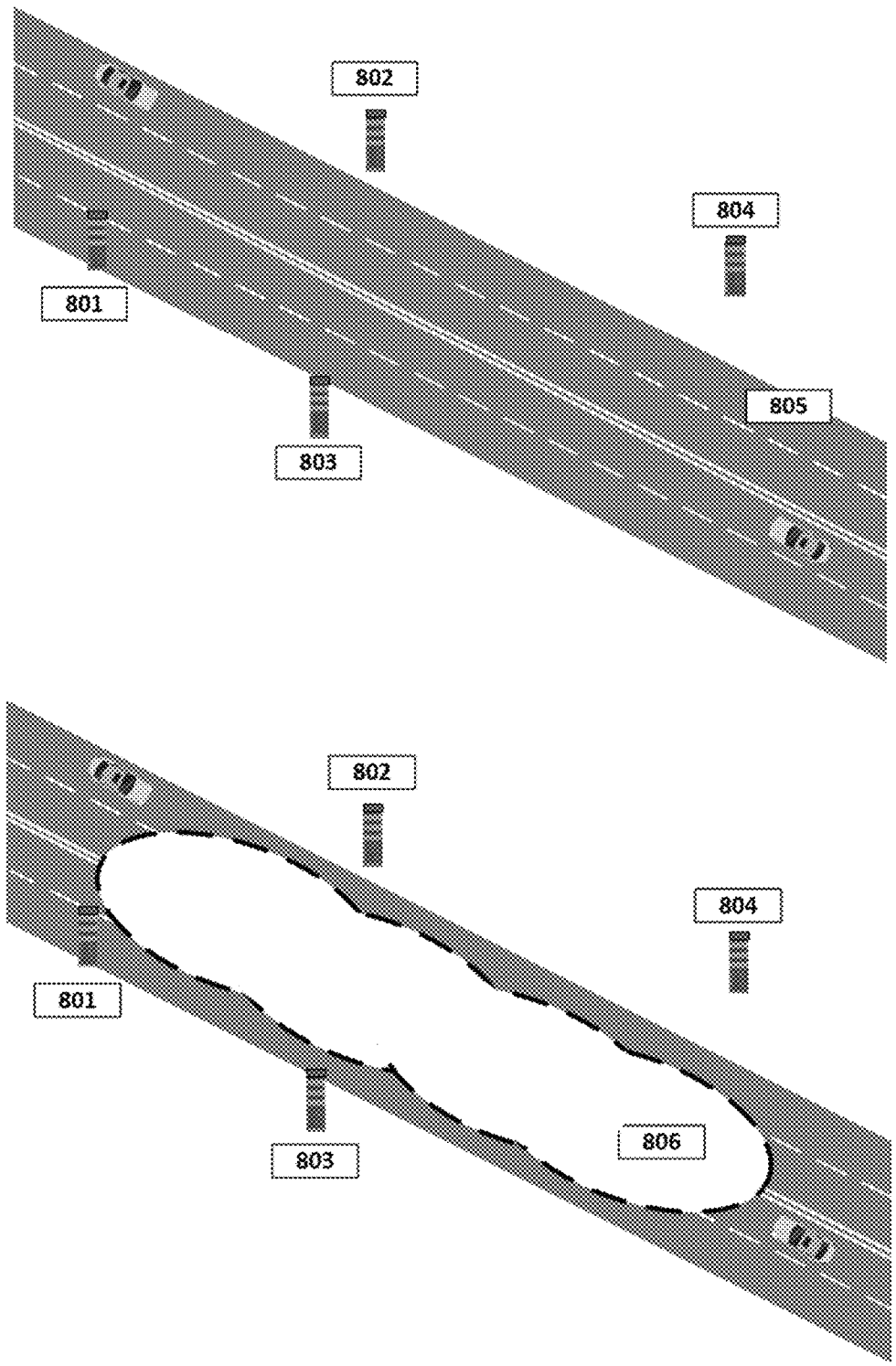
FIG. 8A is an example of virtual driving lane identification for a snow scenario. 801: CRM 1; 802: CRM 2; 803: CRM 3; 804: CRM 4; 805: Division line of roadway driving lane; 806: Snow covered area; 807: Reference line; 808: Reference point; 809: Division line of virtual driving lane.
Figure 8A:
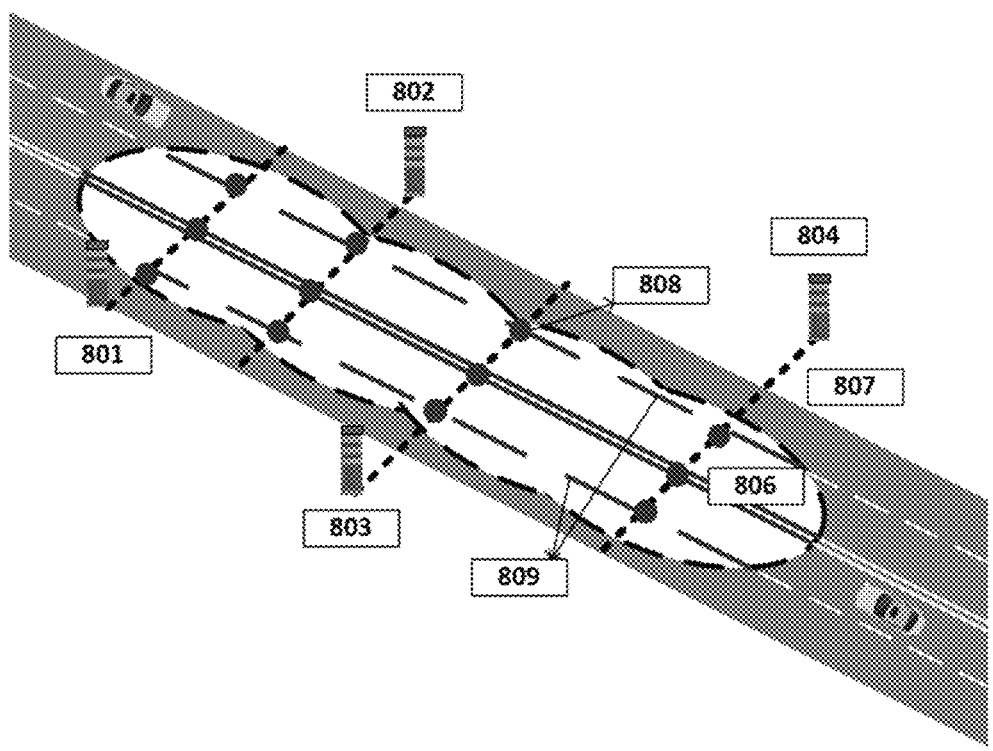

In some embodiments, e.g., as shown in FIG. 8A, the technology provides systems and methods for identifying a virtual driving lane when the physical driving lane (e.g., road markings, etc.) is obscured (e.g., covered by snow). For example, when the division line of roadway driving lane 805 is covered by the snow 806, the VDCIM draws corresponding reference lines 807 from each CRM 801, 802, 803, and 804 and identifies the positions of reference points 808, where each reference line 807 intersects the pre-measured actual division line of roadway driving lane 805. Then, the VDCIM connects these identified reference points 807 to generate the division line of virtual driving lane 809.

Figure 8B:
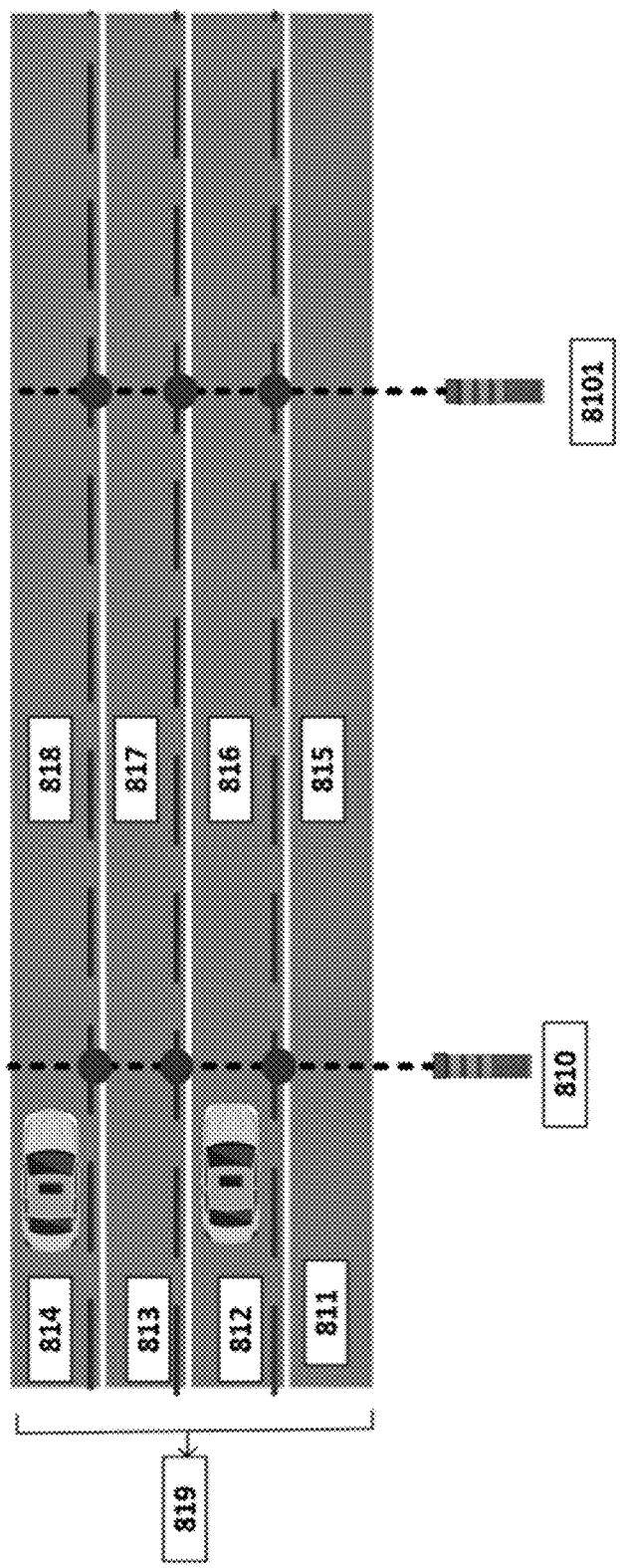
FIG. 8B is a drawing illustrating the method for identification of virtual driving lane group for multiple lanes. 810: CRM 1; 8101: CRM 2; 811: Roadway driving lane 1; 812: Roadway driving lane 2; 813: Roadway driving lane 3; 814: Roadway driving lane 4; 815: Virtual driving lane 1; 816: Virtual driving lane 2; 817: Virtual driving lane 3; 818: Virtual driving lane 4; 819: Virtual driving lane group.

In some embodiments, e.g., as shown in FIG. 8B, the technology provides systems and methods for forming a virtual driving lane group for multiple lanes. For example, a set of virtual driving lanes 815, 816, 817, and 818 (e.g., laterally adjacent virtual driving lanes) are grouped to provide a virtual driving lane group 819 for multiple roadway lanes 811, 812, 813, and 814. The different virtual driving lanes 815, 816, 817, and 818 are determined using CRMs 810 and 8101 on the roadside (e.g., as described above).

Figure 8C:
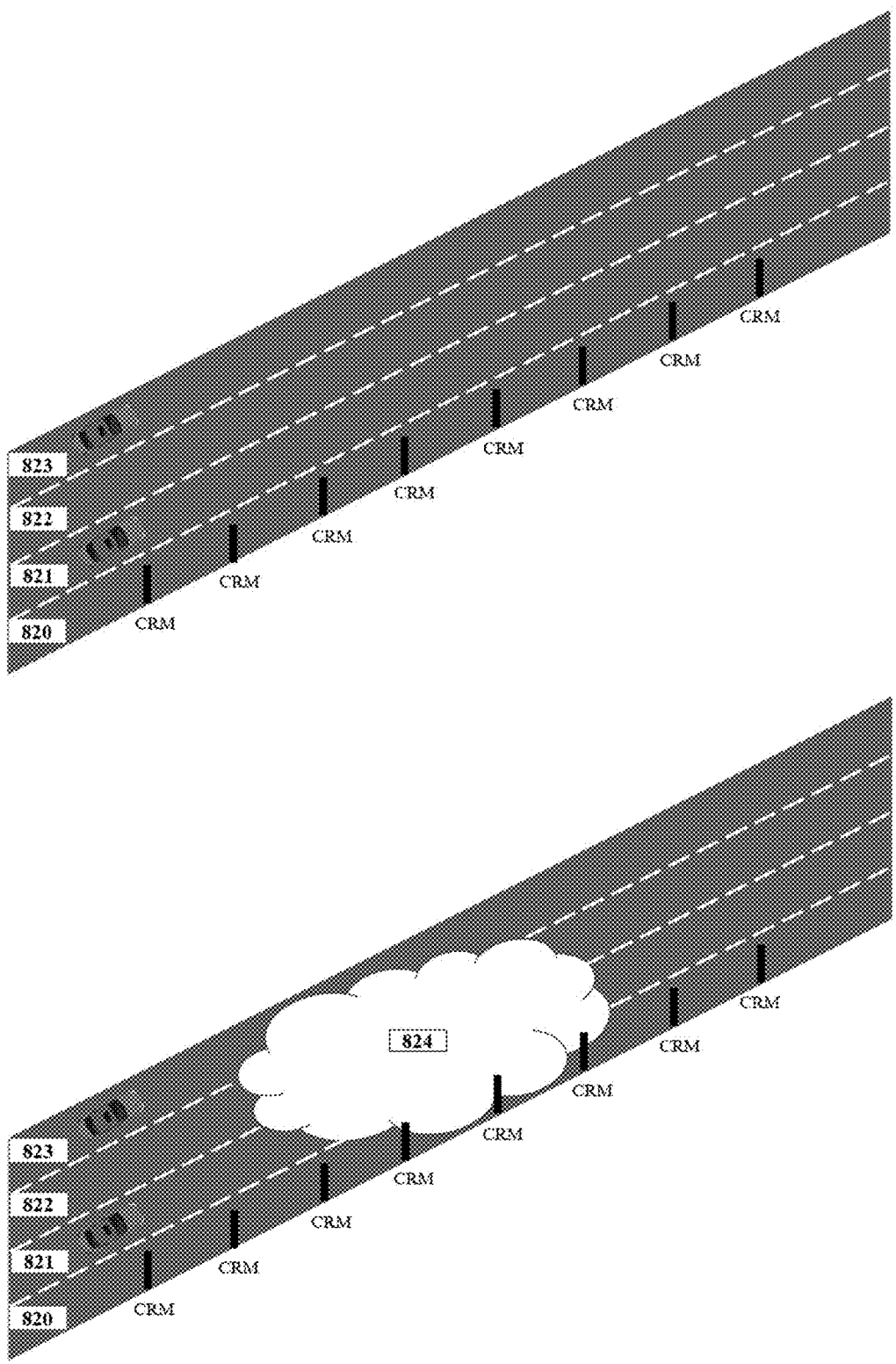
FIG. 8C is an example of virtual driving lane group identification for snow scenario. 820: Roadway driving lane 1; 821: Roadway driving lane 2; 822: Roadway driving lane 3; 823: Roadway driving lane 4; 824: Snow covered area; 825: CRM sensing range; 826: Reference line; 827: Identified reference point; 828: Identified virtual driving division line 1; 829: Calculated reference point; 830: Calculated virtual driving division line 2; 831: Calculated virtual driving division line 3.
Figure 8C:
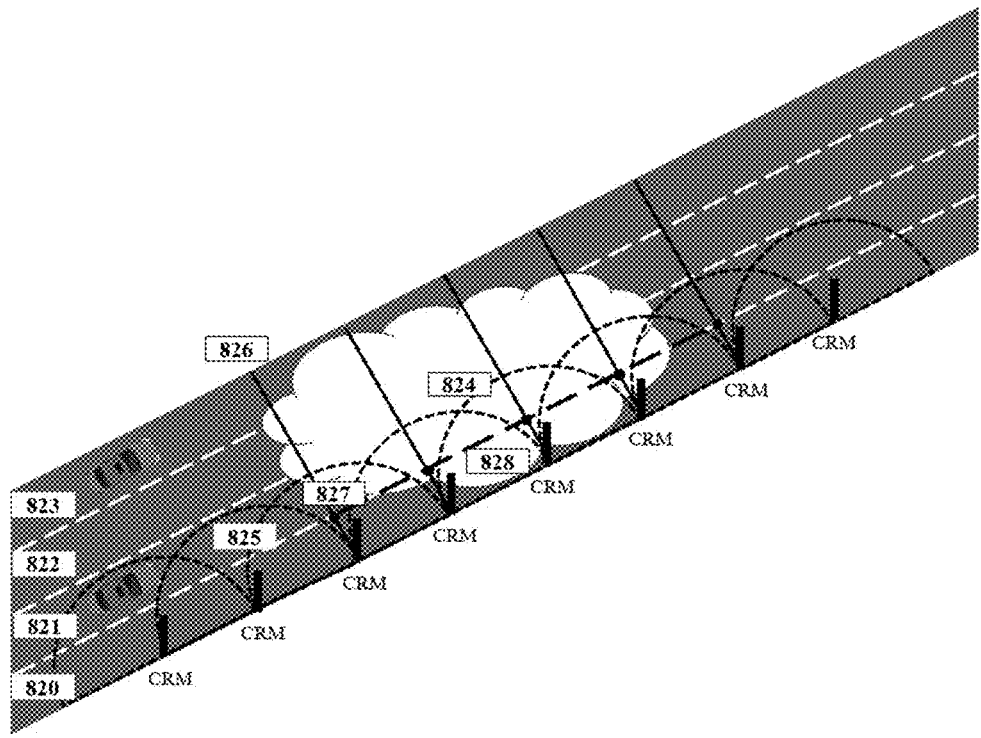
Figure 8C:
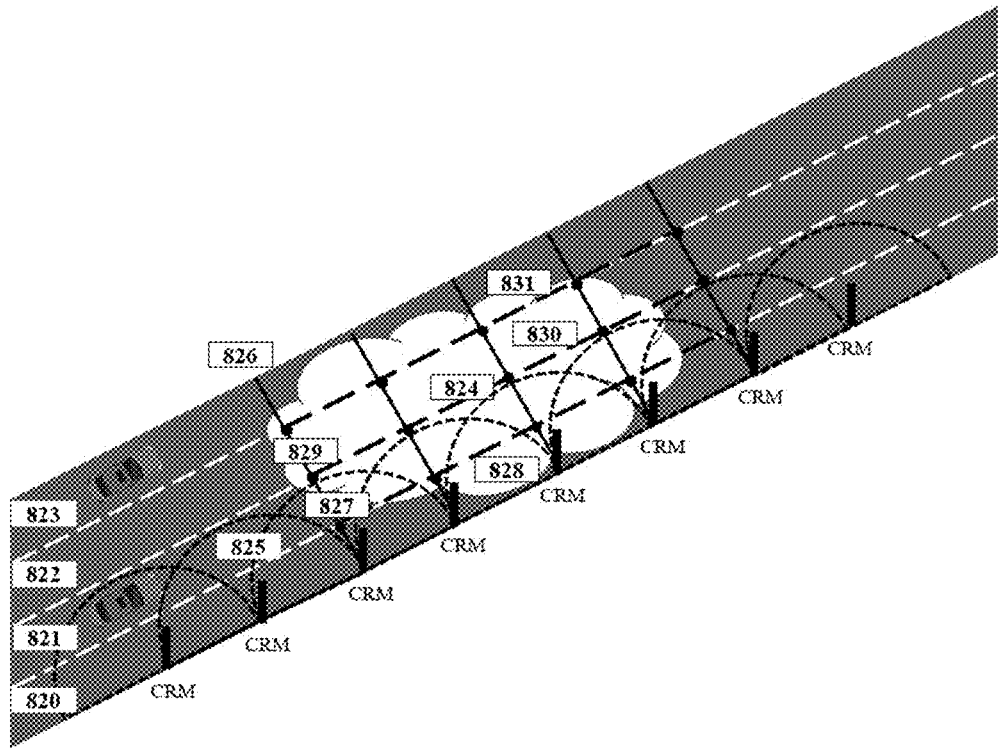

In some embodiments, e.g., as shown in FIG. 8C the technology provides systems and methods for identifying a virtual driving lane group when physical driving lanes (e.g., road markings, etc.) is/are obscured (e.g., covered by snow). When the roadway driving lane 1 820, roadway driving lane 2 821, roadway driving lane 3 822, and roadway driving lane 4 823 are covered by the snow 824, the VDCIM draws corresponding reference lines 826 and identifies the positions of identified reference points 827, whose positions are within the CRM sensing range 825. Then, the VDCIM connects these identified reference points 827 to generate the identified virtual driving division line 1 (black dotted line) 828. After the identified virtual driving division line 1 828 is generated as a reference baseline, the VDCIM calculates the positions of the calculated reference point 829 based on a pre-designed lane width and connects these calculated reference points 829 to generate the calculated virtual driving division line 2 (black dotted line) 830 and the calculated virtual driving division line 3 (black dotted line) 831.

Figure 8D:
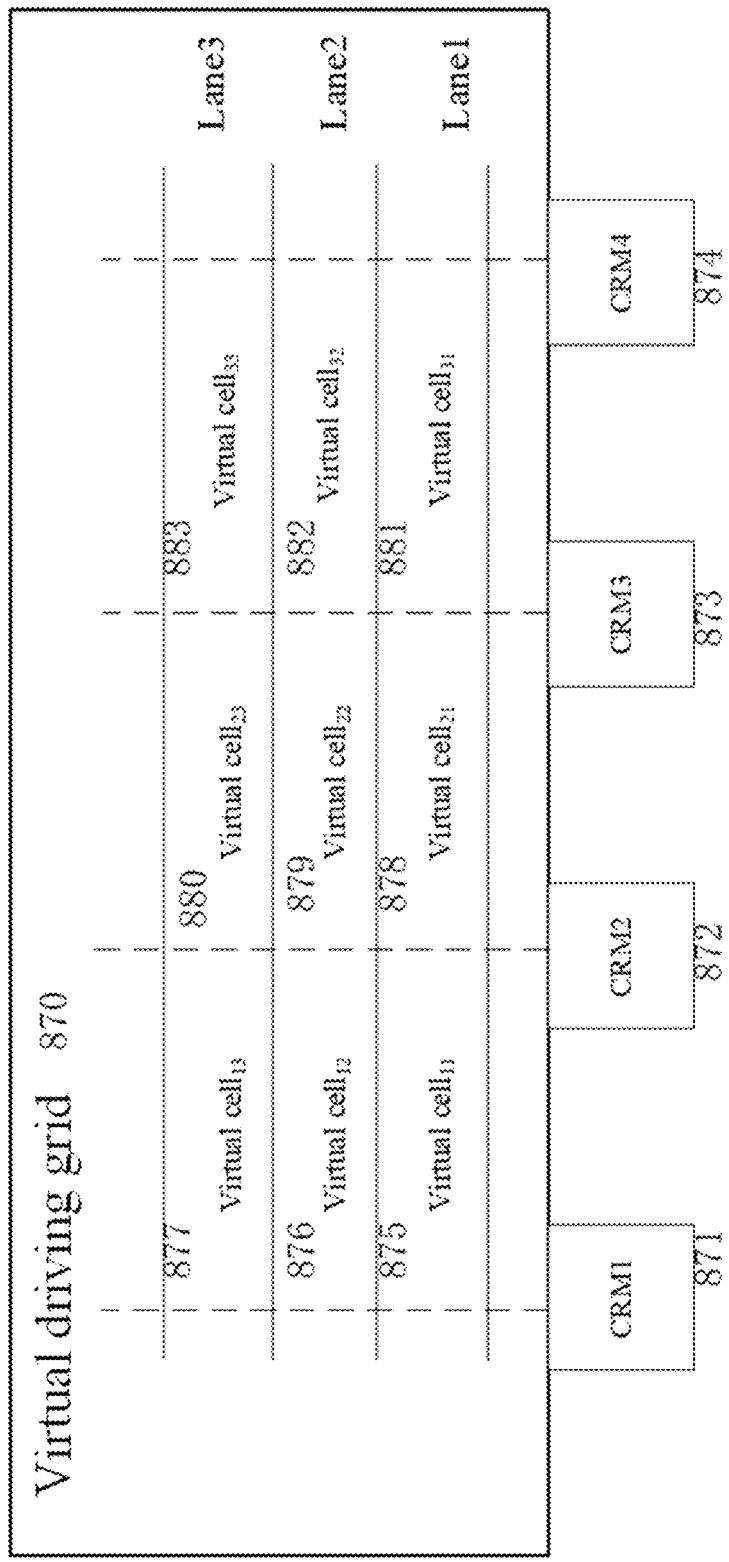
FIG. 8D is a drawing illustrating the method for identification of virtual driving grid for multiple lanes. 870: Virtual driving grid; 871: CRM 1; 872: CRM 2; 873: CRM 3; 874: CRM 4; 875: Virtual cell$_{11}$; 876; Virtual cell$_{12}$; 877: Virtual cell$_{13}$; 878: Virtual cell$_{21}$; 879: Virtual cell$_{22}$; 880: Virtual cell$_{23}$; 881: Virtual cell$_{31}$; 882: Virtual cell$_{32}$; 883: Virtual cell$_{33}$.

In some embodiments, e.g., as shown in FIG. 8D, the technology provides systems and methods for forming a virtual driving grid. For example, in some embodiments, the virtual driving grid 870 is formed by connecting a grid of virtual cells, including virtual $cell_{11}$ 875, virtual $cell_{12}$ 876, virtual $cell_{13}$ 877, virtual $cell_{21}$ 878, virtual $cell_{22}$ 879, virtual $cell_{23}$ 880, virtual $cell_{31}$ 881, virtual $cell_{32}$ 882, and virtual $cell_{33}$ 883 from multiple lanes. The virtual driving cells in the grid are provided and/or identified using CRM1 871, CRM2 872, CRM3 873, and CRM4 874 on the roadside.

In some embodiments, the COU location relationship identification module performs a method to implement algorithms illustrated in FIG. 9, FIG. 10, FIG. 11, and FIG. 12. In some embodiments, the methods are performed with help from the HD map module from the COU. In some embodiments, the methods are performed without help from the HD map module from the COU. In some embodiments, the COU identifies the location relationship between key points of the central line of a driving lane and CRMs.

Figure 9:
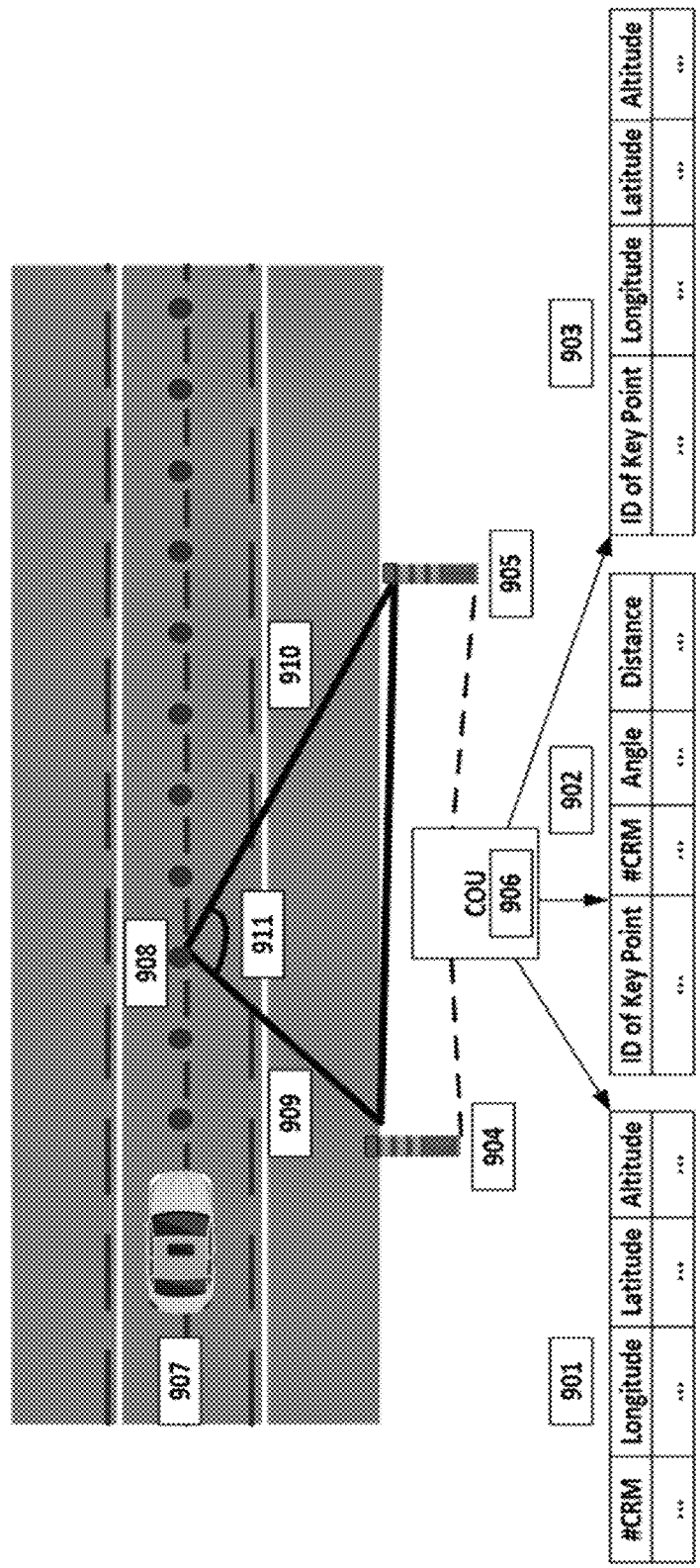
FIG. 9 is a drawing that shows the location relationship between key points of the central line of a driving lane and CRMs. 901: Location table for CRM. 902: Relationship table between CRM and key points; 903: Location table for key points of the central line of a driving lane; 904: CRM1; 905: CRM2; 906: COU; 907: Central line; 908: Key point of the central line of a driving lane; 909: Distance from CRM1 to key point; 910: Distance from CRM2 to key point; 911: The angle between two lines from two CRMs to key point.

In some embodiments, e.g., as shown in FIG. 9, the technology provides systems and methods for determining and/or identifying a location relationship between a key point of the central line of a driving lane and a CRM. As shown in FIG. 9, for a vehicle driving along the straight central line 907, the relationship table 902 records the identifiers of two CRMs (e.g., two adjacent CRM, CRM1 904 and CRM2 905) close to the key point of the central line of a driving lane 908. In some embodiments, lines are provided (e.g., identified and/or defined) from each of the two CRM 904 and 905 to the key point 908. Next, the distances 909 and 910 from CRM1 and CRM2, respectively, to key point 908 are measured, e.g., along the lines provided (e.g., identified and/or defined) from each of the two CRM 904 and 905 to the key point 908. In the example shown in FIG. 9, these distances are 6 meters and 8 meters, respectively. In addition, the angle 911 between the two lines from each of the two CRM 904 and 905 to the key point 908 is measured. In the example shown in FIG. 9, the angel is 90 degrees. The angle is recorded in the relationship table 902. In some embodiments, the relationship table 902 is stored in the COU 906. In addition, the COU 906 stores the location table for CRMs 901, which includes the longitude, latitude, and altitude information for each CRM. In the example shown in FIG. 9, the longitude, latitude, and altitude are 43.0637056 degrees, −89.4009344 degrees, and 261 meters, respectively. In some embodiments, the COU 906 also stores the location table for key points of the central line of a driving lane 903, which includes the longitude, latitude, and altitude information of key points of the central line of a driving lane 908.

Figure 10:
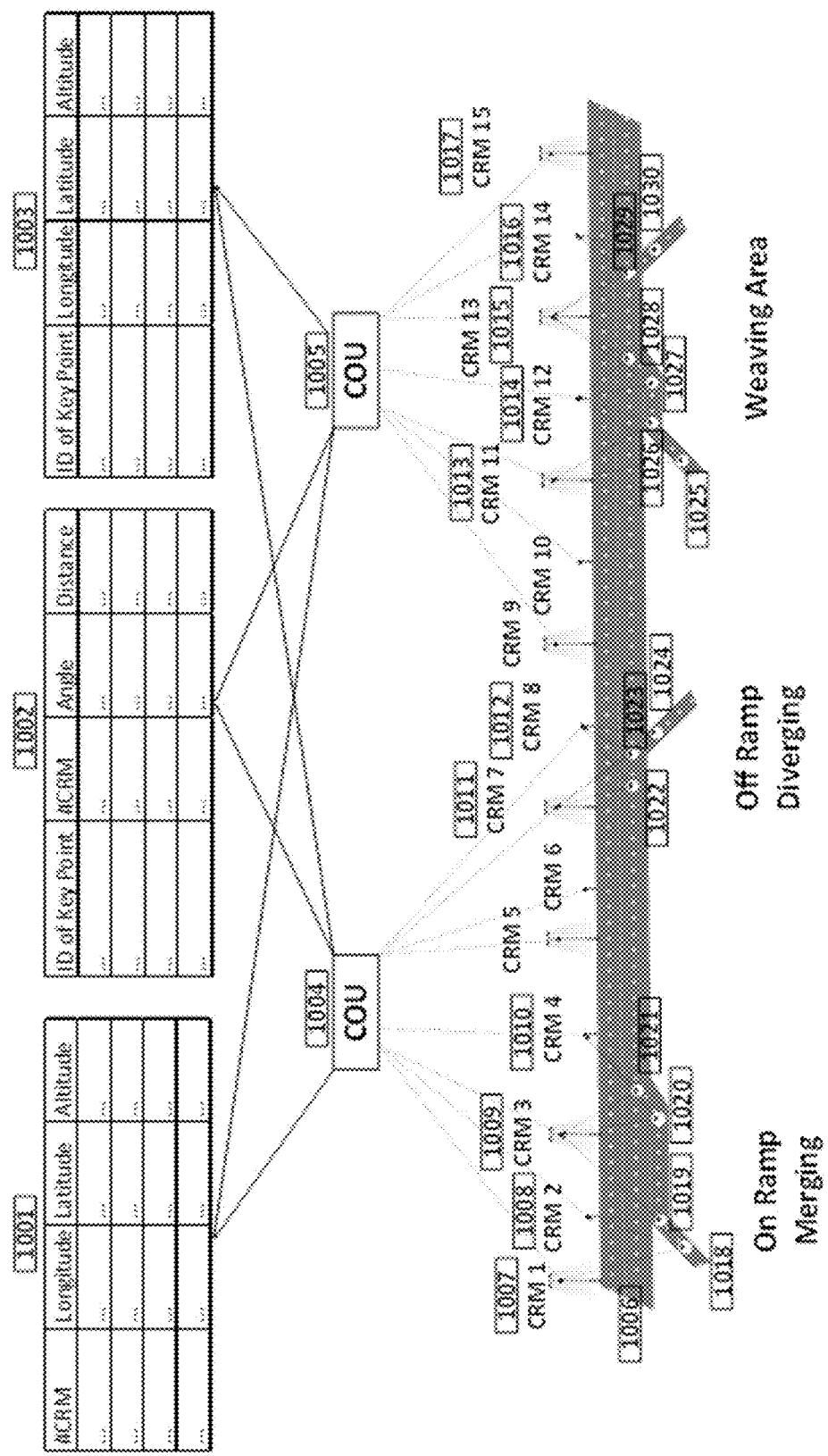
FIG. 10 is a drawing that shows the location relationship between CRM and key points of the central line of the driving lane for on-ramp, off-ramp, merging, diverging, and weaving areas. 1001: Location table for CRM; 1002: Relationship table between key point of the central line of the driving lane and CRMs; 1003: Location table for key points of the central line of the driving lane; 1004: COU1; 1005: COU2; 1006: central line of a driving lane; 1007-1017: CRMs; 1018-1021: Key point of the central line of a driving lane for on-ramp and merging area; 1022-1024: Key point of the central line of a driving lane for off-ramp and diverging area; 1025-1030: Key point of the central line of a driving lane for weaving area.

In some embodiments, e.g., as shown in FIG. 10, the technology provides systems and methods for determining and/or identifying the location relationship between a key point of a central line of a driving lane and CRMs for on-ramp, off-ramp, merging, diverging, and weaving areas. To support a vehicle driving on a central line of a driving lane 1006, either COU1 1004 or COU2 1005 store the relationship table 1002 describing the relationship between CRM 1007-1017 and key points 1018-1030, respectively, using the proximity of CRMs to key points and the coverage of CRMs provided for the key points. For example, the location table of CRM 1001 and the location table of key point 1003 are stored in COU1 1004. For an on-ramp and merging area, at least four key points are selected, e.g., a key point at the center of on-ramp 1018, key points at the corner of on-ramp and acceleration lane 1019, a key point at the merging area and acceleration lane 1020, and a key point at the merging area and mainline lane 1021. The relationship table 1002 describing the relationship between key points and at least two CRMs is stored in COU1 1004. For example, the relationship table 1002 stores the identifiers of two CRMs (CRM1 1007 and CRM2 1008) that are close to the key points for merging at on-ramp 1018, the distance between key point 1018 and CRM1 1007 and the distance between key point 1018 and CRM2 1008, and the angle between two lines from two CRMs (CRM1 1007 and CRM2 1008) to key point 1018. The COU1 1004 also stores the longitude, latitude, and altitude information for each CRM and key point.

For an off-ramp and diverging area, a similar process is used. At least three key points are selected, e.g., a key point at the center of mainline lane 1022, a key point at the corner of off-ramp and diverging area 1023, and a key point on the off-ramp 1024. The relationship table 1002 describing the relationship between key points and at least two CRMs is stored in the COU1 1004. For example, the relationship table 1002 stores the identifiers of two CRMs (e.g., CRM7 1011 and CRM8 1012) that are close to a key point for diverging on off-ramp 1024, the distance between key point 1024 and CRM7 1011 and the distance between key point 1024 and CRM8 1012, and the angle between two lines from the two CRMs (CRM7 1011 and CRM8 1012) to key point 1024. The COU1 1004 also stores the longitude, latitude, and altitude information for CRM7 1011 and CRM8 1012 and key point 1024.

For a weaving area with merging and diverging on a limited length of road, at least six key points are selected, e.g., a key point at the center of on ramp 1025, a key point at the corner of on-ramp and acceleration lane 1026, a key point at the merging area and acceleration lane 1027, a key point at the merging area and mainline lane 1028, a key point at the corner of off-ramp and diverging area 1029, and a key point on the off-ramp 1030. The relationship table 1002 describing the relationship between key points and CRMs is stored in COU2 1005. For example, the relationship table 1002 stores the identifiers of two CRMs (e.g., CRM14 1016 and CRM15 1017) that are close to key point for diverging at off-ramp 1030, the distance between key point 1030 and CRM14 1016 and the distance between key point 1030 and CRM15 1017, and the angle between two lines from two CRMs (e.g., CRM14 1016 and CRM15 1017) to key point 1030. The COU2 1005 also stores the longitude, latitude, and altitude information for each CRM 1016 and 1017 and for key point 1030.

Figure 11:
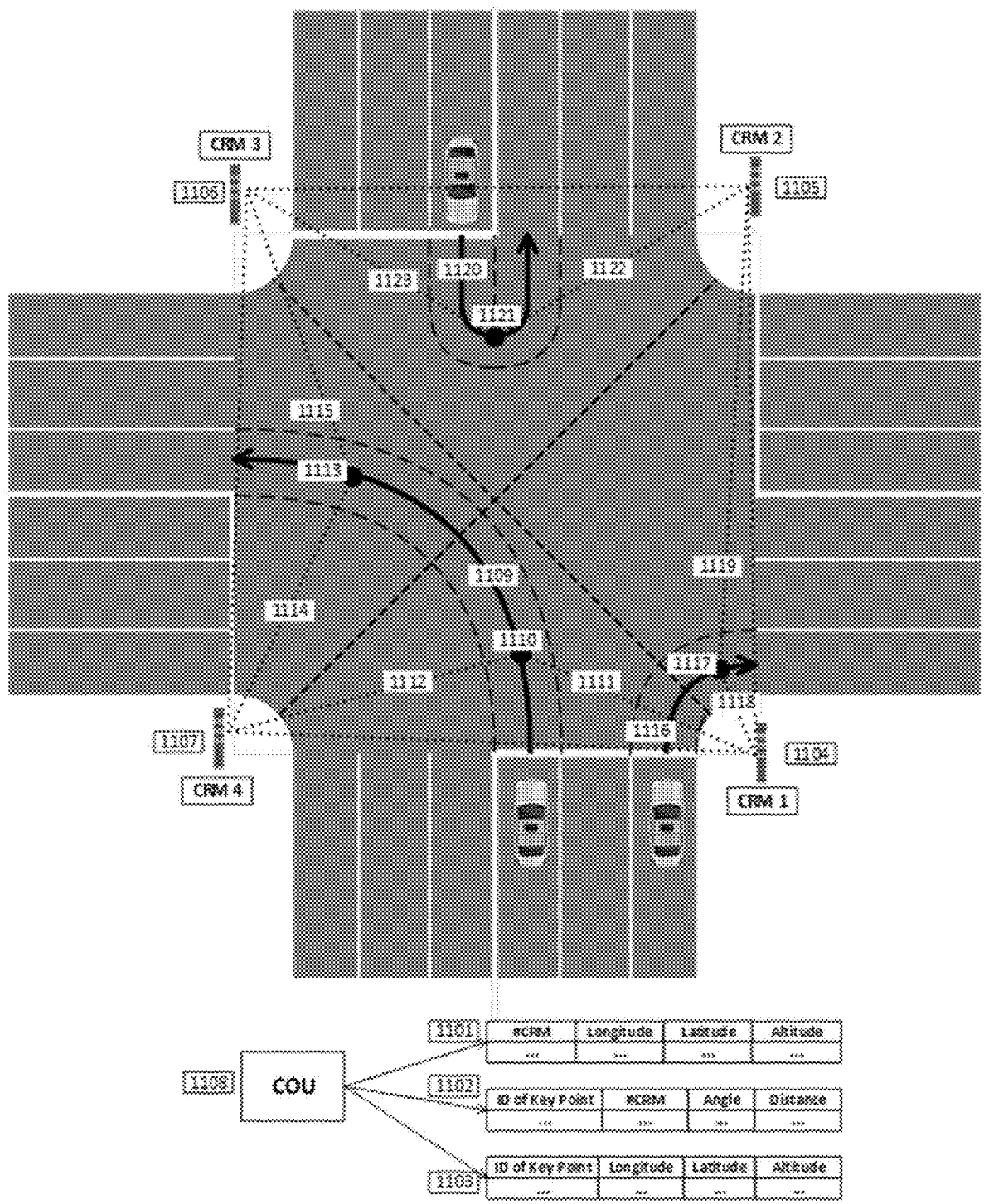
FIG. 11 is a drawing that showing the relationship between CRM and key points of driving central line of left-turn movement, right-turn movement, and U-turn movement at an intersection. 1101: Location table for CRM; 1102 Relationship table between CRM and key points of driving central line; 1103: Location table for key points of driving central line; 1104: CRM1; 1105: CRM2; 1106: CRM3; 1107: CRM4; 1108: COU; 1109: Central line of left-turn movement; 1110: Key point on central line of left-turn movement; 1111: Distance from CRM1 to key point of central line of left-turn movement; 1112: Distance from CRM4 to key point of central line of left-turn movement; 1113: Key point on central line of left-turn movement; 1114: Distance from CRM4 to key point of central line of left-turn movement; 1115: Distance from CRM3 to key point of central line of left-turn movement; 1116: Central line of right-turn movement; 1117: Key point of central line of right-turn movement; 1118: Distance from CRM1 to key point of central line of right-turn movement; 1119: Distance from CRM2 to key point of central line of right-turn movement; 1120: Central line of U-turn movement; 1121: Key point on central line of U-turn movement; 1122: Distance from CRM2 to key point of central line of U-turn movement; 1123: Distance from CRM3 to key point of central line of U-turn movement.

In some embodiments, e.g., as shown in FIG. 11 the technology provides systems and methods for determining and/or identifying the relationship between CRM and key points of driving for a central line of left-turn, right-turn, and U-turn movements at an intersection. At least four CRMs are installed at the intersection, including CRM1 1104, CRM2 1105, CRM3 1106, and CRM4 1107 at the four corners, respectively. For each type of turning movement, the relationship table 1102 records the identifiers of two CRMs (e.g., two adjacent CRM) that are close to the key point. The distance from the two CRMs to the key point and the angle between two lines from the two CRMs to the key point are also recorded in the relationship table 1102. The COU 1108 stores the location table 1101 for CRMs, which includes the longitude, latitude, and altitude information of the CRMs; and the COU 1108 stores the location table 1103 for key points, which includes the longitude, latitude, and altitude information of key points on the central driving line.

Specifically, for the vehicle driving on the central line of left-turn movement 1109, the turning process is divided into two parts. The central line is divided by the diagonal line connecting CRM2 1105 and CRM4 1107. Before arriving at the diagonal line, CRM1 1104 and CRM4 1107 are used to measure the distance and angle. The distance information comprises the distance 1111 between CRM1 1104 and the key point 1110 and the distance 1112 between CRM4 1107 and the key point 1110. The angle is the angle between the line connecting key point 1110 and CRM1 1104 and the line connecting key point 1110 and CRM4 1107. After passing the diagonal line, CRM3 1106 and CRM4 1107 are used to measure the angle and distance. The distance information comprises the distance 1115 between CRM3 1106 and key point 1113 and the distance 1114 between CRM4 1107 and key point 1113. The angle is the angle between the line connecting key point 1113 and CRM3 1106 and the line connecting key point 1113 and CRM4 1107. The distance and angle information are recorded in the relationship table 1102.

For the vehicle driving on the central line of right-turn movement 1116, CRM1 1104 and CRM2 1105 are used to measure the distance and angle. The distance information comprises the distance 1118 between CRM1 1104 and key point 1117 and the distance 1119 between CRM2 1105 and key point 1117. The angle is the angle between the line connecting key point 1117 and CRM1 1104 and the line connecting key point 1117 and CRM2 1105. For a vehicle driving on the central line of U-turn movement 1120, CRM2 1105 and CRM3 1106 are used to measure the distance and angle. The distance information comprises the distance 1122 between CRM2 1105 and key point 1121 and the distance 1123 between CRM3 1106 and the key point 1121. The angle is the angle between the line connecting key point 1121 and CRM2 1105 and the line connecting key point 1121 and CRM3 1106.

Figure 12:
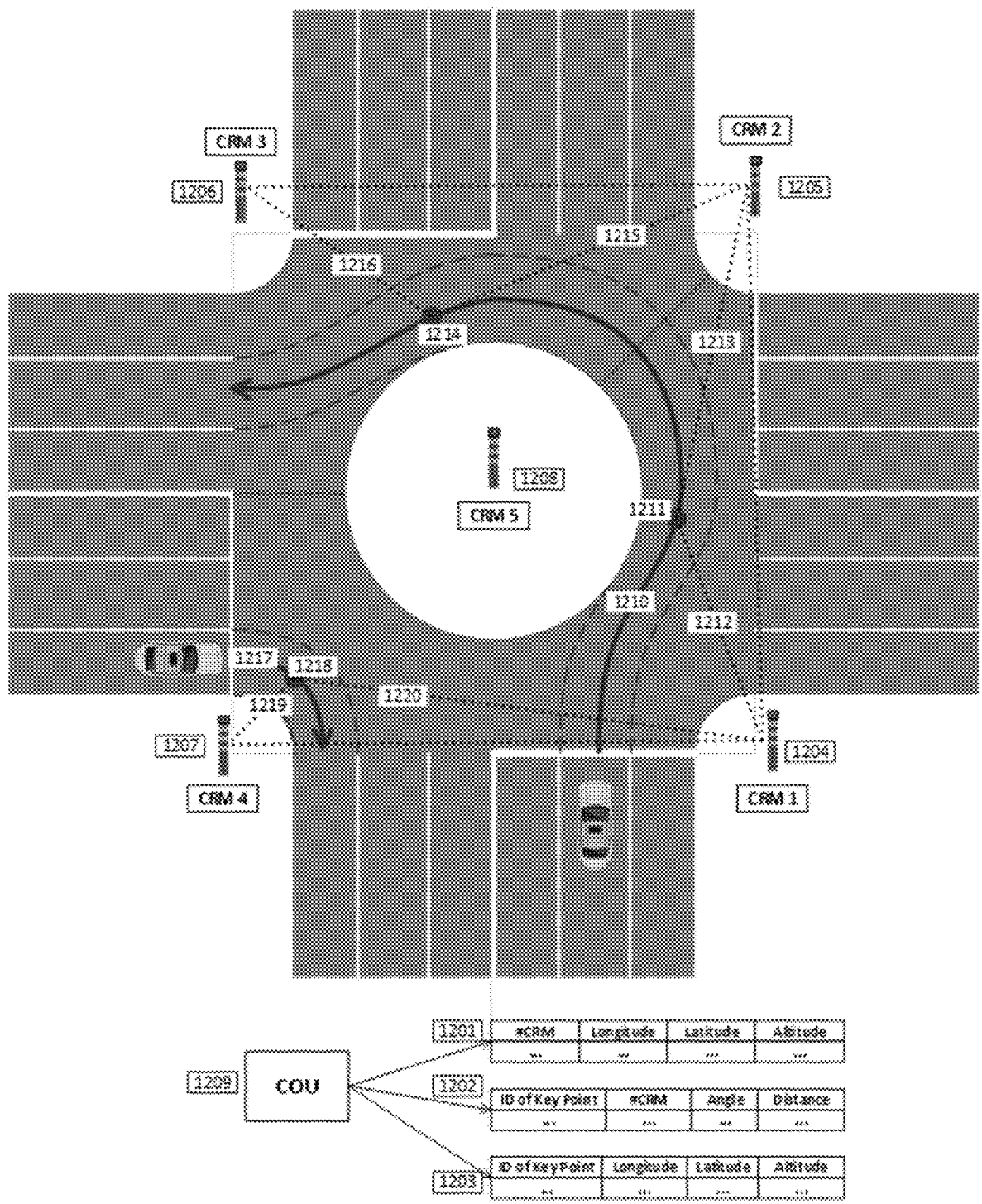
FIG. 12 shows the relationship between CRM and key points of driving central line of left-turn movement and right-turn movement at a roundabout. 1201: Location table for CRM; 1202: Relationship table between key points of a driving central line and CRMs; 1203: Location table for key points of a driving central line; 1204: CRM1; 1205: CRM2; 1206: CRM3; 1207: CRM4; 1208: CRM5 for backup; 1209: COU; 1210: Central line of left-turn movement; 1211: Key point of central line of left-turn movement; 1212: Distance from CRM1 to key point of central line of left-turn movement; 1213: Distance from CRM2 to key point of central line of left-turn movement; 1214: Key point on central line of left-turn movement; 1215: Distance from CRM2 to key point of central line of left-turn movement; 1216: Distance from CRM3 to key point of central line of left-turn movement; 1217: Central line of right-turn movement; 1218: Key point of central line of right-turn movement; 1219: Distance from CRM4 to key point of central line of right-turn movement; 1220: Distance from CRM1 to key point of central line of right-turn movement.

In some embodiments, e.g., as shown in FIG. 12, the technology provides systems and methods for determining and/or identifying the relationships between CRM and key points of the driving central line of left-turn and right-turn movements at a roundabout. At least five CRMs are installed at the roundabout, including CRM1 1204, CRM2 1205, CRM3 1206, and CRM4 1207 at the four corners, respectively, and CRM5 1208 at the middle island for backup. For each type of turning movement, the relationship table 1202 records the identifiers of two CRMs (e.g., two adjacent CRM) that are close to the key point. The distances from the two CRMs to the key point and the angle between two lines from the two CRMs to the key point are also recorded in the relationship table 1202. The COU 1209 stores the location table 1201 for CRMs, which includes the longitude, latitude, and altitude information of the two CRMs; and the COU 1209 stores the location table 1203 for key points, which includes the longitude, latitude, and altitude information of key points on the central line.

Specifically, for a vehicle driving on the central line of left-turn movement 1210, the turning process is divided into two parts. The central line is divided by the diagonal line connecting CRM2 1205 and CRM4 1207. Before arriving at the diagonal line, CRM1 1204 and CRM2 1205 are used to measure the distance and angle—the distance information comprises the distance 1212 between CRM1 1204 and key point 1211 and the distance 1213 between CRM2 1205 and key point 1211. The angle is the angle between the line connecting key point 1211 and CRM1 1204 and the line connecting key point 1211 and CRM2 1205. After passing the diagonal line, CRM2 1205 and CRM3 1206 are used to measure the angle and distance. The distance information comprises the distance 1215 between CRM2 1205 and key point 1214 and the distance 1216 between CRM3 1206 and key point 1214. The angle is the angle between the line connecting key point 1214 and CRM2 1205 and the line connecting key point 1214 and CRM3 1206. The distance information and angle information are recorded in the relationship table 1202.

For a vehicle driving on the central line of right-turn movement 1217, CRM1 1204 and CRM4 1207 are used to measure the distance and angle. The distance information comprises the distance 1219 between CRM4 1207 and key point 1218 and the distance 1220 between CRM1 1204 and key point 1218. The angle is the angle between the line connecting key point 1218 and CRM1 1204 and the line connecting key point 1218 and CRM4 1207.

Figure 13A:
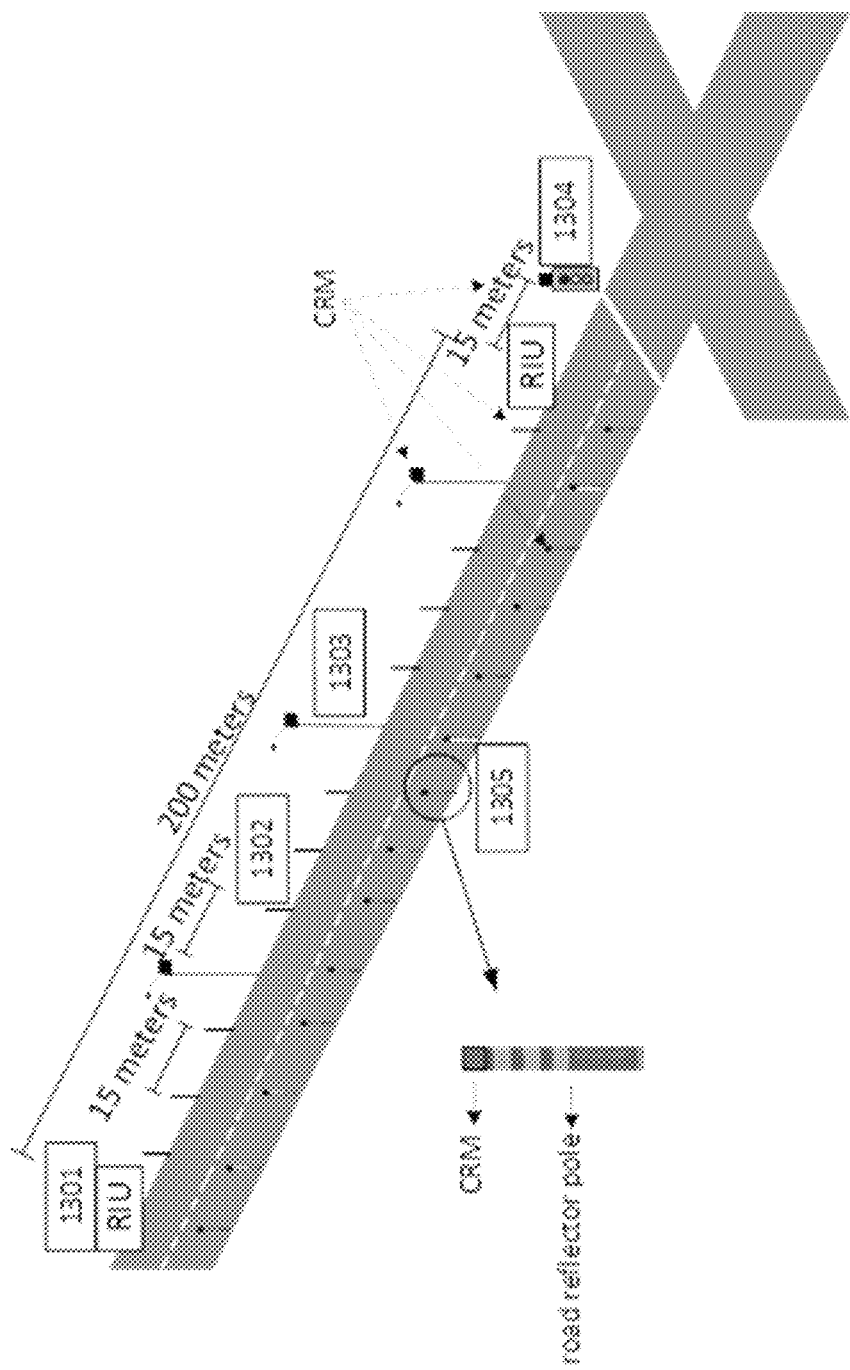
FIG. 13A shows a typical layout example along major arterial and signalized intersection and various instrumentation of CRM. 1301: RIU; 1302: Independent roadside CRM pole; 1303: CRM on road light pole; 1304: CRM on traffic controller; 1305: CRM on road reflector pole.

In some embodiments, e.g., as shown in FIG. 13A, the technology provides systems comprising CRM installed along a major arterial and signalized intersection. In this example, a number of CRM are installed on both sides of the road. In some embodiments, the CRMs are installed on a road reflector pole 1305; in some embodiments, the CRMs are installed on an independent roadside CRM pole 1302. In some embodiments, the CRMs are installed on a road light pole 1303. In some embodiments, the distance between two adjacent CRMs is approximately 15 meters (e.g., approximately 10-20 meters (e.g., 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters)). In some embodiments, the distance between two adjacent CRMs is from 1 to 50 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters). In some embodiments, CRM are installed at an intersection. In some embodiments, CRM are installed at a traffic controller 1304 at an intersection. In some embodiments, an RIU 1301 is also installed at the roadside. In some embodiments, the distance between two RIU 1301 is approximately 200 meters (e.g., 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, or 220 meters). In some embodiments, the distance between RIU (e.g., RIU 1301) and a CRM is approximately 15 meters (e.g., 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters). In some embodiments, the CRM and RIU are installed at the same location (e.g., the CRM and RIU are co-located).

Figure 13B:
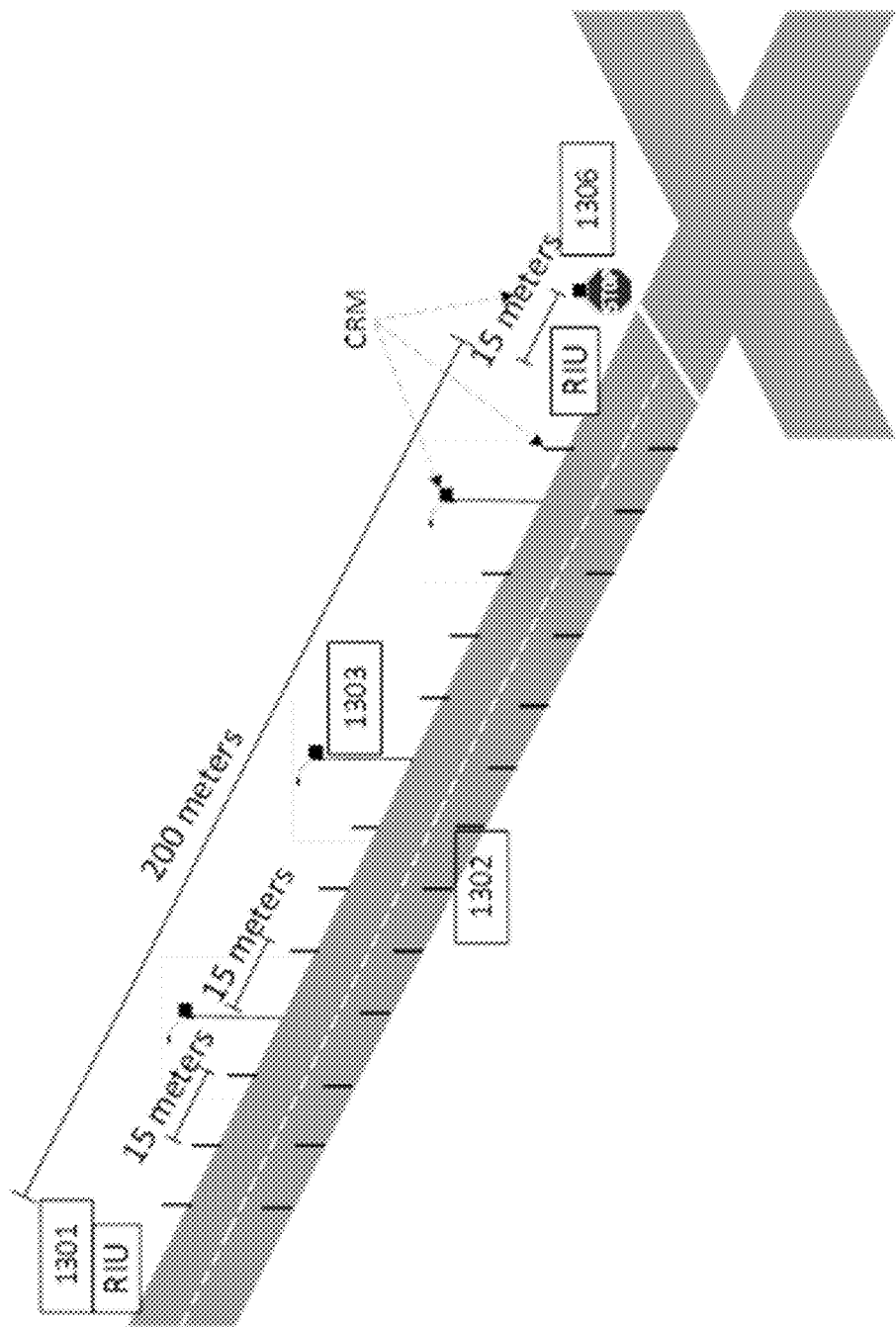
FIG. 13B shows a typical layout examples along arterial and stop sign intersection and various instrumentation of CRM. 1301: RIU; 1302: Independent roadside CRM pole; 1303: CRM on road light pole; 1304: CRM on traffic controller; 1305: CRM on road reflector pole; 1306: CRM on traffic sign.

In some embodiments, e.g., as shown in FIG. 13B, the technology provides systems comprising CRM installed along an arterial and stop sign intersection. In this example, a number of CRM are installed on both sides of the road. In some embodiments, the CRMs are installed on independent roadside CRM pole 1302; in some embodiments, the CRMs are installed on a road light pole 1303. In some embodiments, the distance between two adjacent CRMs is approximately 15 meters (e.g., approximately 10-20 meters (e.g., 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters)). In some embodiments, the distance between two adjacent CRMs is from 1 to 50 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters). In some embodiments, CRM are installed at an intersection. In some embodiments, CRM are installed on a traffic sign (e.g., stop sign) 1306 at an intersection. In some embodiments, an RIU 1301 is also installed at the roadside. In some embodiments, the distance between two RIU 1301 is approximately 200 meters (e.g., 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, or 220 meters). In some embodiments, the distance between RIU (e.g., RIU 1301) and a CRM is approximately 15 meters (e.g., 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters). In some embodiments, the CRM and RIU are installed at the same location (e.g., the CRM and RIU are co-located).

Figure 13C:
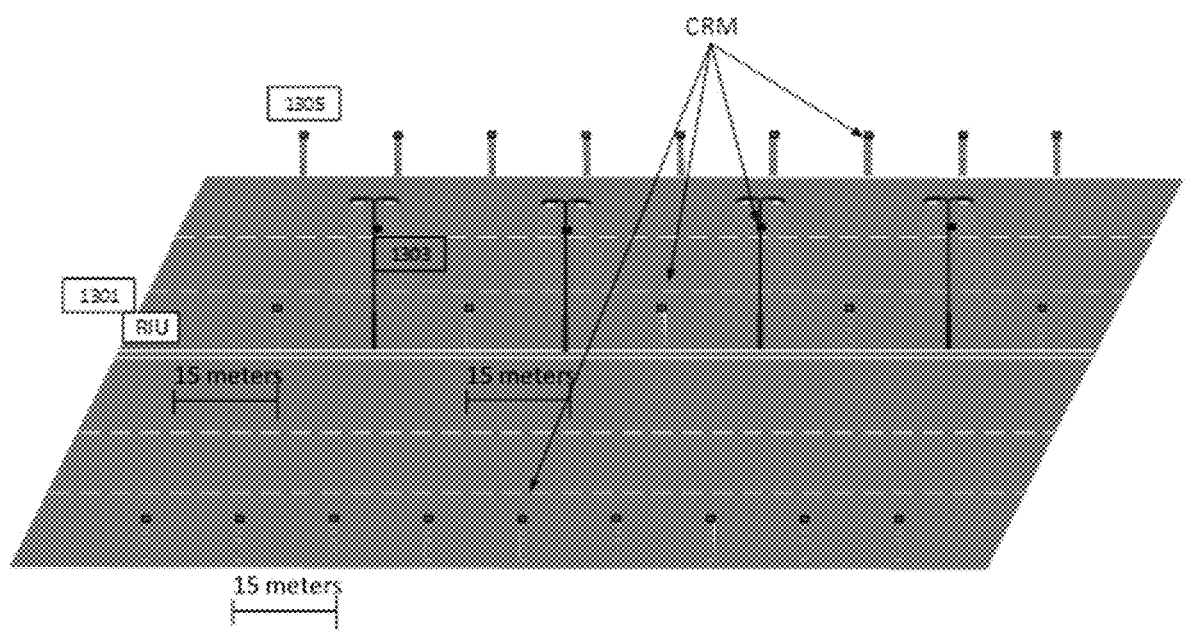
FIG. 13C shows a typical layout example along freeways and various instrumentation of CRM. 1301: RIU; 1303: CRM on road light pole; 1305: CRM on road reflector pole.

In some embodiments, e.g., as shown in FIG. 13C, the technology provides systems comprising CRM installed along freeways. In this example, a number of CRM are installed on both sides of the freeway and in the middle of the freeway. In some embodiments, the CRMs are installed on road reflector pole 1305. In some embodiments, the CRMs are installed on a road light pole 1303. In some embodiments, the distance between two adjacent CRMs is approximately 15 meters (e.g., approximately 10-20 meters (e.g., 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters)). In some embodiments, the distance between two adjacent CRMs is from 1 to 50 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters). In some embodiments, CRM are installed at an intersection. In some embodiments, CRM are installed at a traffic controller 1304 at an intersection. In some embodiments, an RIU 1301 is also installed at the roadside. In some embodiments, the distance between two RIU 1301 is approximately 200 meters (e.g., 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, or 220 meters). In some embodiments, the distance between RIU (e.g., RIU 1301) and a CRM is approximately 15 meters (e.g., 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters). In some embodiments, the CRM and RIU are installed at the same location (e.g., the CRM and RIU are co-located).

Figure 13D:
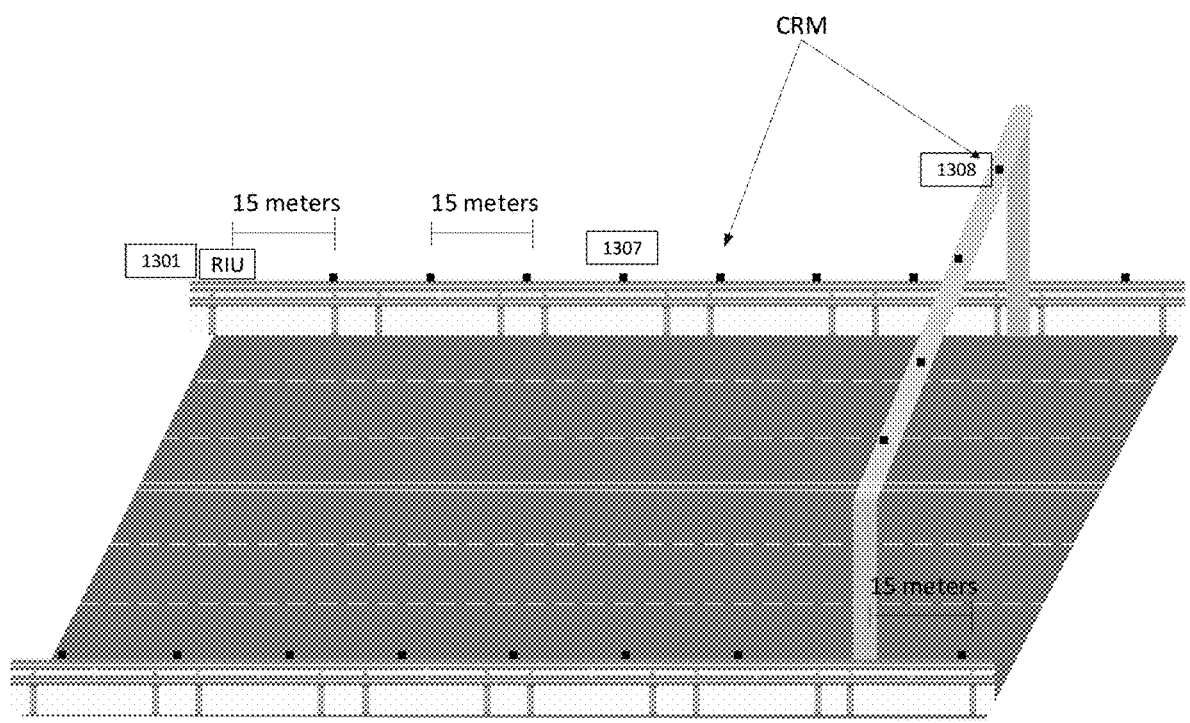
FIG. 13D shows a typical layout example along freeways and various instrumentation of CRM. 1301: RIU; 1308: CRM on the gantry; 1307: CRM on freeway barrier.

In some embodiments, e.g., as shown in FIG. 13D, the technology provides systems comprising CRM installed along a freeway. In this example, a number of CRM are installed on both sides of a freeway barrier 1307 along the freeway. In some embodiments, the CRMs are installed on a gantry 1308. In some embodiments, the distance between two adjacent CRMs is approximately 15 meters (e.g., approximately 10-20 meters (e.g., 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters)). In some embodiments, the distance between two adjacent CRMs is from 1 to 50 meters (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, or 50.0 meters). In some embodiments, CRM are installed at an intersection. In some embodiments, CRM are installed at a traffic controller 1304 at an intersection. In some embodiments, an RIU 1301 is also installed at the roadside. In some embodiments, the distance between two RIU 1301 is approximately 200 meters (e.g., 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, or 220 meters). In some embodiments, the distance between RIU (e.g., RIU 1301) and a CRM is approximately 15 meters (e.g., 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 meters). In some embodiments, the CRM and RIU are installed at the same location (e.g., the CRM and RIU are co-located).

Figure 14A:
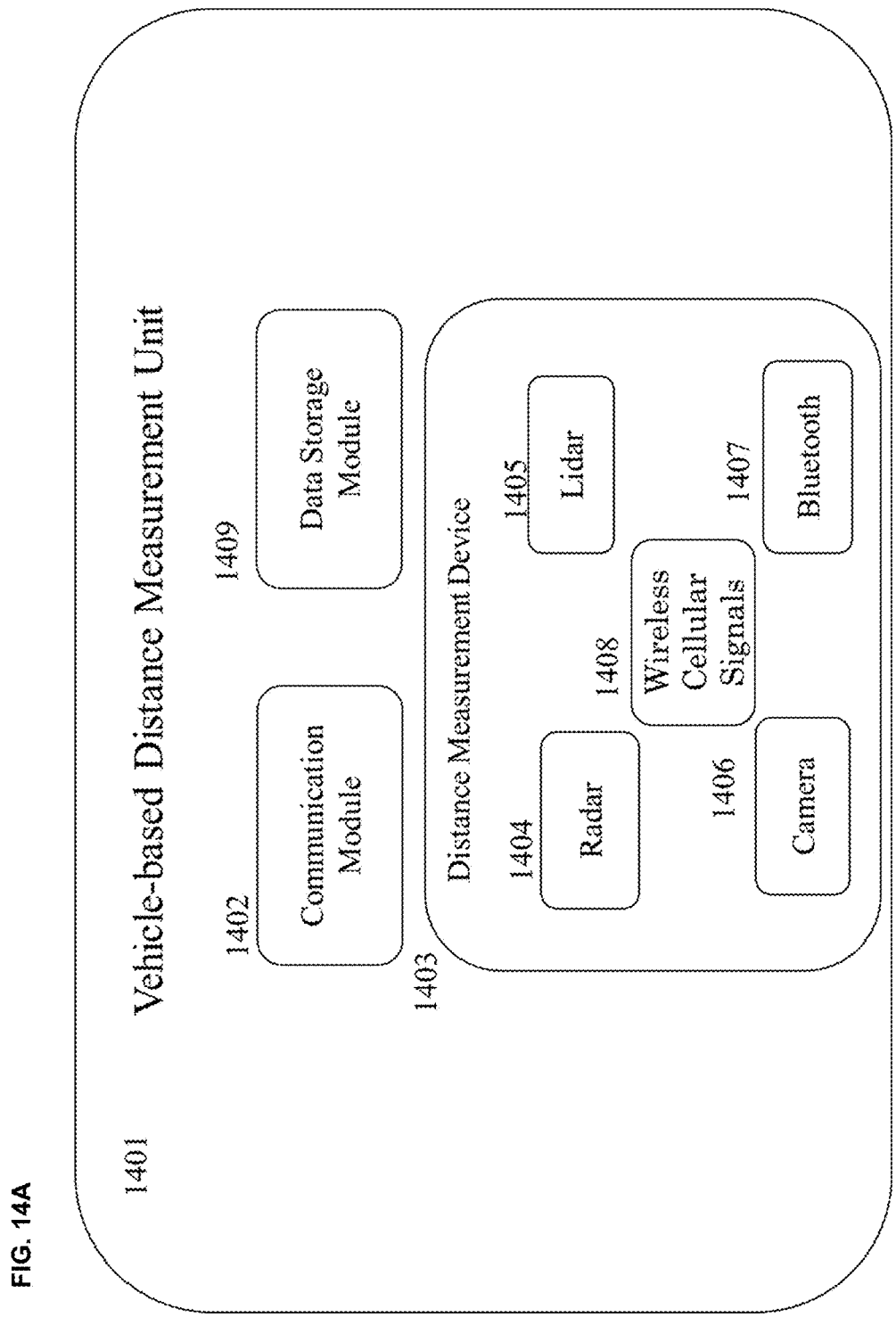
FIG. 14A shows the exemplary structure and various elements for the Vehicle-based Distance Measurement Unit (DMU). 1401: Vehicle-based DMU; 1402: Communication module; 1403: Distance Measurement Device (DMD); 1404: Radar; 1405: Lidar; 1406: Camera; 1407: BLUETOOTH component; 1408: Wireless cellular signals; 1409: Data storage module.

In some embodiments, e.g., as shown in FIG. 14A, the technology provides a vehicle-based distance measurement unit (DMU). As shown in FIG. 14A, embodiments of the vehicle-based DMU 1401 comprise a communication module 1402, data storage module 1409, and Distance Measurement Device (DMD) 1403. The DMD 1403 comprises Radar 1404, Lidar 1405, Camera 1406, BLUETOOTH component 1407, and/or a wireless cellular transceiver 1408.

Figure 14B:
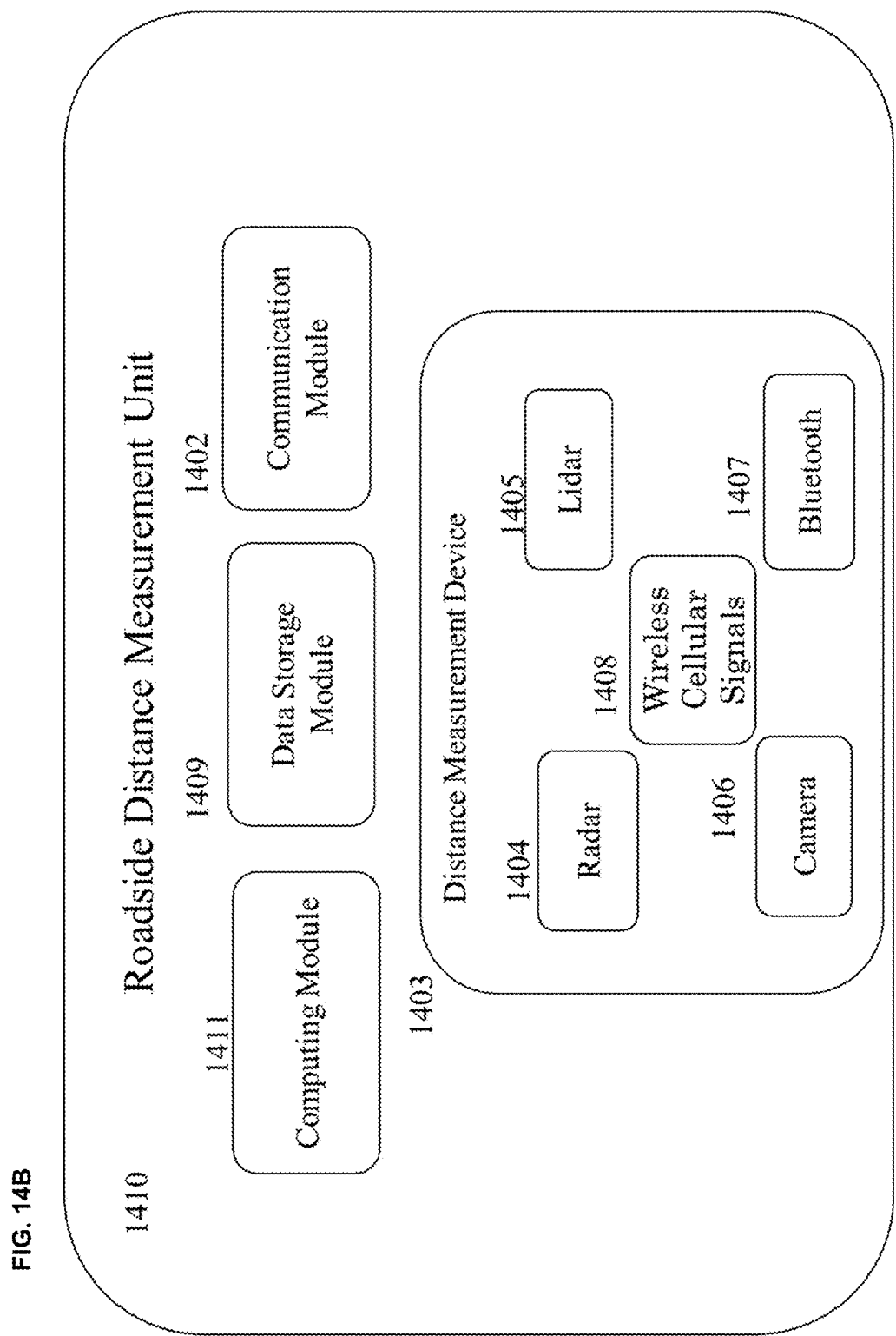
FIG. 14B shows the exemplary structure and various elements for the Roadside Distance Measurement Unit (DMU). 1410: Roadside DMU; 1409: Data storage module; 1411: Computing module; 1402: Communication module; 1403: Distance Measurement Device (DMD); 1404: Radar; 1405: Lidar; 1406: Camera; 1407: BLUETOOTH component; 1408: Wireless cellular signals.

In some embodiments, e.g., as shown in FIG. 14B, the technology provides a Roadside Distance Measurement Unit (DMU). As shown in FIG. 14A, embodiments of the roadside DMU 1410 comprise a computing module 1411, communication module 1402, data storage module 1409, and Distance Measurement Device (DMD) 1403. The DMD comprises Radar 1404, Lidar 1405, Camera 1406, BLUETOOTH component 1407, and/or a wireless cellular transceiver 1408.

Figure 14C:
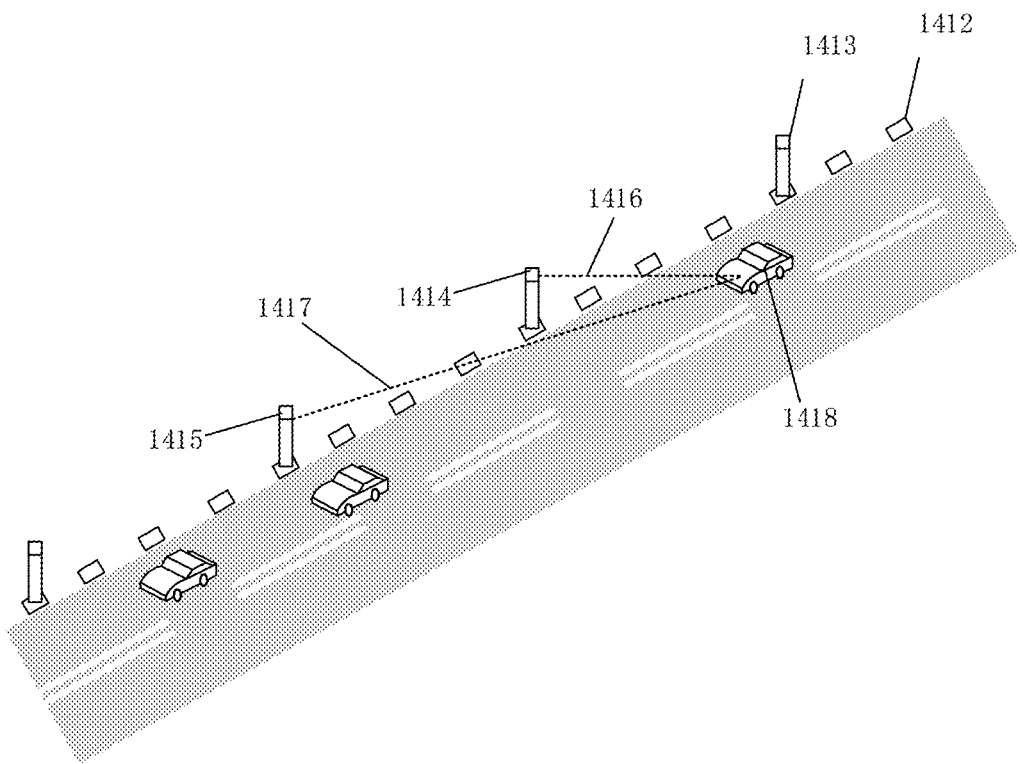
FIG. 14C shows the layout and information flow of the roadside DMU. 1412: CRM; 1413: Roadside DMU1; 1414: Roadside DMU2; 1415: Roadside DMU3; 1416: Distance between Roadside DMU2 and vehicle; 1417: Distance between Roadside DMU3 and vehicle; 1418: Vehicle.

In some embodiments, e.g., as shown in FIG. 14C, the technology provides systems comprising roadside DMUs and information flow among DMU and other system components. As shown in FIG. 14C, in some embodiments, DMU and CRM are deployed at the roadside and a number of (e.g., 1, 2, 3, 4, 5, 6, 7, 8, 9, 10, or more) CRMs are installed between two adjacent roadside DMUs. In some embodiments, the CRM and DMU are installed at the same location (e.g., the CRM and DMU are co-located). In some embodiments, a first roadside DMU receives measured distance information for a vehicle from a second roadside DMU previously passed by the vehicle. If the road is level grade and the roadside DMU1 1413 identifies a vehicle 1418, roadside DMU2 1414 sends the measured distance information 1416 to the CRM, the vehicle, and roadside DMU1 1413 (e.g., the closest roadside DMU for the vehicle). In some embodiments, the roadside DUM1 1413 uses a two-dimensional triangular position identification method to identify the vehicle relative position using two CRMs and virtual roadway configuration for a level grade road. If the road has upgrade or downgrade, the roadside DMU1 1413 identifies a vehicle 1418, roadside DMU2 1414, and roadside DMU3 1415. Subsequently, the roadside DMU2 1414 and roadside DMU3 1415 send the measured distance information 1416 and 1417 to the CRMs, the vehicle, and roadside DMU1 1413, (e.g., the closest roadside DMU for the vehicle). Then, the roadside DUM1 1413 uses a three-dimensional triangular position identification method to identify the vehicle relative position using three CRMs and virtual roadway configuration.

Figure 15A:
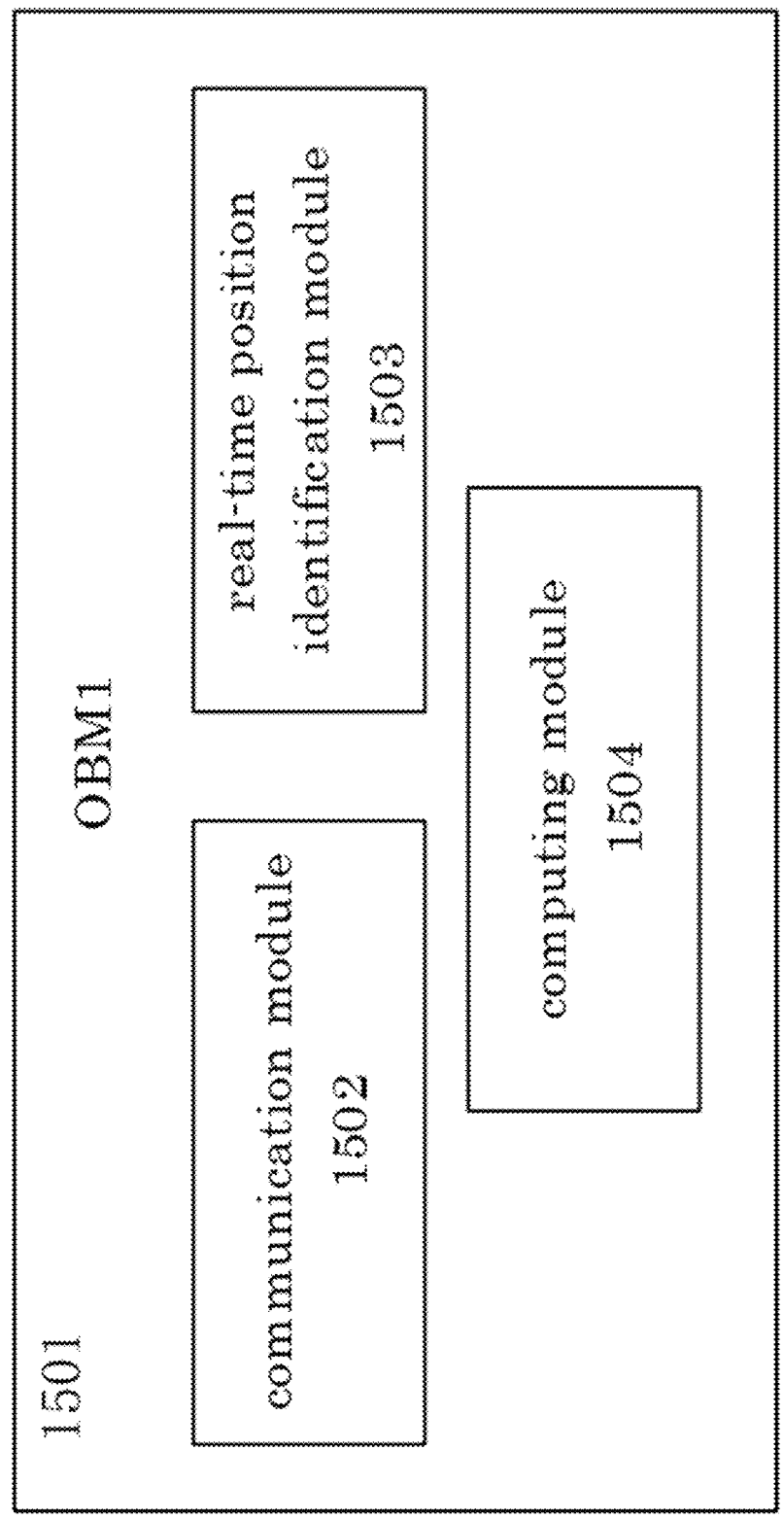
FIG. 15A shows the components of an OBM1 without a HD map.1501: OBM1; 1502: communication module; 1503: real-time position identification module; 1504: computing module.

In some embodiments, e.g., as shown in FIG. 15A, the technology provides an onboard unit type 1 (OBM1) configured not to use an HD map. As shown in FIG. 15A, the OBM1 1501 installed in a vehicle comprises a communication module 1502 to receive CRM location information for CRM of the network of CRM and the virtual roadway configuration information from the COU; a real-time position identification module 1503 for identifying the vehicle relative position with respect to CRMs and virtual roadway configuration; and a computing module 1504 to match the vehicle real-time position with the location of CRM in the network of CRMs and virtual roadway configuration.

Figure 15B:
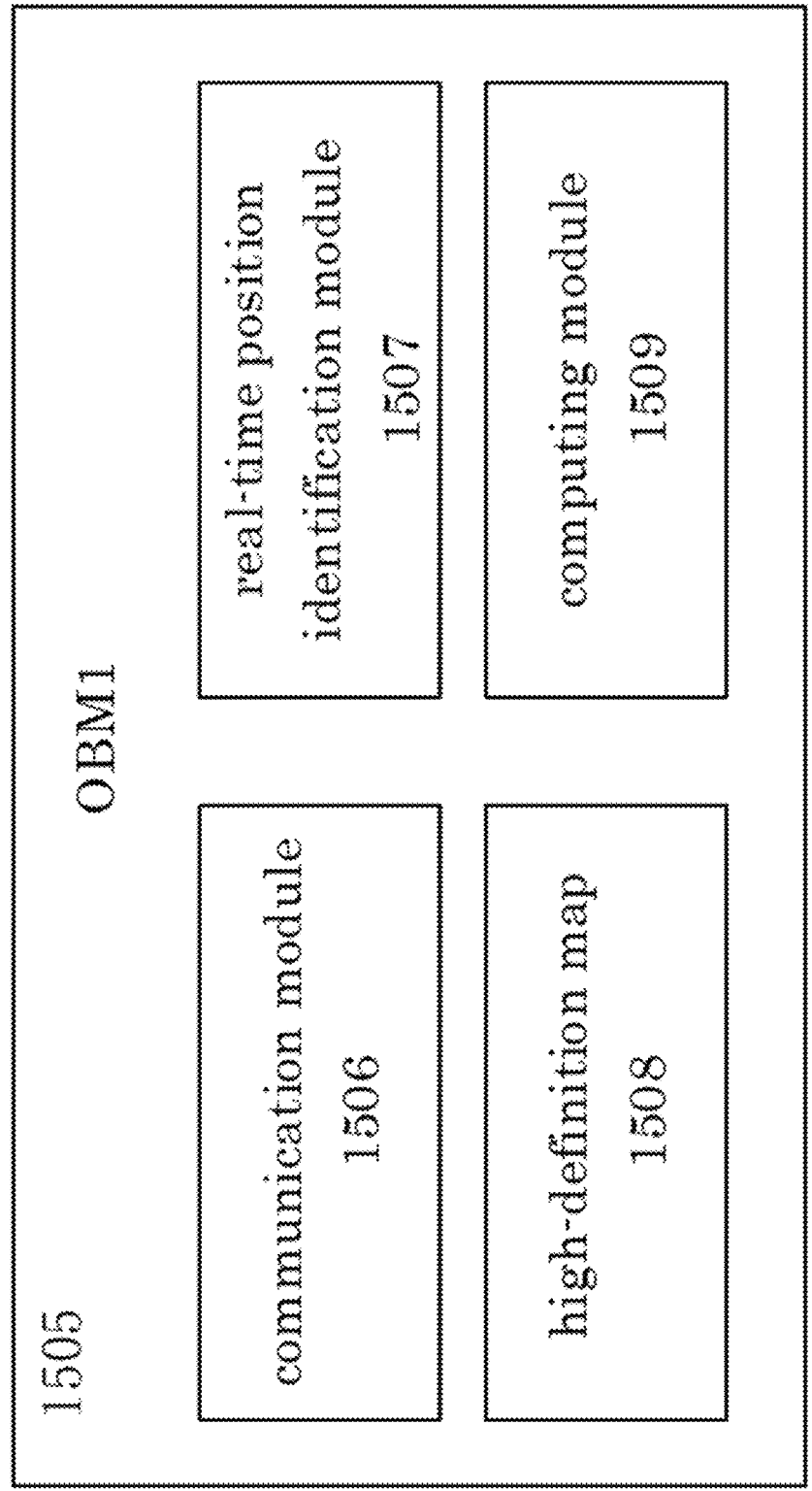
FIG. 15B shows the components of OBM1 with a HD map. 1505: OBM1; 1506: communication module; 1507: real-time position identification module; 1508: high-definition map; 1509: computing module.

In some embodiments, e.g., as shown in FIG. 15B the technology provides an OBM1 configured to use an HD map. As shown in FIG. 15B, the OBM1 1505 installed in a vehicle comprises a communication module 1506 to receive CRM location information for CRM of the network of CRM, the local location relationship table of key points of the central line of a driving lane, and the virtual roadway configuration information from the COU; a high-definition map 1508 including lane configuration and CRM location information; a real-time position identification module 1507 to identify the vehicle relative position with respect to CRMs, key points of the central line of a driving lane, and virtual roadway configuration; and a computing module 1509 to match the vehicle real-time position with the location of the network of CRMs, the key points of the central line of a driving lane, and the virtual roadway configuration.

Figure 16A:
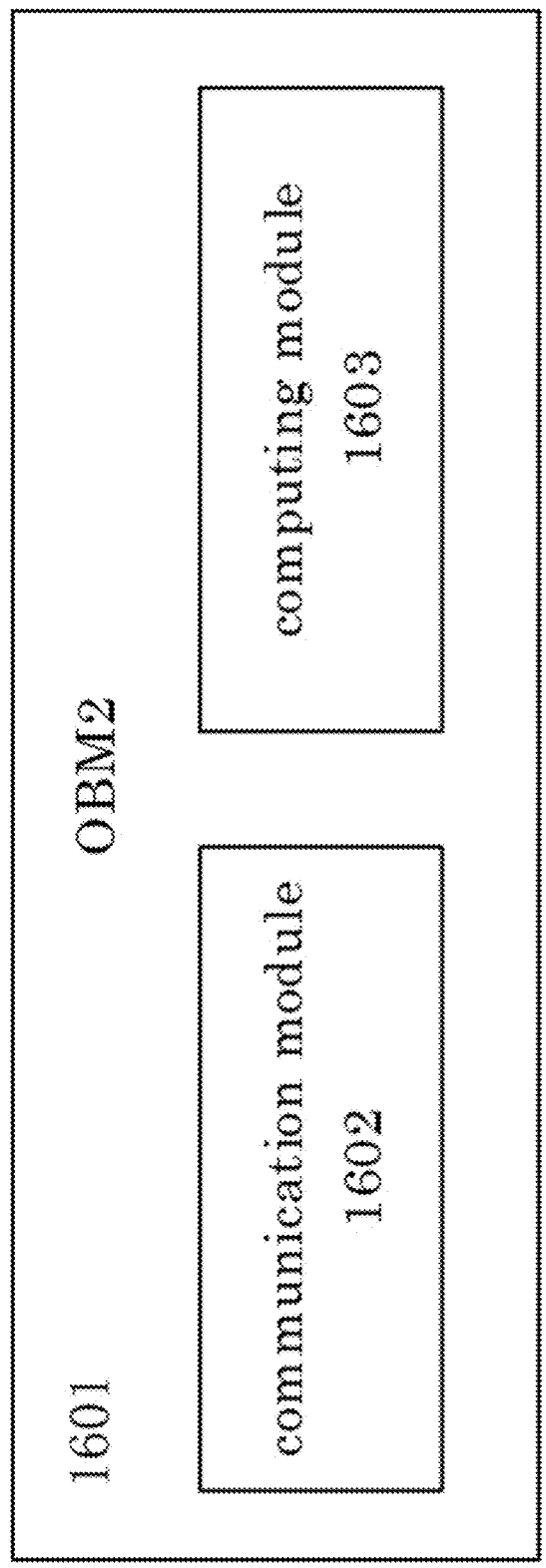
FIG. 16A shows the components of an OBM2 without a HD map. 1601: OBM2; 1602: communication module; 1603: computing module.

In some embodiments, e.g., as shown in FIG. 16A, the technology provides an OBM type 2 (OBM2) configured not to use an HD map. The OBM2 1601 comprises one or more of the following physical components: a communication module 1602 to receive CRM location information for CRM of the network of CRM, virtual roadway configuration information from the COU, and information describing a vehicle relative position with respect to CRMs from the Distance Measurement Unit (DMU) on the roadside; and a computing module 1603 to match the vehicle real-time position with the location of the network of CRMs and virtual roadway configuration.

Figure 16B:
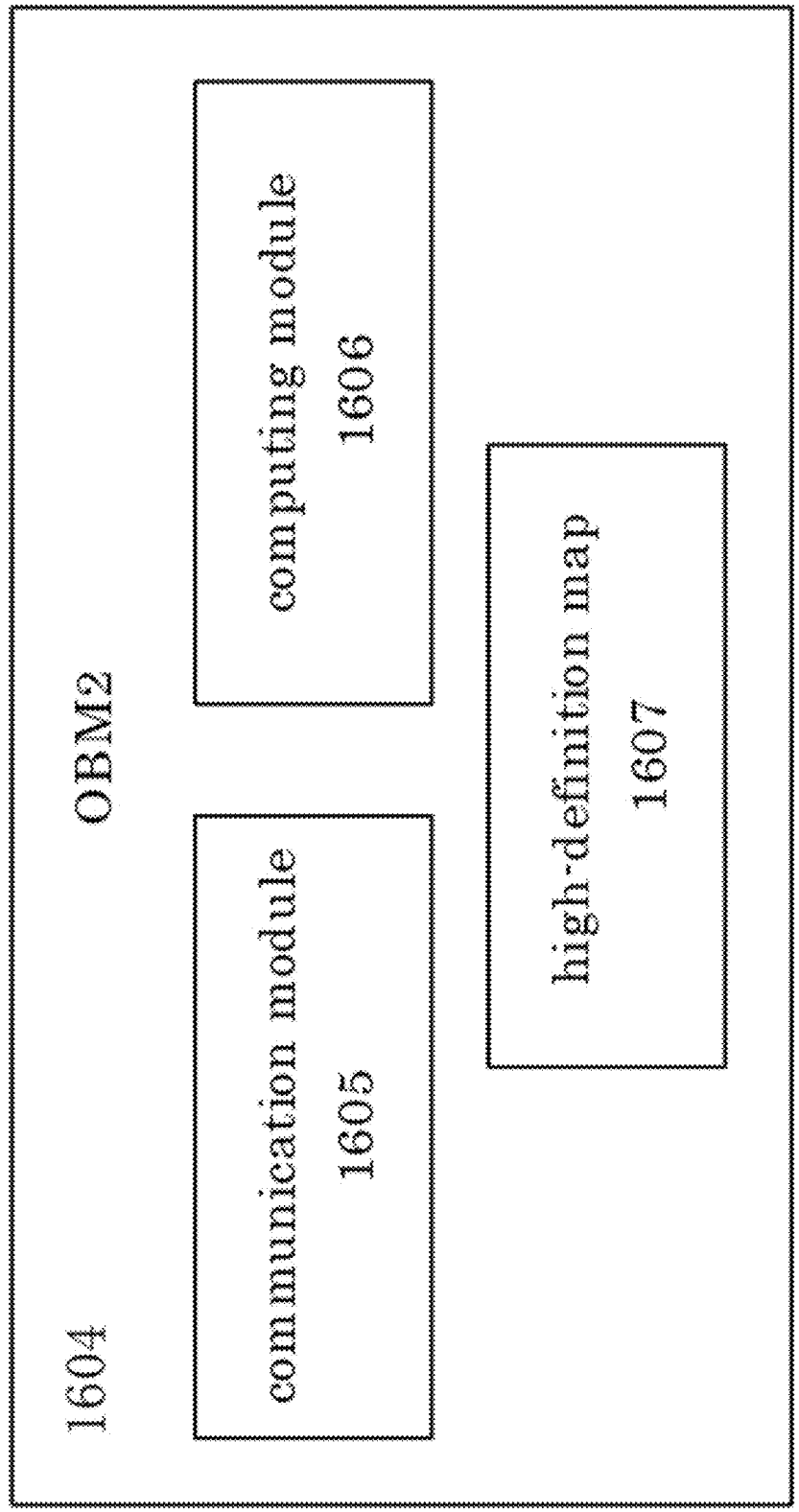
FIG. 16B shows the components of an OBM2 with a HD map. 1604: OBM2; 1605: communication module; 1606: computing module; 1607: high-definition map.

In some embodiments, e.g., as shown in FIG. 16B, the technology provides an OBM2 configured to use an HD map. The OBM2 1604 comprises one or more of the following physical components: a communication module 1605 to receive CRM location information of CRM of the network of CRM, the local location relationship table of key points of the central line of a driving lane, and the virtual roadway configuration information from the COU, and the information of vehicle relative position with respect to CRMs from the Distance Measurement Unit (DMU) on the roadside; a high-definition map 1607 including lane configuration and CRM location information; and a computing module 1606 to match vehicle real-time position with the location of the network of CRMs, the key points of the central line of a driving lane, and the virtual roadway configuration.

Figure 17:
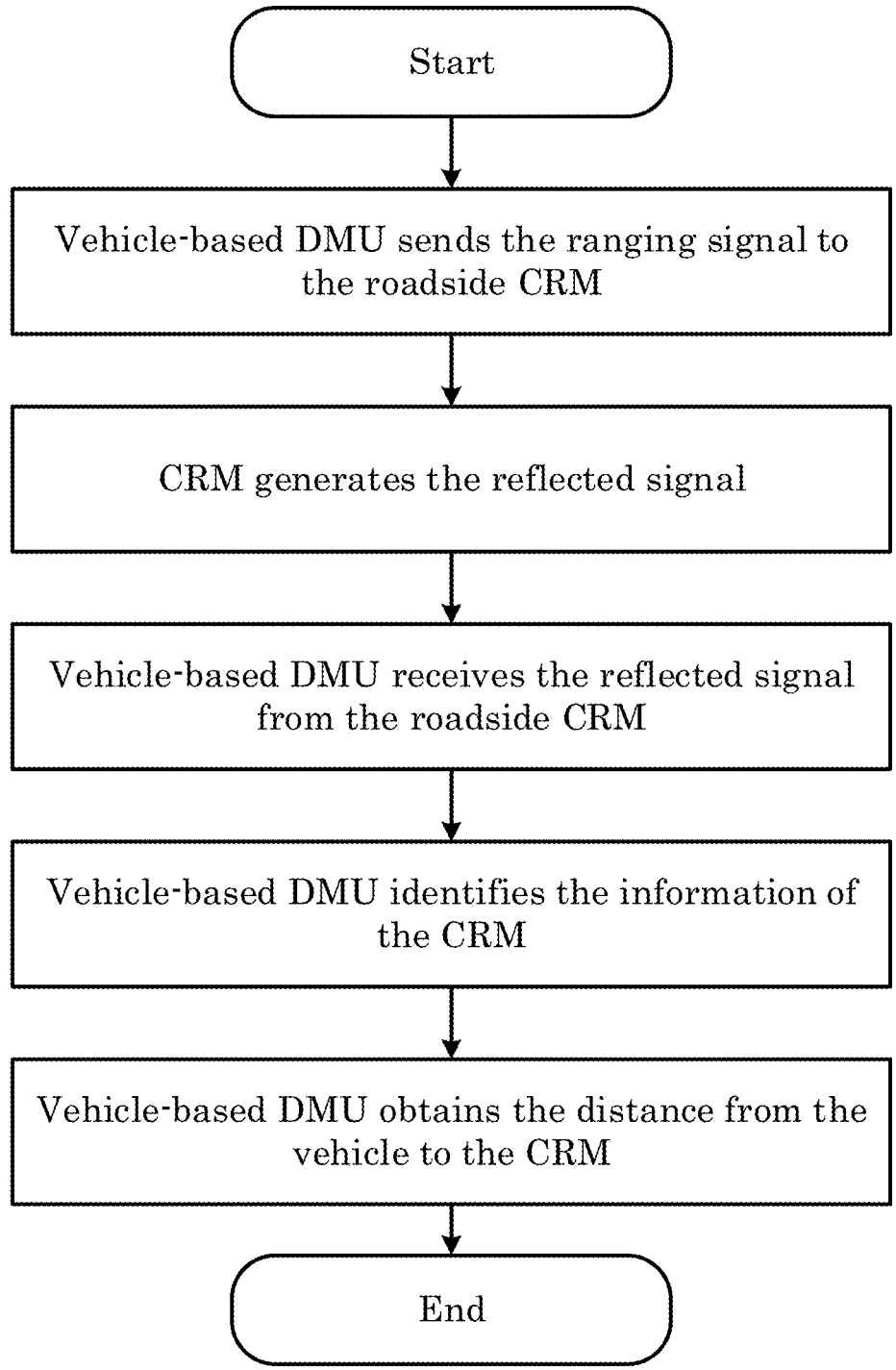
FIG. 17 shows a flowchart of a ranging method using OBM1 and vehicle-based DMU.

In some embodiments, e.g., as shown in FIG. 17, the technology provides a ranging method using OBM1 and vehicle-based DMU. As shown in FIG. 17, a vehicle-based DMU sends a ranging signal to the roadside CRM. After receiving the ranging signal, the CRM generates a reflected signal and sends the reflected signal and a digital identifier identifying the CRM. The vehicle-based DMU receives the reflected signal from the roadside CRM. The vehicle-based DMU identifies the CRM using the CRM identifier. The vehicle-based DMU calculates the distance from the vehicle to the CRM by using half of the product of the time lag and the signal speed, where the time lag is equal to the time difference between the timestamp when the vehicle-based DMU sends a ranging signal and the timestamp when the vehicle-based DMU receives the reflected signal. The signal speed is the speed of light. In some embodiments, the vehicle-based DMU uses a millimeter radar to measure the distance between the vehicle and CRMs. Subsequently, the vehicle-based DMU sends the distance information to the OBM1.

Figure 18:
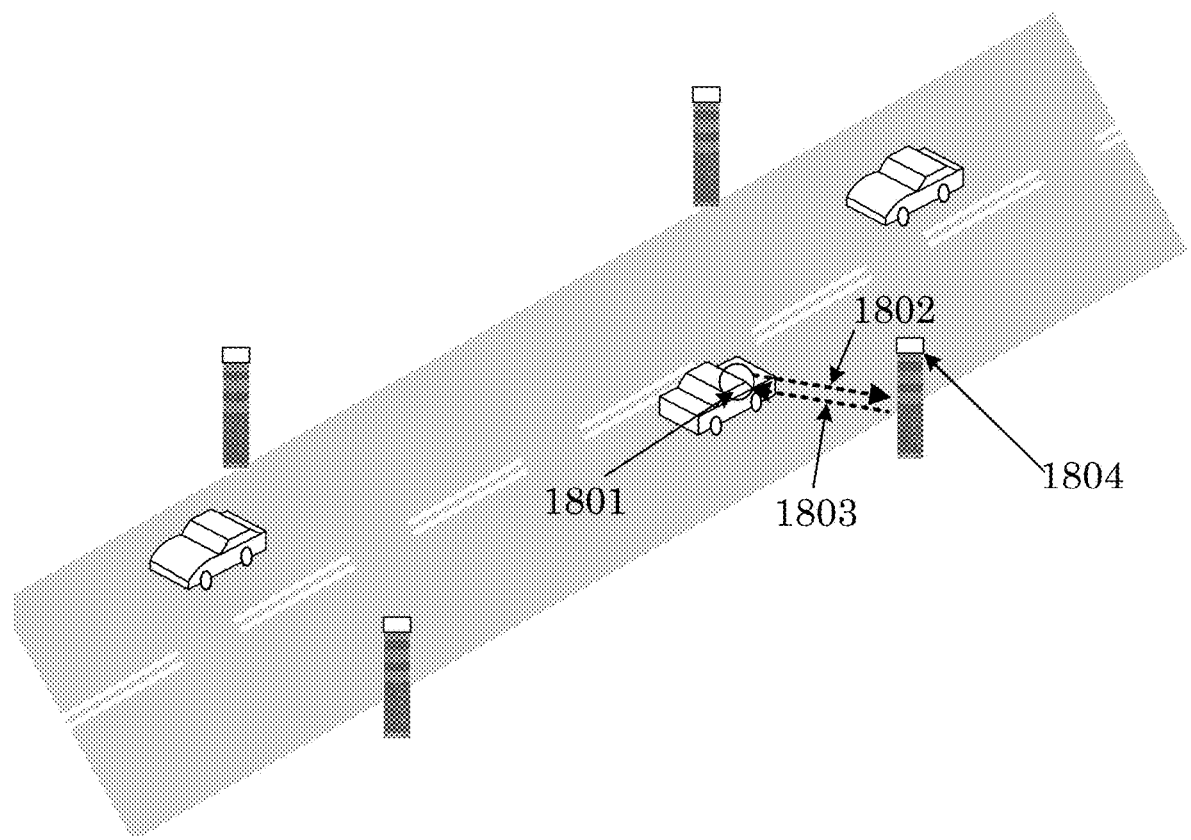
FIG. 18 shows an example of a ranging system using OBM1 and vehicle-based DMU. 1801: Vehicle-based DMU; 1802: Ranging signal; 1803: Reflected ranging signal; 1804: CRM.

In some embodiments, e.g., as shown in FIG. 18, the technology provides a ranging method and system using OBM1 and vehicle-based DMU. As shown in FIG. 18, a vehicle-based DMU 1801 sends a ranging signal 1802 to a roadside CRM 1804. After receiving the ranging signal, the CRM generates a reflected signal and sends the reflected signal and a digital identifier identifying the CRM. The vehicle-based DMU receives the reflected signal from the roadside CRM. The vehicle-based DMU identifies the CRM using the CRM identifier. The vehicle-based DMU 1801 calculates the distance from the vehicle to the CRM by using half of the product of the time lag and signal speed, where the time lag is equal to the time difference between the timestamp when the vehicle-based DMU 1801 sends a ranging signal 1802 and the timestamp when the vehicle-based DMU 1801 receives the reflected signal 1803. Subsequently, the vehicle-based DMU 1801 sends the distance information to the OBM1.

Figure 19:
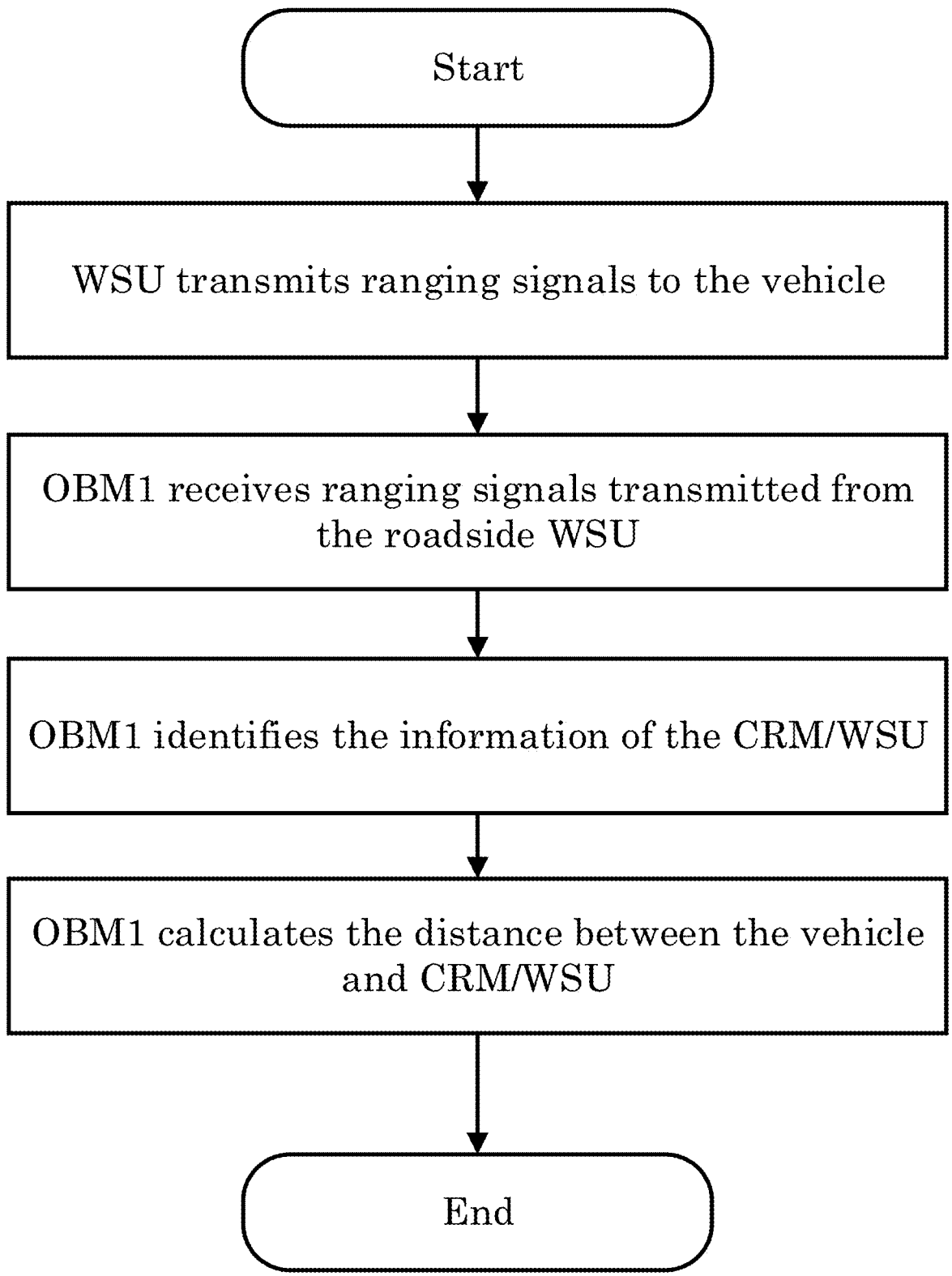
FIG. 19 shows an exemplary flow chart of a ranging method using OBM1 and WSU.

In some embodiments, e.g., as shown in FIG. 19, the technology provides a ranging method using OBM1 and WSU. As shown in FIG. 19, the WSU transmits (e.g., continuously transmits) ranging signals, which can be received by a vehicle. Specifically, the communication module of the OBM1 receives ranging signals transmitted from the roadside WSU. The OBM1 of the vehicle determines and/or identifies information of the CRM and WSU (e.g., WSU and CRM identifiers and/or location information describing the location of the WSU and CRM), which are co-located. The computing module of the OBM1 calculates the distance between the vehicle and CRM/WSU by using the product of time lag and signal speed, where the time lag is equal to the time difference between the timestamp when the WSU sends the ranging signal and the timestamp when the OBM1 receives the ranging signal.

In some embodiments, e.g., as shown in FIG. 20, the technology provides a ranging method and system using OBM1 and WSU. As shown in FIG. 20, the WSU 2001 on the roadside transmits (e.g., continuously transmits) ranging signals 2003. The communication module of the OBM1 2002 receives ranging signals transmitted from the roadside WSU 2001. The computing module of the OBM1 2003 calculates the distance between the vehicle and CRM 2004 by using the product of time lag and signal speed, where the time lag is equal to the time difference between the timestamp when the WSU 2001 sends a ranging signal and the timestamp when the OBM1 2003 receives the ranging signal.

In some embodiments, e.g., as shown in FIG. 21, the technology provides a ranging method using OBM2 and roadside DMU. As shown in FIG. 21, the roadside DMU sends ranging signals to the vehicle. The vehicle generates reflected signals, e.g., the OBM2 sends the reflected signal and a digital identifier identifying the OBM2. The roadside DMU identifies the OBM2 using the identifier identifying the OBM2. The roadside DMU and CRM are co-located. The roadside DMU calculates the distance from the vehicle to the DMU/CRM by using half of the product of the time lag and signal speed, where the time lag is equal to the time difference between the timestamp when the roadside DMU sends a ranging signal and the timestamp when the roadside DMU receives the reflected signal. In some embodiments, the roadside DMU uses a millimeter wave radar to measure the distances between the vehicles and DMU/CRM.

In some embodiments, e.g., as shown in FIG. 22, the technology provides a ranging system and method using OBM2 and roadside DMU. As shown in FIG. 22, the roadside DMU 2201 sends ranging signals 2203 to the vehicle. The OBM2 2205 generates reflected signals 2204 and sends the reflected signals 2204 and a digital identifier identifying the OBM2. Then, the roadside DMU 2201 receives the reflected signal 2204 from the OBM2 2205. The roadside DMU 2201 computes the distance from the vehicle to the CRM 2202 by using half of the product of the time lag and signal speed, where the time lag is equal to the time difference between the timestamp when the roadside DMU 2201 sends a ranging signal 2203 and the timestamp when the roadside DMU 2201 receives the reflected signal 2204.

In some embodiments, e.g., as shown in FIG. 23, the technology provides a two-dimensional triangular position identification method for level grade road. As shown in FIG. 23, 2301 is a vehicle; 2302 is a first CRM (CRM1); and 2303 is a second CRM (CRM2). Firstly, the horizontal distances between the vehicle 2301 and two selected CRMs 2302 and 2303 are measured as l1 and l2 by analyzing the vehicle and CRMs in terms of distances and heights. The horizontal distance between CRM 2302 and CRM 2303 is obtained as l3. The two-dimensional coordinates of the CRMs are obtained. Then, the lateral distance l4 between vehicle 2301 and CRM 2302 is calculated using the following formula.

$$l4 = \frac{l1 \times l2 \times \sqrt{1 - \left(\frac{l1^2 + l2^2 - l3^2}{2l1 \times l2}\right)^2}}{l3}$$

The longitudinal distance l5 between vehicle 2301 and CRM 2302 is calculated using the following formula.

$$l5 = \sqrt{l1^2 - l4^2}$$

If $\cos \beta \geq 0$, then the vehicle 2301 is behind the CRM 2302 and the relative longitudinal distance is l5. If $\cos \beta < 0$, then the vehicle 2301 is in front of the CRM 2302 and the relative longitudinal distance is l5. The two-dimensional coordinates of vehicle (x,y) can be calculated based on the lateral distance and longitudinal distance between the vehicle and the CRM 2302.

Figure 24:
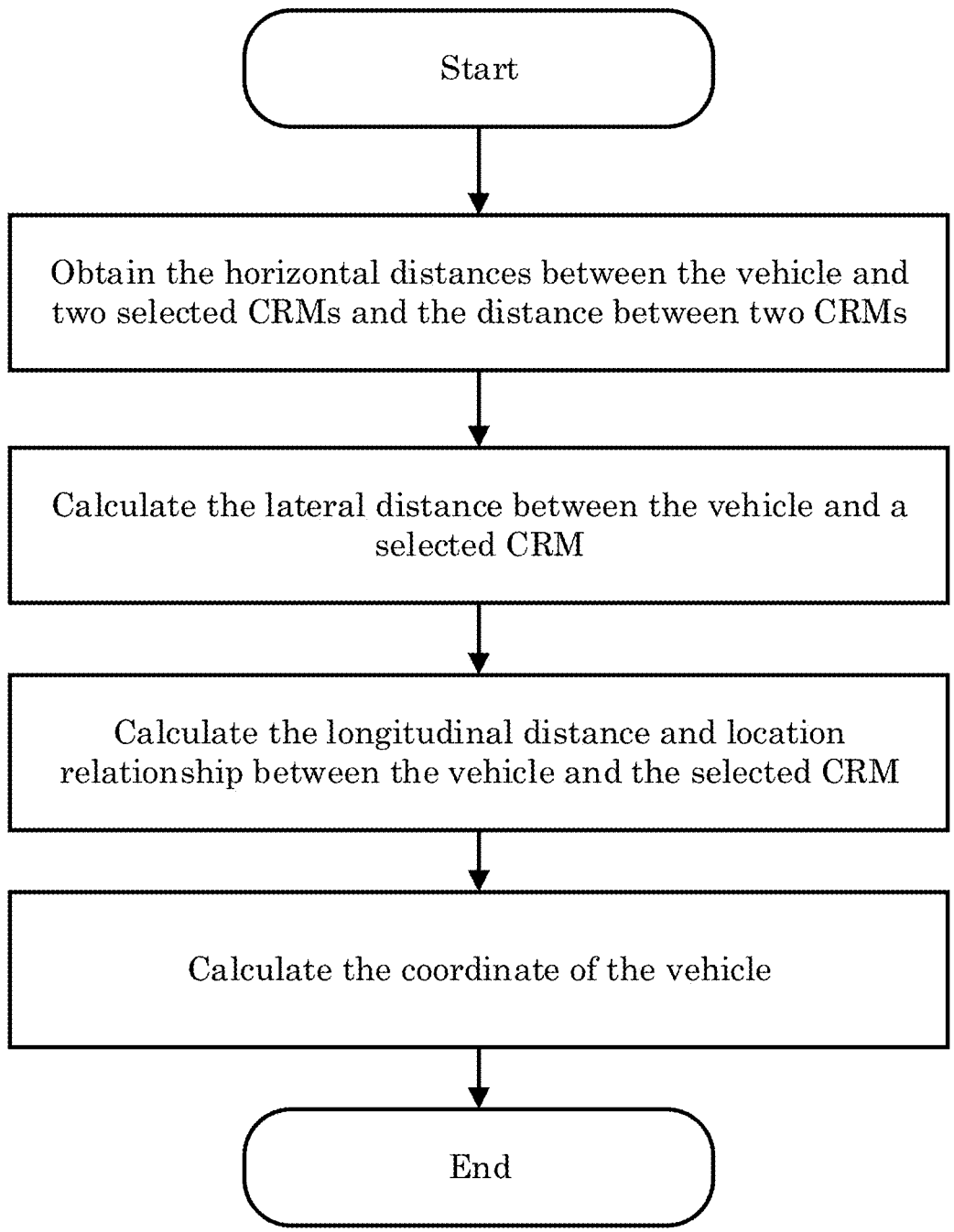
FIG. 24 shows a two-dimensional triangular position identification method for a level grade road.

In some embodiments, e.g., as shown in FIG. 24, the technology provides a two-dimensional triangular position identification method for a level grade road. The horizontal distances between the vehicle and two selected CRMs are measured. The two-dimensional coordinates of the CRMs are obtained. The lateral distance between the vehicle and one CRM is calculated. Then, the longitudinal distance between the vehicle and the CRM is calculated. Subsequently, the location relationship between the vehicle and the CRM is determined. The two-dimensional coordinates of vehicles can be calculated based on the lateral distance and longitudinal distance between the vehicle and the CRM.

Figure 25:
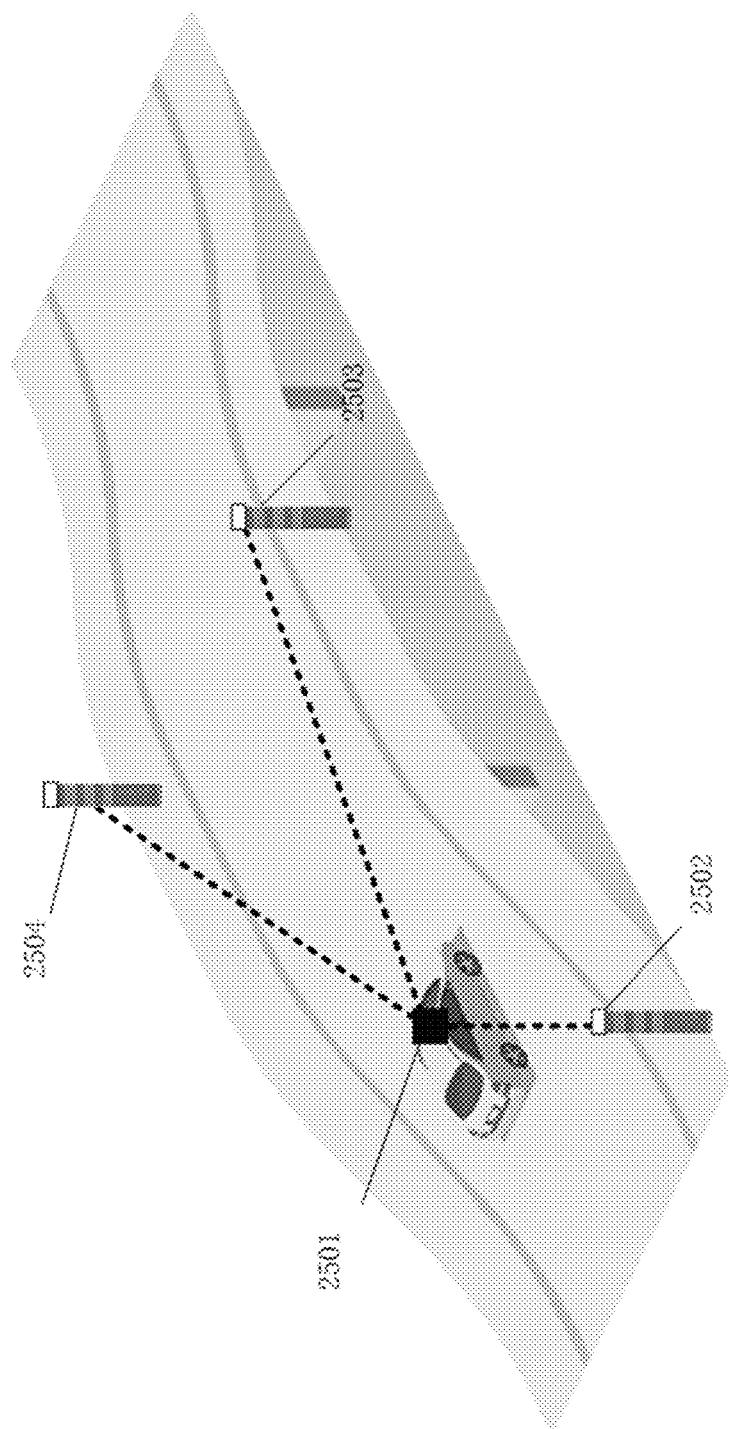
FIG. 25 shows an example of the three-dimensional triangular position identification system for a road with upgrade or downgrade. 2501: Vehicle; 2502: CRM1; 2503: CRM2; 2504: CRM3.

In some embodiments, e.g., as shown in FIG. 25, the technology provides a three-dimensional triangular position identification method for a road with upgrade or downgrade. Firstly, the three-dimensional spatial coordinates of vehicle 2501 are measured as (x, y, z), and the three-dimensional spatial coordinates of the selected CRMs 2502, 2503, and 2504 are measured as $(a_0, b_0, c_0)$, $(a_1, b_1, c_1)$, and $(a_2, b_2, c_2)$. Then, $l_0, l_1, l_2$ are determined as the measured distances from CRM 2502 to vehicle 2501, CRM 2503 to vehicle 2501, and CRM 2504 to vehicle 2501, respectively. The $e_0, e_1, e_2$ are measurement errors that follow a normal distribution.

The measured distances are determined using the following formula.

$$\begin{cases} l_0 = \sqrt{(x-a_0)^2 + (y-b_0)^2 + (z-c_0)^2} + e_0 \\ l_1 = \sqrt{(x-a_1)^2 + (y-b_1)^2 + (z-c_1)^2} + e_1 \\ l_2 = \sqrt{(x-a_2)^2 + (y-b_2)^2 + (z-c_2)^2} + e_2 \end{cases}$$

The three-dimensional coordinates of the vehicle (x, y, z) can be solved by using a solution algorithm (for example, the elimination method and iterative algorithm of space resection). The coordinates of the vehicle can be obtained.

Figure 26:
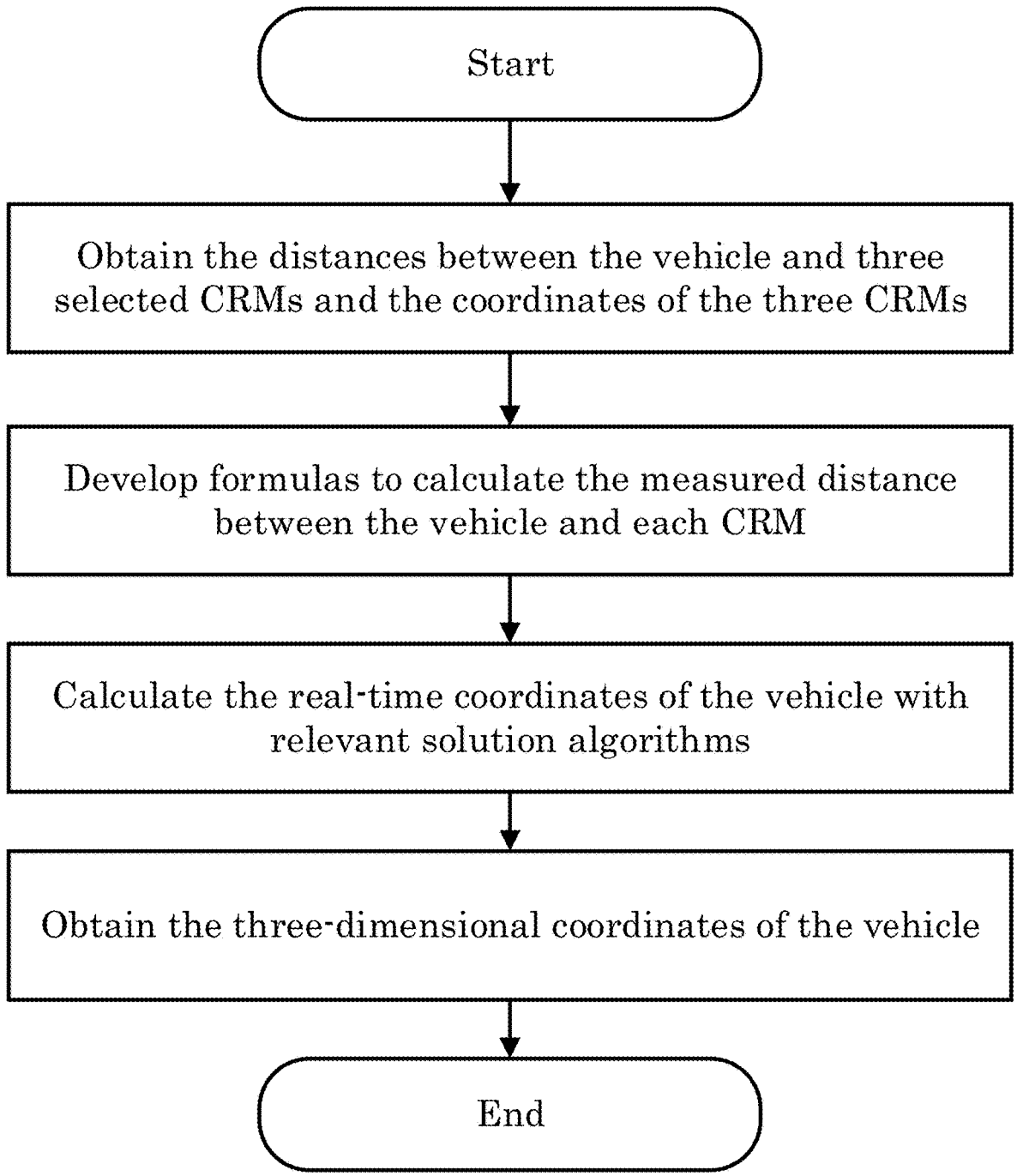
FIG. 26 shows a three-dimensional triangular position identification method for a road with upgrade or downgrade.

In some embodiments, e.g., as shown in FIG. 26, the technology provides a three-dimensional triangular position identification method for a road with upgrade or downgrade. The distances between the vehicle and three selected CRMs are measured. Then, the coordinates of the three CRMs are obtained. Next, formulas are provided and/or developed to calculate the measured distance between the vehicle and each CRM. Subsequently, the real-time position of the vehicle is calculated step by step with a solution algorithm (for example, the elimination method and iterative algorithm of space resection). Finally, the three-dimensional coordinates of the vehicle can be obtained.

Figure 27:
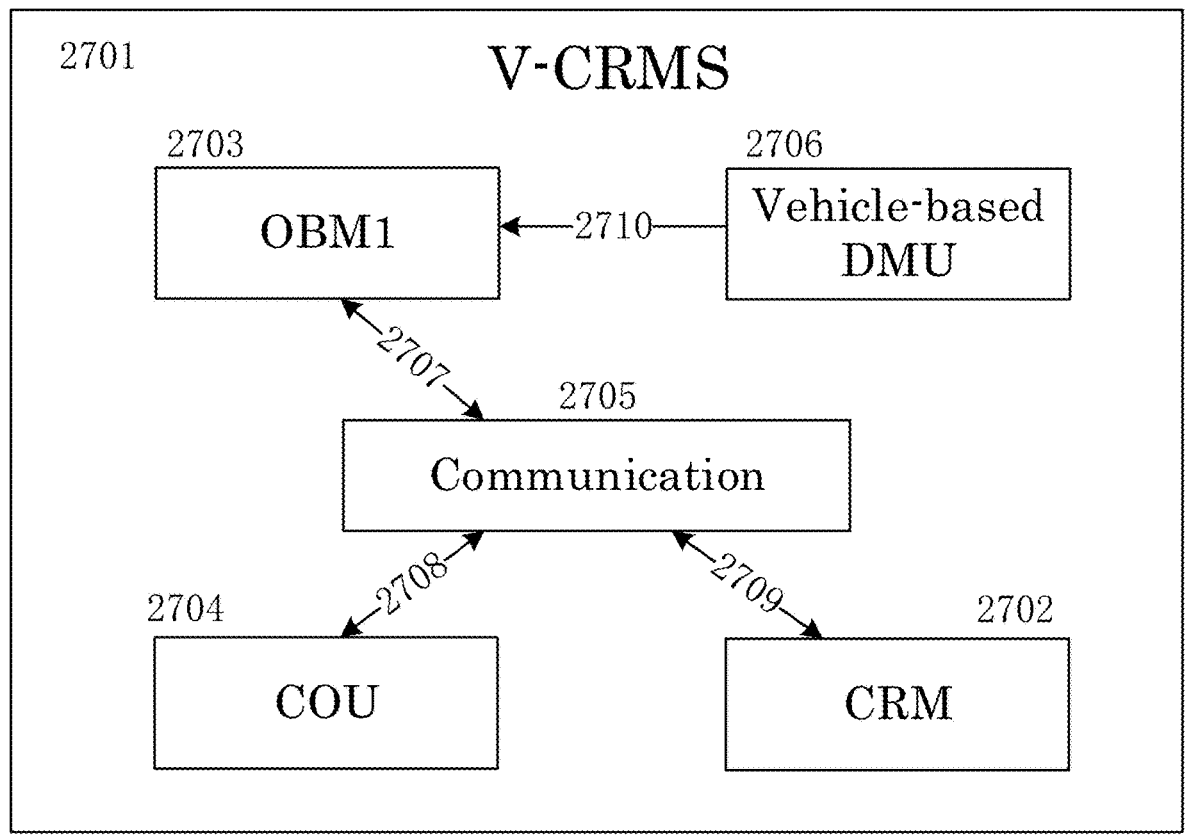
FIG. 27 shows the components and information flows of the V-CRM System. 2701: V-CRM System; 2702: CRM; 2703: OBM1; 2704: COU; 2705: Roadside communication system; 2706: Vehicle-based DMU; 2707: OBM1 communication channel; 2708: COU communication channel; 2709: CRM communication channel; 2710: Distance information.

In some embodiments, e.g., as shown in FIG. 27, the technology provides a V-CRM System comprising components and information flows. The V-CRM System 2701 comprises a network of CRMs 2702 installed along a roadway, a COU 2704, a roadside communication system 2705, an OBM1 2703 installed on a vehicle, and a vehicle-based DMU 2706. The CRM 2702 sends CRM location information to the COU 2704 using CRM communication channel 2709 and COU communication channel 2708, which are supported by roadside communication system 2705. The COU 2704 sends the information of local location relationship tables and virtual roadway configuration to CRM 2702 using COU communication channel 2708 and CRM communication channel 2709, which are supported by roadside communication system 2705. The CRM 2702 sends CRM location information, local location relationship tables, and the virtual roadway configuration information to OBM1 2703 using CRM communication channel 2709 and OBM1 communication channel 2707, which are supported by roadside communication system 2705. The COU 2704 sends the CRM location information for CRM of the network of CRMs, the virtual roadway configuration information, and/or the local location relationship table of key points of the central line of a driving lane to the OBM1 2703 using COU communication channel 2708 and OBM1 communication channel 2707, which are supported by roadside communication system. The vehicle-based DMU 2706 sends distance information 2710 to OBM1 2703. Specifically, the information provided by the CRM 2702 covers a local area and the information provided by COU 2704 covers a large area.

Figure 28:
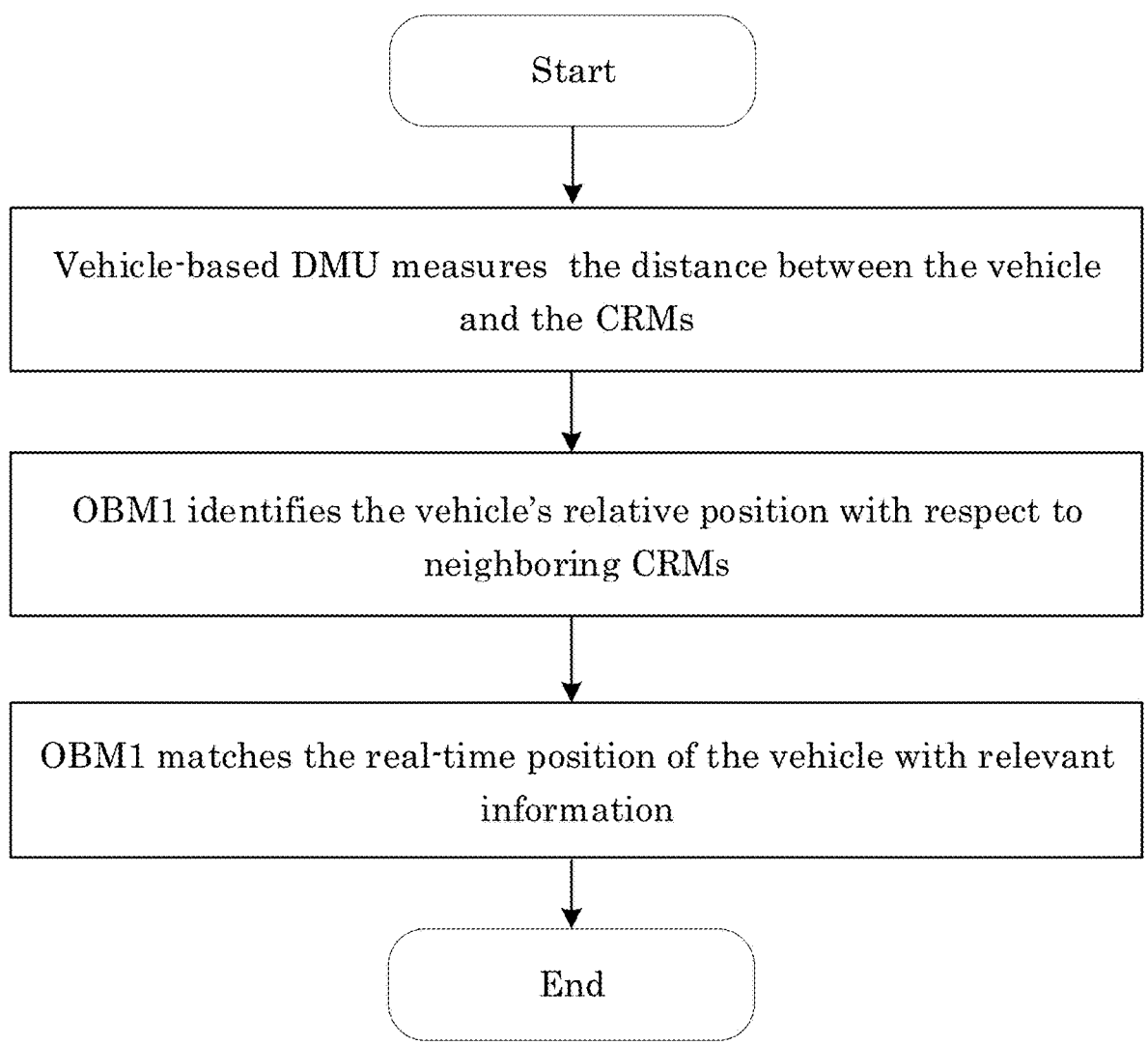
FIG. 28 shows the process of using the V-CRM System to realize vehicle position identification.

In some embodiments, e.g., as shown in FIG. 28, the technology provides a method of using the V-CRM System to identify vehicle position. As shown in FIG. 28, the vehicle-based DMU measures the distance between the vehicle and the CRMs. The real-time position identification module of OBM1 identifies the vehicle relative position with respect to CRMs. The computing module of OBM1 matches the vehicle real-time position with the location of the network of CRMs, the key points of the central line of a driving lane (with or without a high-definition map), and virtual roadway configuration.

Figure 29:
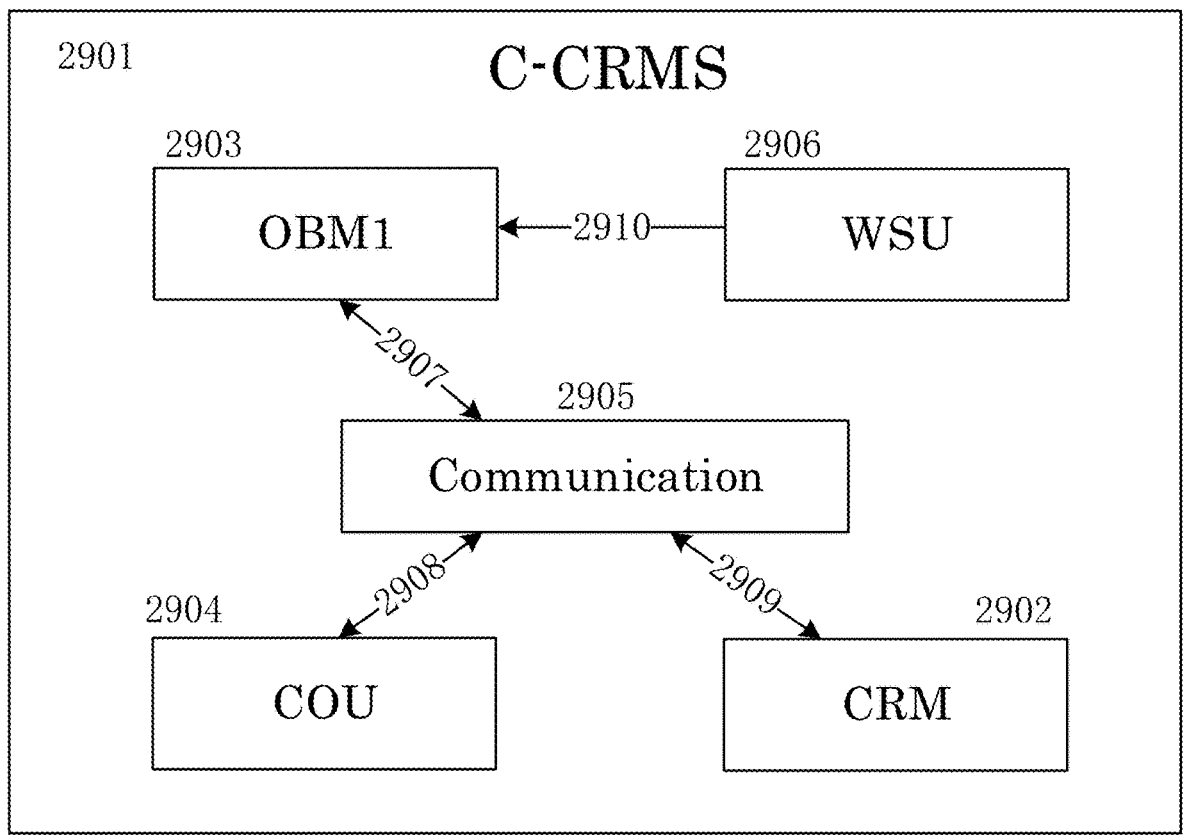
FIG. 29 shows the components and information flows of the C-CRM System. 2901: C-CRM System; 2902: CRM; 2903: OBM1; 2904: COU; 2905: Roadside communication system; 2906: WSU; 2907: OBM1 communication channel; 2908: COU communication channel; 2909: CRM communication channel; 2910: Ranging signal.

In some embodiments, e.g., as shown in FIG. 29, the technology provides a C-CRM System comprising components and information flows. The C-CRM System 2901 comprises the following subcomponents: a network of CRMs 2902 installed along a roadway, a COU 2904, a roadside communication system 2905, an OBM1 2903 installed on a vehicle, and a WSU 2906. The CRM 2902 sends CRM location information to COU 2904 using CRM communication channel 2909 and COU communication channel 2908, which are supported by roadside communication system 2905. The COU 2904 sends the information of local location relationship tables and virtual roadway configuration to CRM 2902 using COU communication channel 2908 and CRM communication channel 2909, which are supported by roadside communication system 2905. The CRM 2902 sends CRM location information, local location relationship tables, and the virtual roadway configuration information to OBM1 2903 using CRM communication channel 2909 and OBM1 communication channel 2907, which are supported by roadside communication system 2905. The COU 2904 sends CRM location information for CRM of the network of CRMs, the virtual roadway configuration information, and/or the local location relationship table of key points of the central line of a driving lane (with or without a high-definition map), to the OBM1 2903 using COU communication channel 2908 and OBM1 communication channel 2907, which are supported by roadside communication system. The WSU 2906 sends the ranging signal 2910 to OBM1 2903. Specifically, the information provided by the CRM 2702 covers a local area and the information provided by COU 2704 covers a large area. The WSU and CRM are co-located.

Figure 30:
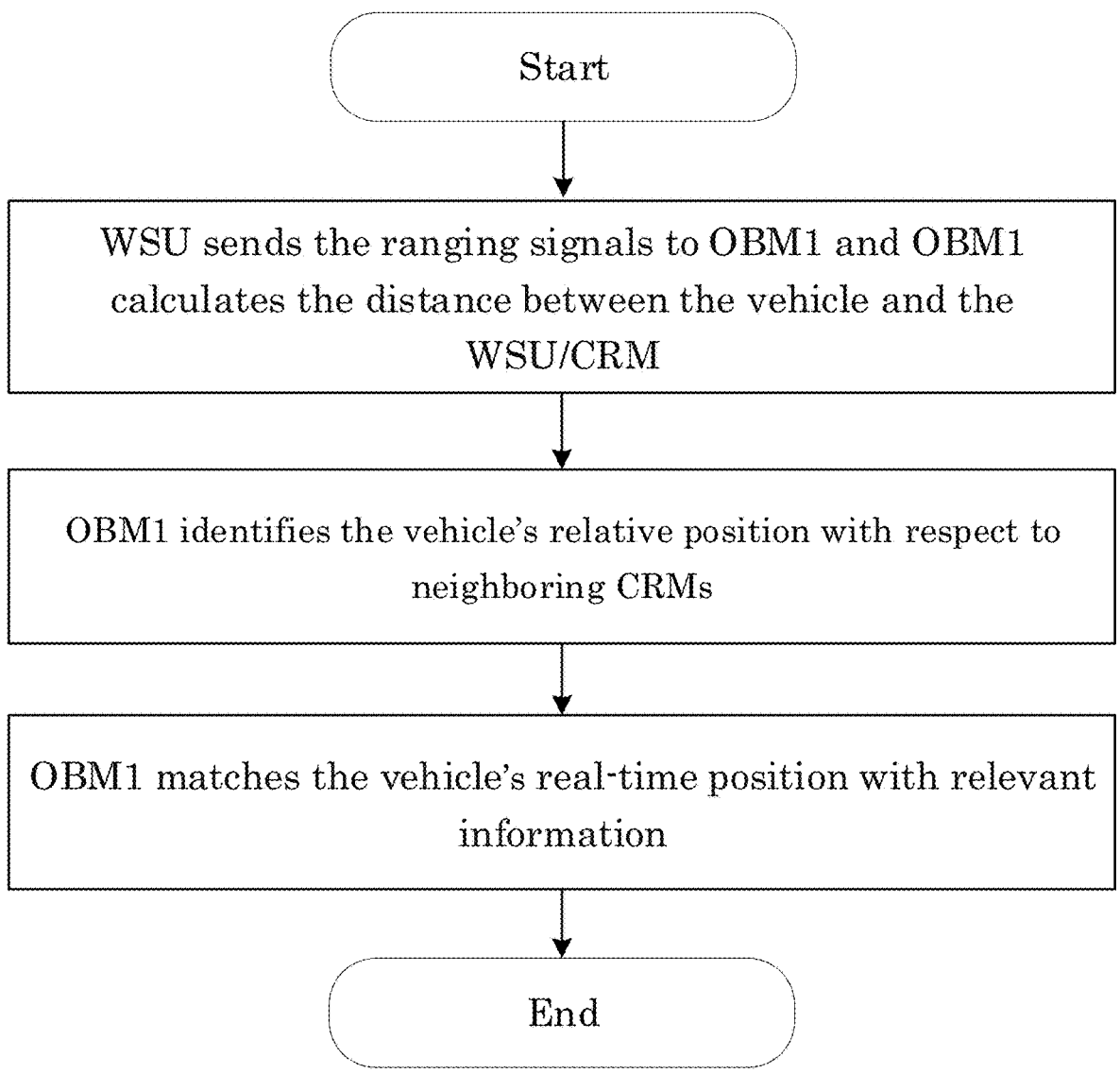
FIG. 30 shows the working process of using the C-CRM System to provide vehicle position identification.

In some embodiments, e.g., as shown in FIG. 30, the technology provides a method for using the C-CRM System to identify vehicle position. As shown in FIG. 30, the WSU sends ranging signals to the OBM1, and the computing module of OBM1 calculates the distance between the vehicle and the WSU/CRM. The computing module of OBM1 identifies the vehicle relative position with respect to CRMs. The computing module of OBM1 matches the vehicle real-time position with the location of the network of CRMs, the key points of the central line of a driving lane (with or without high-definition map), and virtual roadway configuration.

Figure 31:
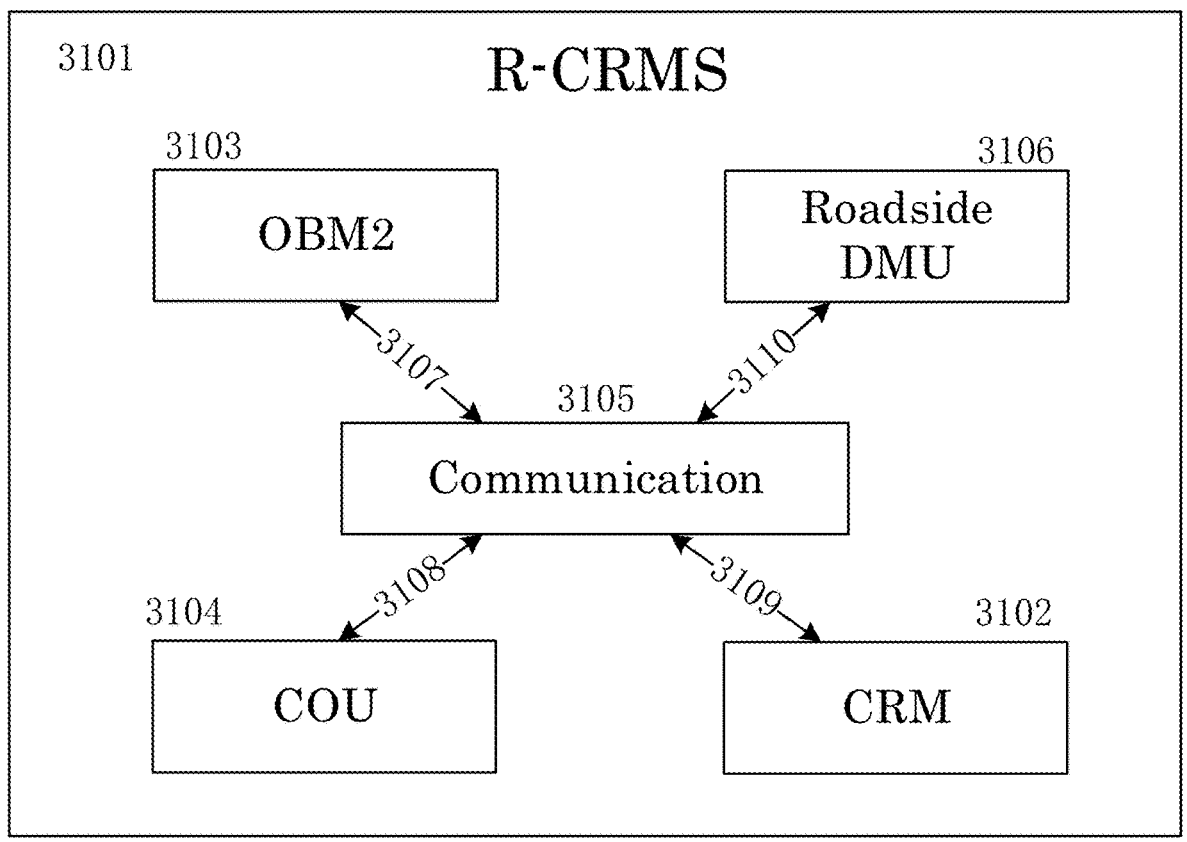
FIG. 31 shows the components and information flows of the R-CRM System. 3101: R-CRM System; 3102: CRM; 3103: OBM2; 3104: COU; 3105: Roadside communication system; 3106: Roadside DMU; 3107: OBM2 communication channel; 3108: COU communication channel; 3109: CRM communication channel; 3110: Roadside DMU communication channel.

In some embodiments, e.g., as shown in FIG. 31, the technology provides a R-CRM System comprising components and information flow. The R-CRM System 3101 comprises the following subcomponents: a network of CRMs 3102 installed along a roadway, a COU 3104, a roadside communication system 3105, an OBM2 3103 installed on a vehicle, and a network of Roadside DMUs 3106 installed along a roadway. The CRM 3102 sends CRM location information to COU 3104 using CRM communication channel 3109 and COU communication channel 3108, which are supported by roadside communication system 3105. The COU 3104 sends the information of local location relationship tables and virtual roadway configuration to CRM 3102 using COU communication channel 3108 and CRM communication channel 3109, which are supported by roadside communication system 3105. The CRM 3102 sends CRM location information, local location relationship tables, and the virtual roadway configuration information to OBM2 3103 using CRM communication channel 3109 and OBM2 communication channel 3107, which are supported by roadside communication system 3105. The COU 3104 sends CRM location information for CRM of the network of CRMs, the virtual roadway configuration information, and/or the local location relationship table of key points of the central line of a driving lane (with or without a high-definition map) to the OBM2 3103 using COU communication channel 3108 and OBM2 communication channel 3107, which are supported by roadside communication system. The roadside DMU 3106 sends information of vehicle relative position with respect to CRMs to the OBM2 3104 using roadside DMU communication channel 3110 and OBM2 communication channel 3107, which are supported by roadside communication system 3105. Specifically, the information provided by the CRM 2702 covers a local area and the information provided by COU 2704 covers a large area. The Roadside DMU and CRM are co-located.

Figure 32:
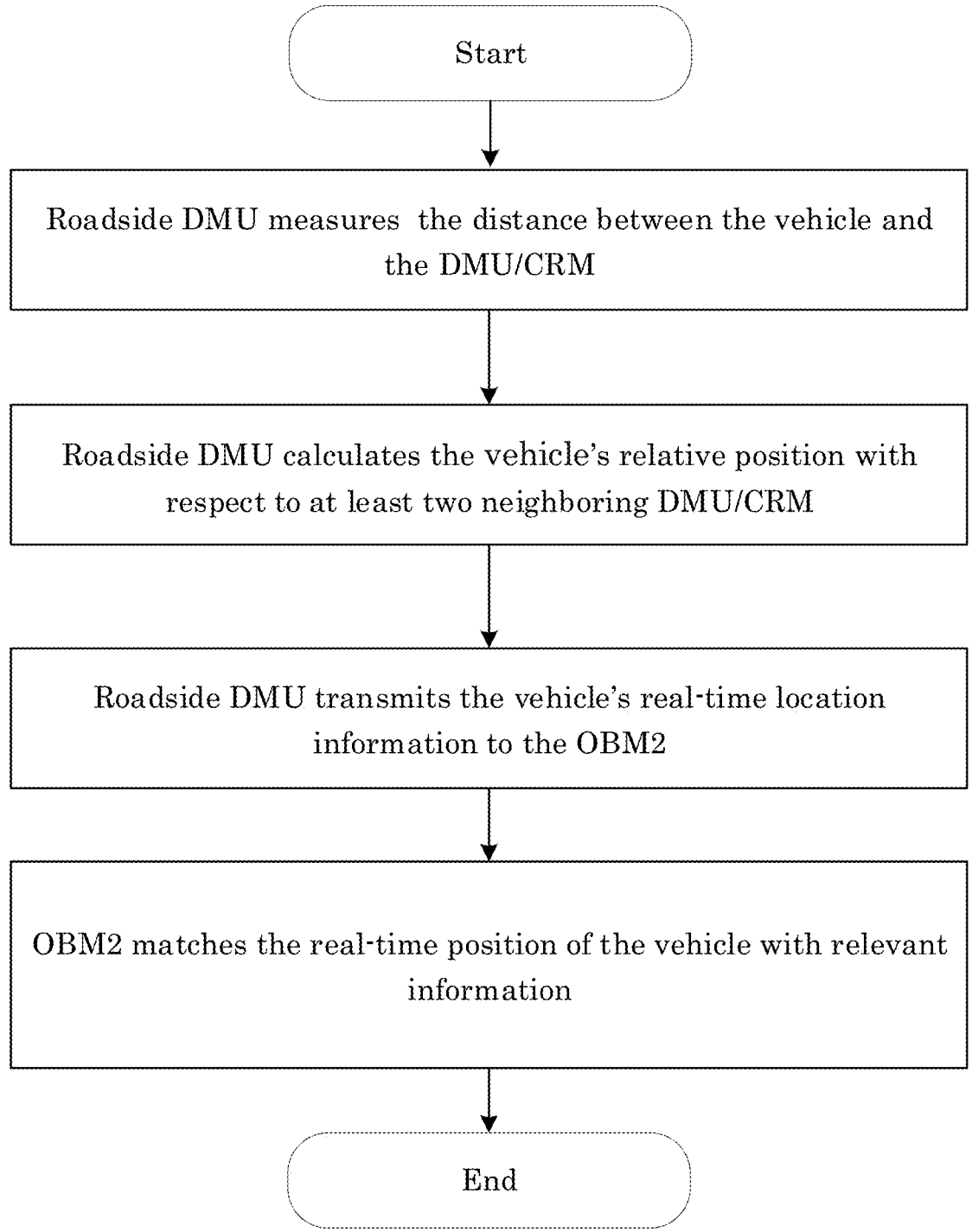
FIG. 32 shows an exemplary flow chart of vehicle position identification using the R-CRM System.

In some embodiments, e.g., as shown in FIG. 32, the technology provides a method for identifying vehicle position identification using the R-CRM System. As shown in FIG. 32, the roadside DMU measures the distance between the vehicle and the DMUs/CRMs.

Specifically, the computing module of the roadside DMU calculates the vehicle relative position with respect to DMUs/CRMs. The communication module of the roadside DMU transmits the vehicle real-time location information to the vehicles. The computing module of OBM2 matches the vehicle real-time position with the location of the network of CRMs, the key points of the central line of a driving lane (with or without a high-definition map), and virtual roadway configuration.

Figure 33:
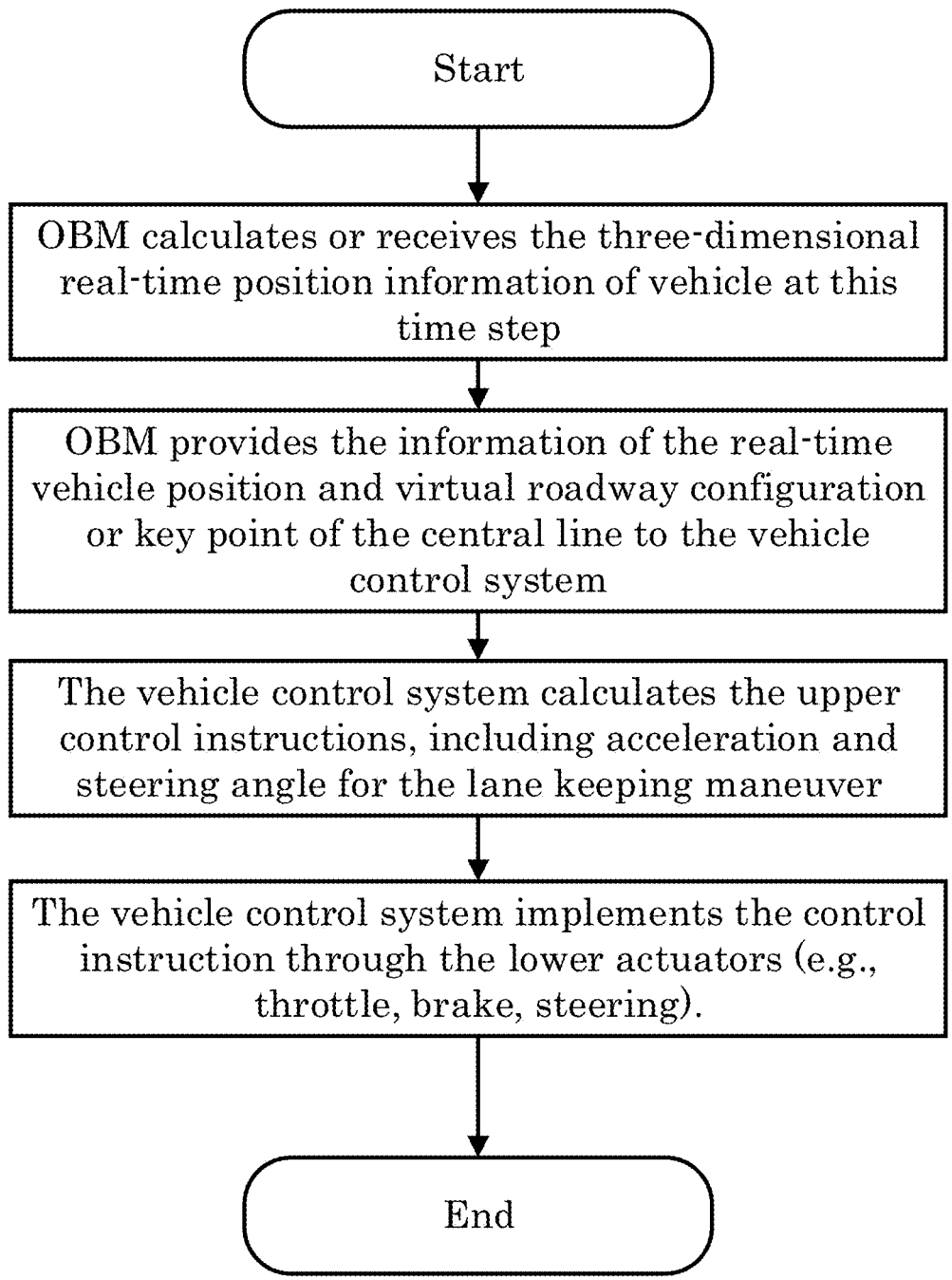
FIG. 33 shows a flowchart of the vehicle lane keeping method using the OBM.

In some embodiments, e.g., as shown in FIG. 33, the technology provides a lane-keeping method using an OBM. At each time step, the OBM calculates or receives the vehicle three-dimensional real-time position information and provides the vehicle three-dimensional real-time position information to the vehicle control system. Simultaneously, the OBM provides the information of virtual roadway configuration and/or the local location relationship table of key points of the central line of a driving lane to the vehicle control system. The vehicle control system calculates and provides vehicle control instructions (e.g., acceleration, deceleration, and steering angle) for the lane-keeping maneuver based on the received information and implements the control instruction through actuators (e.g., throttle, brake, steering) that provide mechanical control of the vehicle to implement the control instructions.

Figure 34:
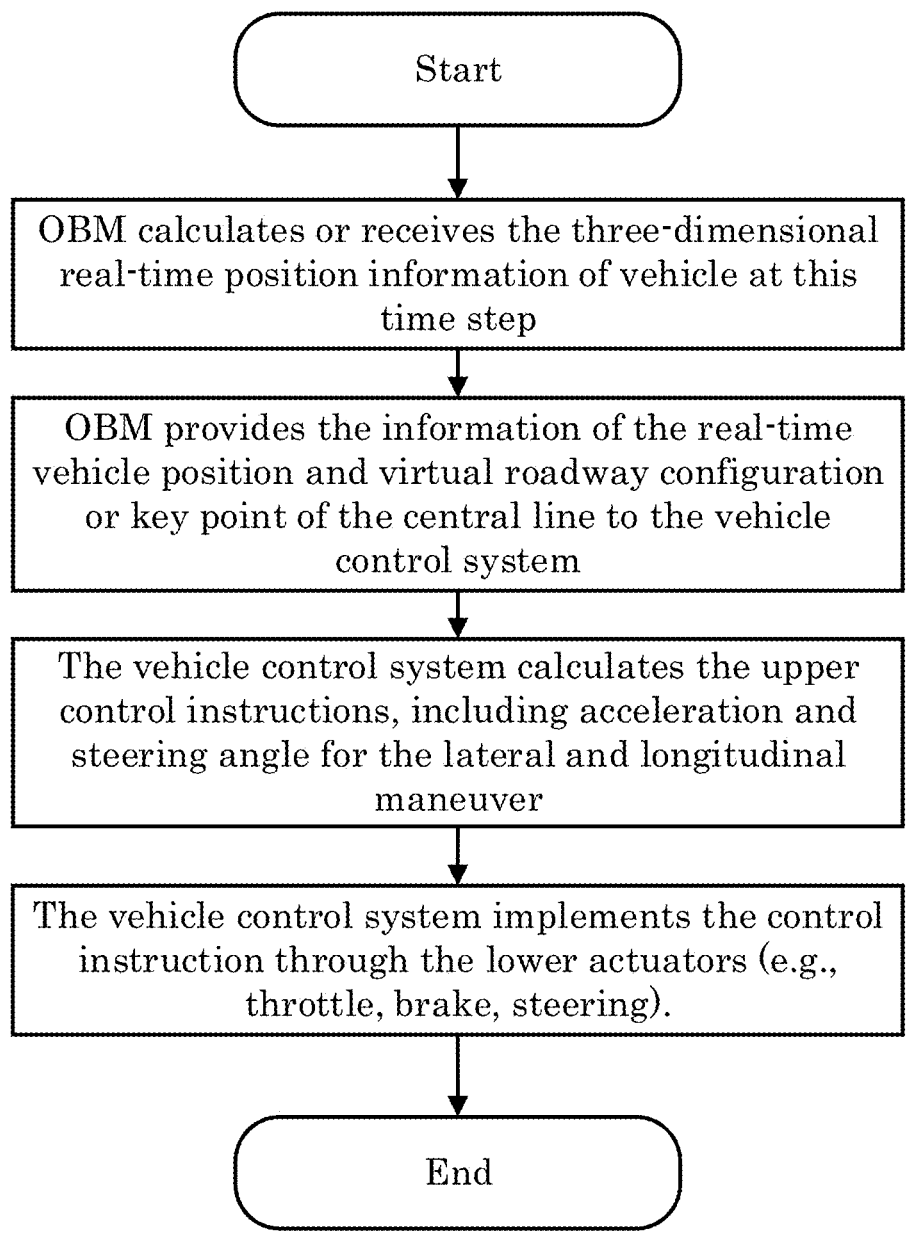
FIG. 34 shows a flowchart of the vehicle lateral and longitudinal control method using the OBM.

In some embodiments, e.g., as shown in FIG. 34, the technology provides a vehicle lateral and longitudinal control method using the OBM. At each time step, the OBM calculates or receives the vehicle three-dimensional real-time position information and provides it to the vehicle control system. Simultaneously, the OBM provides the information of virtual roadway configuration and/or the local location relationship table of key points of the central line of a driving lane to the vehicle control system. The vehicle control system calculates and provides vehicle control instructions (e.g., acceleration, deceleration, and steering angle) for lateral and longitudinal vehicle control based on the received information and implements the control instruction through actuators (e.g., throttle, brake, steering) that provide mechanical control of the vehicle to implement the control instructions.

Automated Driving Systems (ADS)

In some embodiments, the technology provides improvements (e.g., a CRM System) for a vehicle operations and control system (e.g., a CAVH and technologies as described herein). In some embodiments, the CAVH comprises one or more of a roadside intelligent unit (RIU) network; a Traffic Control Unit (TCU), a Traffic Control Center (TCC); a TCU/TCC network; a vehicle intelligent unit (VIU) (e.g., a vehicle comprising a VIU); and/or a Traffic Operations Center (TOC). In some embodiments, the system comprises multiple kinds of sensors and computation devices on CAV and infrastructure (e.g., roadside infrastructure) and is configured to integrate sensing, prediction, planning, and control for automated driving of CAV.

In some embodiments, the technology relates to an ADS provided as a connected and automated vehicle highway (CAVH) system, e.g., comprising one or more components of an intelligent road infrastructure system (IRIS) (see, e.g., U.S. Pat. Nos. 10,867,512 and 10,380,886, each of which is incorporated herein by reference). In some embodiments, the ADS is provided as or supports a distributed driving system (DDS), intelligent roadside toolbox (IRT), and/or device allocation system (DAS) (see, e.g., U.S. Pat. App. Ser. Nos. 16/996,684; 63/004,551; and 63/004,564, each of which is incorporated herein by reference). In some embodiments, the term "roadside intelligent unit" and its abbreviation "RIU" are used to refer to the components named a "roadside unit" and its abbreviation "RSU", respectively, as described for the CAVH technology in, e.g., U.S. Pat. Nos. 10,867,512 and 10,380,886, each of which is incorporated herein by reference.

In some embodiments, a CAV comprises a vehicle control unit (VIU) (e.g., an on-board unit (OBU) that communicates with an ADS (e.g., a connected and automated vehicle highway (CAVH) system, e.g., comprising one or more components of an intelligent road infrastructure system (IRIS) (see, e.g., U.S. Pat. Nos. 10,867,512 and 10,380,886, each of which is incorporated herein by reference)). In some embodiments, the ADS is provided as or supports a distributed driving system (DDS), intelligent roadside toolbox (IRT), and/or device allocation system (DAS) (see, e.g., U.S. Pat. App. Ser. Nos. 16/996,684; 63/004,551; and 63/004,564, each of which is incorporated herein by reference). In some embodiments, the term "vehicle intelligent unit" and its abbreviation "VIU" are used to refer to the components named an "onboard unit" and its abbreviation "OBU", respectively, as described for the CAVH technology in, e.g., U.S. Pat. Nos. 10,867,512 and 10,380,886, each of which is incorporated herein by reference. In some embodiments, the term "vehicle intelligent unit" and its abbreviation "VIU" are used to refer to the components named an "onboard intelligent unit" and its abbreviation "OIU", respectively, as described in U.S. Pat. App. Ser. No. 63/042,620, incorporated herein by reference. In some embodiments, the VIU comprises sensing modules to sense and characterize the driving environment and components configured to communicate with other vehicles and/or infrastructure components (e.g., IRT and/or components of a CAVH system). In some embodiments, the VIU transmits sensor data to an IRT and/or a component of a CAVH system. In some embodiments, a VIU comprises a component (e.g., a vehicle control module or vehicle control unit) that interfaces with the mechanical components of a CAV to provide mechanical control of a CAV according to control instructions provided by the VIU, by the VIU and IRT, and/or by the VIU and ADS. In some embodiments, a VIU communicates with a component (e.g., a vehicle control module or vehicle control unit) that interfaces with the mechanical components of a CAV to provide mechanical control of a CAV according to control instructions provided by the VIU, by the VIU and IRT, and/or by the VIU and ADS.

In some embodiments, the technology provides a system (e.g., a vehicle operations and control system comprising a RIU and/or an RIU network; a TCU/TCC network; a vehicle comprising an vehicle intelligent unit; a TOC; and/or a cloud-based platform configured to provide information and computing services (see, e.g., U.S. patent application Ser. No. 16/454,268, incorporated herein by reference)) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RIU network comprises an RIU subsystem. In some embodiments, the RIU subsystem comprises a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, the communication module communicates using wired or wireless media.

In some embodiments, the sensing module comprises a radar based sensor. In some embodiments, the sensing module comprises a vision based sensor. In some embodiments, the sensing module comprises a radar based sensor and a vision based sensor and wherein the vision based sensor and the radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a global navigation satellite system (GNSS). In some embodiments, the sensing module comprises an inertial navigation system. In some embodiments, the sensing module comprises a satellite based navigation system and an inertial navigation system and the sensing module and/or the inertial navigation system are configured to provide vehicle location data. In some embodiments, the GNSS is, e.g., the Global Positioning System developed by the United States, Differential Global Positioning System (DGPS), BeiDou Navigation Satellite System (BDS) System, GLONASS Global Navigation Satellite System), European Union Galileo positioning system, the NavIC system of India, and the Quasi-Zenith Satellite System (QZSS) of Japan.

In some embodiments, the sensing module comprises a vehicle identification device. In some embodiments, the vehicle identification device comprises RFID, Bluetooth, Wi-fi (IEEE 802.11), a cellular network radio (e.g., a 4G, 5G, 6G, or 7G cellular network radio), a dedicated short-range communication technology (DSRC); or C-V2X communications system.

In some embodiments, the RIU subsystem is deployed at a fixed location near a road comprising automated lanes and, optionally, human-driven lanes. In some embodiments, the RIU subsystem is deployed at a fixed location near road infrastructure. In some embodiments, the RIU subsystem is deployed near a highway roadside, a highway onramp, a highway off ramp, an interchange, intersection, a bridge, a tunnel, a toll station, or on a drone over a critical location. In some embodiments, the RIU subsystem is deployed on a mobile component. In some embodiments, the RIU subsystem is deployed on a vehicle drone over a critical location, on an unmanned aerial vehicle (UAV), at a site of traffic congestion, at a site of a traffic accident, at a site of highway construction, and/or at a site of extreme weather. In some embodiments, an RIU subsystem is positioned according to road geometry, traffic amount, traffic capacity, vehicle type using a road, road size, and/or geography of the area. In some embodiments, the RIU subsystem is installed on a gantry (e.g., an overhead assembly, e.g., on which highway signs or signals are mounted). In some embodiments, the RIU subsystem is installed using a single cantilever or dual cantilever support.

In some embodiments, the TCC network is configured to provide traffic operation optimization, data processing, and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the TCU network is configured to provide real-time vehicle control and data processing. In some embodiments, the real-time vehicle control and data processing are automated based on preinstalled algorithms. In some embodiments, the TCU network comprises a segment TCU or a point TCU based on based on the geographical area covered by the TCU network. In some embodiments, the system comprises a point TCU physically combined or integrated with an RIU. In some embodiments, the system comprises a segment TCU physically combined or integrated with a RIU. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the TCC network comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the TCU network comprises segment TCUs configured to process information from corridor TCCs and/or point TCUs and provide control targets to point TCUs; and point TCUs configured to process information from the segment TCU and RIUs and provide vehicle-based control instructions (e.g., detailed and time-sensitive control instructions for individual vehicles) to an RIU. See, e.g., U.S. Pat. Nos. 10,380,886; 10,867,512; 10,692,365; and U.S. Pat. App. Pub. Nos. 20200005633 and 20200021961, each of which is incorporated herein by reference.

In some embodiments, the RIU network provides vehicles with customized traffic information and control instructions (e.g., detailed and time-sensitive control instructions for individual vehicles) and receives information provided by vehicles.

In some embodiments, the TCC network comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, TCU network comprises one or more TCUs comprising a sensor and control module configured to provide the sensing and control functions of an RIU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, 6G, 7G, and/or wireless (e.g., IEEE 802.11) radio. In some embodiments, the TCU network comprises one or more TCUs comprising a transmission and network module configured to provide communication network function for data exchange between an automated vehicle and a RIU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RIU. In some embodiments, the management and control methods of an RIU comprise local cooperative control of vehicles and roads, system monitoring, and emergency service. In some embodiments, the TCC network comprises one or more TCCs further comprising an application module and the service management module provides data analysis for the application module. In some embodiments, the TCU network comprises one or more TCUs further comprising an application module and the service management module provides data analysis for the application module.

In some embodiments, the TOC comprises interactive interfaces. In some embodiments, the interactive interfaces provide control of the TCC network and data exchange. In some embodiments, the interactive interfaces comprise information sharing interfaces and vehicle control interfaces. In some embodiments, the information sharing interfaces comprise an interface that shares and obtains traffic data; an interface that shares and obtains traffic incidents; an interface that shares and obtains passenger demand patterns from shared mobility systems; an interface that dynamically adjusts prices according to instructions given by the vehicle operations and control system; and/or an interface that allows a special agency (e.g., a vehicle administrative office or police) to delete, change, and/or share information. In some embodiments, the vehicle control interfaces comprise an interface that allows a vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other shared mobility systems. In some embodiments, traffic incidents comprise extreme conditions, major and/or minor accident, and/or a natural disaster. In some embodiments, an interface allows the vehicle operations and control system to assume control of vehicles upon occurrence of a traffic event, extreme weather, or pavement breakdown when alerted by the vehicle operations and control system and/or other shared mobility systems. In some embodiments, an interface allows vehicles to form a platoon with other vehicles when they are driving in the same automated vehicle dedicated lane.

In some embodiments, the VIU comprises a communication module configured to communicate with an RIU. In some embodiments, the VIU comprises a communication module configured to communicate with another VIU. In some embodiments, the VIU comprises a data collection module configured to collect data from external vehicle sensors and internal vehicle sensors; and to monitor vehicle status and driver status. In some embodiments, the VIU comprises a vehicle control module configured to execute control instructions for driving tasks. In some embodiments, the driving tasks comprise vehicle following and/or lane changing. In some embodiments, the control instructions are received from an RIU. In some embodiments, the VIU is configured to control a vehicle using data received from an RIU. In some embodiments, the data received from the RIU comprises vehicle control instructions (e.g., detailed and time-sensitive control instructions for individual vehicles); travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, a VIU is configured to send data to an RIU. In some embodiments, the data sent to the RIU comprises driver input data; driver condition data; and/or vehicle condition data. In some embodiments, the driver input data comprises origin of the trip, destination of the trip, expected travel time, and/or service requests. In some embodiments, the driver condition data comprises driver behaviors, fatigue level, and/or driver distractions. In some embodiments, the vehicle condition data comprises vehicle ID, vehicle type, and/or data collected by a data collection module.

In some embodiments, the VIU is configured to collect data comprising vehicle engine status; vehicle speed; surrounding objects detected by vehicles; and/or driver conditions. In some embodiments, the VIU is configured to assume control of a vehicle. In some embodiments, the VIU is configured to assume control of a vehicle when the automated driving system fails. In some embodiments, the VIU is configured to assume control of a vehicle when the vehicle condition and/or traffic condition prevents the automated driving system from driving the vehicle. In some embodiments, the vehicle condition and/or traffic condition is adverse weather conditions, a traffic incident, a system failure, and/or a communication failure.

In some embodiments, the CRM System is provided to support an Intelligent Roadside Toolbox (IRT) (e.g., as described in U.S. Pat. App. Ser. No. 63/004,551, incorporated herein by reference in its entirety). In some embodiments, the IRT provides modular (e.g., real-time and ad hoc) access to CAVH and IRIS technologies according to the automated driving needs of a particular vehicle. In some embodiments, modular (e.g., ad hoc) access to CAVH and IRIS technologies are provided as services (e.g., sensing services, transportation behavior prediction and management services, planning and decision-making services, and/or vehicle control services). In some embodiments, the CRM System described herein is provided to support a distributed driving system (DDS) (e.g., as described in U.S. Pat. App. Ser. No. 62/894,703, incorporated herein by reference in its entirety).

EXAMPLE

The following are example hardware and parameters that form embodiments of the claimed systems. Exemplary hardware and parameters that find use in the basic CRM System include, but are not limited to, the following:
CRM:
  Data storage: Qualcomm 4G SIM Card
  Communication:
    Cellular SIM Card: Qualcomm 4G SIM Card
    BLUETOOTH (e.g., BLUETOOTH low energy) component: Gimbal Proximity Beacon Series 22
    ultra-wideband transceiver: Qorvo DWM1000
    Near-field communication: ST25T NFC/RFID tags
  Data processing or computing: Qualcomm Snapdragon 780G
Roadside Communication: MK5 V2X from Cohda Wireless Exemplary hardware and parameters that find use in COU include, but are not limited to, the following:
COU:
  Computing: Intel i7-10700KF
  HD Map: Here HD Map
  Communication: Qualcomm Snapdragon X16 LTE Modem Exemplary hardware and parameters that find use in the A-CRM System include, but are not limited to, the following:
CRM:
  Data storage: Qualcomm 4G SIM Card
  Communication:
    Cellular SIM Card: Qualcomm 4G SIM Card
    BLUETOOTH (e.g., BLUETOOTH low energy) component: Gimbal Proximity Beacon Series 22
    ultra-wideband transceiver: Qorvo DWM1000
    Near-field communication: ST25T NFC/RFID tags
  Data processing or computing: Qualcomm Snapdragon 780G
Roadside Communication: MK5 V2X from Cohda Wireless
COU:
  Computing: Intel i7-10700KF
  HD Map: Here HD Map
  Communication: Qualcomm Snapdragon X16 LTE Modem Exemplary hardware and parameters that find use in the V-CRM System include, but are not limited to, the following:
CRM:
  Data storage: Qualcomm 4G SIM Card
  Communication:
    Cellular SIM Card: Qualcomm 4G SIM Card
    BLUETOOTH (e.g., BLUETOOTH low energy) component: Gimbal Proximity Beacon Series 22
    ultra-wideband transceiver: Qorvo DWM1000
    Near-field communication: ST25T NFC/RFID tags
  Computing: Qualcomm Snapdragon 780G
  Roadside Communication: MK5 V2X from Cohda Wireless
COU:
  Computing: Intel i7-10700KF
  HD Map: Here HD Map
  Communication: Qualcomm Snapdragon X16 LTE Modem
OBM1:
Communication:
  5G: 9150 C-V2X ASIC Qualcomm
  4G: Qualcomm Snapdragon X16 LTE Modem
  BLUETOOTH (e.g., BLUETOOTH low energy) component: Gimbal Proximity Beacon Series 22
  WiFi: ESP8285
Computing: Qualcomm 9150
HD Map: Here HD Map
Position Identification: i.MX 6UltraLite
Vehicle-based DMU:
  Communication:
    5G: 9150 C-V2X ASIC Qualcomm
    4G: Qualcomm Snapdragon X16 LTE Modem
    BLUETOOTH (e.g., BLUETOOTH low energy) component: Gimbal Proximity Beacon Series 22
    WiFi: ESP8285
  Computing: Intel i7-10700KF
  Data storage: Qualcomm 4G SIM Card
  Distance Measurement Device (DMD):
    Millimeter radar: SYH24A1 24G Millimeter Wave Radar
    Lidar: HDL-64E of Velodyne Lidar
    Camera: EyEQ4 from Mobileye
    BLUETOOTH (e.g., BLUETOOTH low energy) component: Gimbal Proximity Beacon Series 22

Exemplary hardware and parameters that find use in the C-CRM System include, but are not limited to, the following:

CRM:
  Data storage: Qualcomm 4G SIM Card
  Communication:
    Cellular SIM Card: Qualcomm 4G SIM Card
    BLUETOOTH (e.g., BLUETOOTH low energy) component: Gimbal Proximity Beacon Series 22
    ultra-wideband transceiver: Qorvo DWM1000
    Near-field communication: ST25T NFC/RFID tags
  Computing: Qualcomm Snapdragon 780G
  Roadside Communication: MK5 V2X from Cohda Wireless COU:
  Computing: Intel i7-10700KF
  HD Map: Here HD Map
  Communication: Qualcomm Snapdragon X16 LTE Modem OBM1:
  Communication:
    5G: 9150 C-V2X ASIC Qualcomm
    4G: Qualcomm Snapdragon X16 LTE Modem
    BLUETOOTH (e.g., BLUETOOTH low energy) component: Gimbal Proximity Beacon Series 22
    WiFi: ESP8285
  Computing: Qualcomm 9150
  HD Map: Here HD Map
  Position Identification: i.MX 6UltraLite WSU:
  BLUETOOTH (e.g., BLUETOOTH low energy) component: Gimbal Proximity Beacon Series 22
  4G cellular signals: 9150 C-V2X ASIC Qualcomm
  5G cellular signals: Qualcomm Snapdragon X16 LTE Modem Exemplary hardware and parameters that find use in the R-CRM System include, but are not limited to, the following:

CRM:
  Data storage: Qualcomm 4G SIM Card
  Communication:
    Cellular SIM Card: Qualcomm 4G SIM Card
    BLUETOOTH (e.g., BLUETOOTH low energy) component: Gimbal Proximity Beacon Series 22
    ultra-wideband transceiver: Qorvo DWM1000
    Near-field communication: ST25T NFC/RFID tags
  Computing: Qualcomm Snapdragon 780G
  Roadside Communication: MK5 V2X from Cohda Wireless COU:
  Computing: Intel i7-10700KF
  HD Map: Here HD Map
  Communication: Qualcomm Snapdragon X16 LTE Modem OBM2:
  Communication:
    5G: 9150 C-V2X ASIC Qualcomm
    4G: Qualcomm Snapdragon X16 LTE Modem
    BLUETOOTH (e.g., BLUETOOTH low energy) component: Gimbal Proximity Beacon Series 22
    WiFi: ESP8285
  Computing: Qualcomm 9150
  HD Map: Here HD Map
  Position Identification: i.MX 6UltraLite Roadside DMU:
  Communication:
    5G: 9150 C-V2X ASIC Qualcomm
    4G: Qualcomm Snapdragon X16 LTE Modem
    BLUETOOTH (e.g., BLUETOOTH low energy) component: Gimbal Proximity Beacon Series 22
    WiFi: ESP8285
  Computing: Intel i7-10700KF
  Data storage: Qualcomm 4G SIM Card
  Distance Measurement Device (DMD):
    Millimeter radar: SYH24A1 24G Millimeter Wave Radar
    Lidar: HDL-64E of Velodyne Lidar
    Camera: EyEQ4 from Mobileye
    BLUETOOTH (e.g., BLUETOOTH low energy) component: Gimbal Proximity Beacon Series 22

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A communication-based connected reference marker system (C-CRM System) comprising a network of Connected Reference Markers (CRM) installed along a roadway, a Central Operations Unit (COU), a roadside communication system, an Onboard Module 1 (OBM1) installed on a vehicle, and a network of Wireless Signal Unit (WSU) installed along the roadway,
  wherein a CRM of the network of CRMs provides a local location reference and/or an object reference to support identifying the locations and positions of objects on the roadway and in the driving environment for the vehicle; and detects and identifies objects on the roadway and in the driving environment for the vehicle;
  wherein the COU manages and operates local location relationship tables for the network of CRMs, virtual roadway configuration information for the roadway, or local location relationship tables for key points of a central line of a driving lane; and transmits the local location relationship tables, the virtual roadway configuration information, or the local location relationship tables for key points of a central line of a driving lane to CRMs and to the vehicle;
  wherein said OBM1 receives real-time ranging signals from an WSU of said network of WSUs; calculates distances from the vehicle to at least two WSUs and associated CRMs; and identifies and matches a relative position of the vehicle with respect to CRMs, a virtual roadway configuration, or key points of a central line of a driving lane;
  wherein said OBM1 comprises a real-time position identification module configured to perform a position identification method comprising measuring distances from the vehicle to at least two WSUs and associated CRMs; and identifying the relative position of the vehicle with respect to CRMs;

wherein said position identification method is a triangular position identification method and provides a two-dimensional method for a level grade road or a three-dimensional method for a road comprising an upgrade or a downgrade.

2. The C-CRM System of claim 1, wherein said CRM comprises a data storage component storing a CRM identifier and CRM location information; and a communication module for transmitting the CRM identifier and CRM location information to the vehicle.

3. The C-CRM System of claim 1, wherein said CRM comprises a data storage component storing the CRM identifier and CRM location information; a data processing unit to process the CRM location information; and a communication module for transmitting the CRM identifier and CRM location information to the vehicle.

4. The C-CRM System of claim 1, wherein said network of CRM comprises a plurality of CRM installed along a roadway at intervals of from 1 meter to 50 meters.

5. The C-CRM System of claim 1, wherein said objects on the roadway and in the driving environment for the vehicle comprise a bicycle, pedestrian, animal, obstacle, construction, incident, signage, marking, traffic control device, and/or one or more other vehicles.

6. The C-CRM System of claim 1, further comprising a virtual roadway configuration module (VRCM) comprising a virtual driving cell identification module, a virtual driving lane identification module, a virtual driving lane group identification module, and a virtual driving grid identification module.

7. The C-CRM System of claim 6, wherein said VRCM is configured to provide virtual driving lanes that virtually mark actual driving lanes when said actual driving lanes are obscured or when the roads and road markings are not optically detectable by either connected automated vehicle highway (CAVH) system sensors or connected automated vehicle (CAV) sensors.

8. The C-CRM System of claim 6, wherein said VRCM is configured to provide virtual driving lanes that virtually mark actual driving lanes during a weather event.

9. The C-CRM System of claim 1, wherein said COU is an HD map free COU and comprises a location relationship identification module to develop a set of local location relationship tables for CRM; a VRCM to provide virtual roadway configuration information comprising virtual driving cells, virtual driving lanes, virtual driving lane groups, and a virtual driving grid; and a communication module for transmitting said local location relationship tables and said virtual roadway configuration information to CRMs and to the vehicle.

10. The C-CRM System of claim 1, wherein said COU comprises a location relationship identification module to develop a set of local location relationship tables for CRM and key points of a central line of a driving lane; a VRCM to provide virtual roadway configuration information comprising virtual driving cells, virtual driving lanes, virtual driving lane groups, and a virtual driving grid; a high-definition map including roadway lane configuration and CRM location information; and a communication module for transmitting said local location relationship tables, said virtual roadway configuration information, and said HD map to CRMs and to the vehicle.

11. The C-CRM System of claim 1, wherein a CRM stores said local location relationship tables and said virtual roadway configuration information and transmits said local location relationship tables and said virtual roadway configuration information to the vehicle driving by said CRM.

12. The C-CRM System of claim 1, wherein said COU transmits said local location relationship tables and said virtual roadway configuration information to CRM.

13. The C-CRM System of claim 1, wherein the roadside communication system is configured to provide communication and information sharing among CRMs, COU, and the vehicle.

14. The C-CRM System of claim 1, wherein said WSU comprises a wireless signal transmitting device that transmits a ranging signal, wherein said ranging signal is transmitted to the vehicle; said WSU further comprises a power supply.

15. The C-CRM System of claim 1, wherein said position identification method comprises:
transmitting, by a WSU, a ranging signal;
receiving, by the OBM1, the ranging signal and WSU location information; and
computing, by the real-time position identification module, the distances between the vehicle and the WSUs and associated CRMs using the ranging signal and the WSU location information.

16. The C-CRM System of claim 1, wherein said vehicle uses the vehicle real-time position information, virtual roadway configuration information, or a local location relationship table of key points of a central line of a driving lane to maintain lane keeping.

17. The C-CRM System of claim 1, wherein said vehicle uses the vehicle real-time position information, virtual roadway configuration information, or a local location relationship table of key points of a central line of a driving lane to perform longitudinal and lateral movement within a virtual driving cell of a virtual driving grid.

18. The C-CRM System of claim 1, wherein one or more of the CRM, COU, roadside communication system, OBM1, and/or WSU is a physical subsystem.

19. The C-CRM System of claim 1, configured to support an automated driving system (ADS).

20. An ADS comprising one or more Connected Reference Markers and an OBM1, wherein the C-CRM System of claim 1 is configured to support said ADS.

21. The ADS of claim 20, wherein said C-CRM System is configured to support the ADS for all weather conditions.

22. The ADS of claim 20, wherein said C-CRM System is configured to support the ADS when the roads and road markings are not optically detectable by either CAVH system sensors or CAV sensors.

23. A method of controlling vehicles and/or managing traffic by:
(1) installing a network of connected reference markers (CRM) along a roadway;
(2) installing a Central Operations Unit (COU);
(3) installing a roadside communication system and a network of Wireless Signal Unit (WSU) along the roadway;
(4) installing an Onboard Module 1 (OBM1) on a vehicle;
(5) using a CRM of the network of CRMs to provide a local location reference and/or an object reference to support identifying the locations and positions of objects on the roadway and in the driving environment for the vehicle; and to detect and identify objects on the roadway and in the driving environment for the vehicle;
(6) using the COU to manage and operate local location relationship tables for the network of CRMs, virtual roadway configuration information for the roadway, or local location relationship tables for key points of a central line of a driving lane; and to transmit the local location relationship tables, the virtual roadway configuration information, or the local location relationship tables for key points of a central line of a driving lane to CRMs and to the vehicle;
(7) using said OBM1 to receive real-time ranging signals from an WSU of said network of WSUs; to calculate distances from the vehicle to at least two WSUs and associated CRMs; and to identify and match a relative position of the vehicle with respect to CRMs, a virtual roadway configuration, or key points of a central line of a driving lane;
(8) using a real-time position identification module in said OBM1 to perform a position identification method comprising measuring distances from the vehicle to at least two WSUs and associated CRMs; and to identify the relative position of the vehicle with respect to CRMs;
(9) controlling said vehicle using the CRM system;
wherein said position identification method is a triangular position identification method and provides a two-dimensional method for a level grade road or a a three-dimensional method for a road comprising an upgrade or a downgrade.

\* \* \* \* \*